United States Patent
Kokatsu et al.

(10) Patent No.: US 7,386,482 B2
(45) Date of Patent: Jun. 10, 2008

(54) SERVER SYSTEM FOR DISTRIBUTING AN ELECTROMOTIVE POWER ASSISTED BICYCLE

(75) Inventors: Kyosuke Kokatsu, Osaka (JP); Akihito Yoshiie, Osaka (JP); Fumihito Nigara, Osaka (JP); Takehiko Ito, Osaka (JP); Satoshi Maruyama, Osaka (JP)

(73) Assignees: Sunstar Giken Kabushiki Kaisha, Osaka (JP); Sunstar Suisse SA, Ecubiens (CH)

( * ) Notice: Subject to any disclaimer, the term of this patent is extended or adjusted under 35 U.S.C. 154(b) by 713 days.

(21) Appl. No.: 10/520,095

(22) PCT Filed: Jul. 3, 2003

(86) PCT No.: PCT/JP03/08483

§ 371 (c)(1),
(2), (4) Date: Jan. 4, 2005

(87) PCT Pub. No.: WO2004/006152

PCT Pub. Date: Jan. 15, 2004

(65) Prior Publication Data

US 2005/0246152 A1 Nov. 3, 2005

(30) Foreign Application Priority Data

Jul. 5, 2002 (JP) .............................. 2002-196953

(51) Int. Cl.
*G06Q 30/00* (2006.01)
(52) U.S. Cl. ...................... 705/26; 705/27; 180/205; 180/206; 180/207
(58) Field of Classification Search ................... 705/26, 705/27, 1; 180/206, 205, 207; 192/45.1
See application file for complete search history.

(56) References Cited

U.S. PATENT DOCUMENTS 5,857,537 A * 1/1999 Matsumoto et al. ......... 180/206
2003/0050849 A1 * 3/2003 Keller et al. .................. 705/26

FOREIGN PATENT DOCUMENTS

JP 05-282404 10/1993

(Continued)

OTHER PUBLICATIONS http://www.electricscooterland.com, <retrieved from waybackmachine.org, retrieved on Jan. 29, 2008>.*

(Continued)

*Primary Examiner*—Matthew S. Gart
(74) *Attorney, Agent, or Firm*—Harness, Dickey & Pierce, P.L.C.

(57) ABSTRACT

To realize a unit sales system of an electromotive power assisted bicycle that provides a broad range of flexibility in conformity with requirements of a user, a server computer 1-1 for distributing an electromotive power assisted bicycle according to the present invention comprises a control section 1-2 for providing a general control and management of the computer, a hard disk 1-3 for storing a set of a variety of information for providing the electromotive power assisted bicycle, and a modem 1-4 enabling the connection to a variety of different terminals via a communication network. The hard disk 1-3 stores bicycle information, electromotive power assisting information, user information, physical strength/health information, a variety of different control programs to be downloaded, information about a supplier to which an order is issued, and information about an assembly station and so on. The server computer 1-1, in response to an order from the user via the communication network 1-11, creates design information for assembling an electromotive power assisting kit 1-21 with an ordinary bicycle unit having a traveling function basically provided by a pedal effort, and sends it to the suppliers and the assembler so that a tailored electromotive power assisted bicycle 1-23 can be delivered to a user.

42 Claims, 24 Drawing Sheets

FOREIGN PATENT DOCUMENTS

| | | |
|---|---|---|
| JP | 5-282404 A | 10/1993 |
| JP | 06-107267 | 4/1994 |
| JP | 6-107267 A | 4/1994 |
| JP | 08-244493 | 9/1996 |
| JP | 8-244493 A | 9/1996 |
| JP | 08-268371 | 10/1996 |
| JP | 8-268371 A | 10/1996 |
| JP | 08-268374 | 10/1996 |
| JP | 09-009577 | 1/1997 |
| JP | 09-058562 | 3/1997 |
| JP | 9-58562 A | 3/1997 |
| JP | 10-203467 | 8/1998 |
| JP | 10-203467 A | 8/1998 |
| JP | 10-318860 | 12/1998 |
| JP | 10-318860 A | 12/1998 |
| JP | 11-091675 | 4/1999 |
| JP | 11-91675 A | 4/1999 |
| JP | 2000-164185 | 6/2000 |
| JP | 2000-164185 A | 6/2000 |
| JP | 2001-130476 | 5/2001 |
| JP | 2001-130476 A | 5/2001 |
| JP | 2001-260771 | 9/2001 |
| JP | 2001-260771 A | 9/2001 |
| JP | 2001-306626 | 11/2001 |
| JP | 2001-306626 A | 11/2001 |
| JP | 2001-306961 | 11/2001 |
| JP | 2001-306961 A | 11/2001 |
| JP | 2002-16983 | 1/2002 |
| JP | 2002-16983 A | 1/2002 |
| JP | 2002-63097 | 2/2002 |
| JP | 2002-63097 A | 2/2002 |
| JP | 2002-078289 | 3/2002 |
| JP | 2002-140581 | 5/2002 |
| JP | 2002-140581 A | 5/2002 |
| JP | 2002-145148 | 5/2002 |
| JP | 2002-145148 A | 5/2002 |
| JP | 2002-163509 | 6/2002 |
| JP | 2002-163509 A | 6/2002 |
| WO | WO97/14608 | 4/1997 |
| WO | WO 97/14608 A1 | 9/1997 |
| WO | 00/75006 A1 | 12/2000 |
| WO | 02/33279 A1 | 4/2002 |

OTHER PUBLICATIONS http://andyscycle.com, <retrieved from waybackmachine.org, retrieved on Jan. 29, 2008>.* http://nycewheels.com, <retrieved from waybackmachine.org, retrieved on Jan. 29, 2008>.*

Reference 3—Internet Business White Book 2000, Japan, Softbank Publishing K.K., published on Nov. 30, 1999, first edition, pp. 150-152 with English translation.

Reference 4—' "BTP" service expands via the Internet', Nikkei Net Business, Japan, Nikkei Business Publications, Inc., Feb. 25, 2001, vol. 69, pp. 90-93 with English translation.

Official Action for Japanese Application 2002-196953-Jul. 5, 2002 entitled "Final Decision for Rejection".

"Internet Business Hakushi 2000", JP, Softbank Publishing Inc., Nov. 30, 1999, 1st Edition, 150 to 152.

"Net de Hirogaru 'BTO'", Nikkei Netbusiness, JP, Nikkei Business Publications, Inc., Feb. 25, 2001, No. 69, 90 to 93.

International Search Report for PCT/JP03/08483; ISA/JP; Mailed: Sep. 24, 2003.

* cited by examiner

Fig. 11
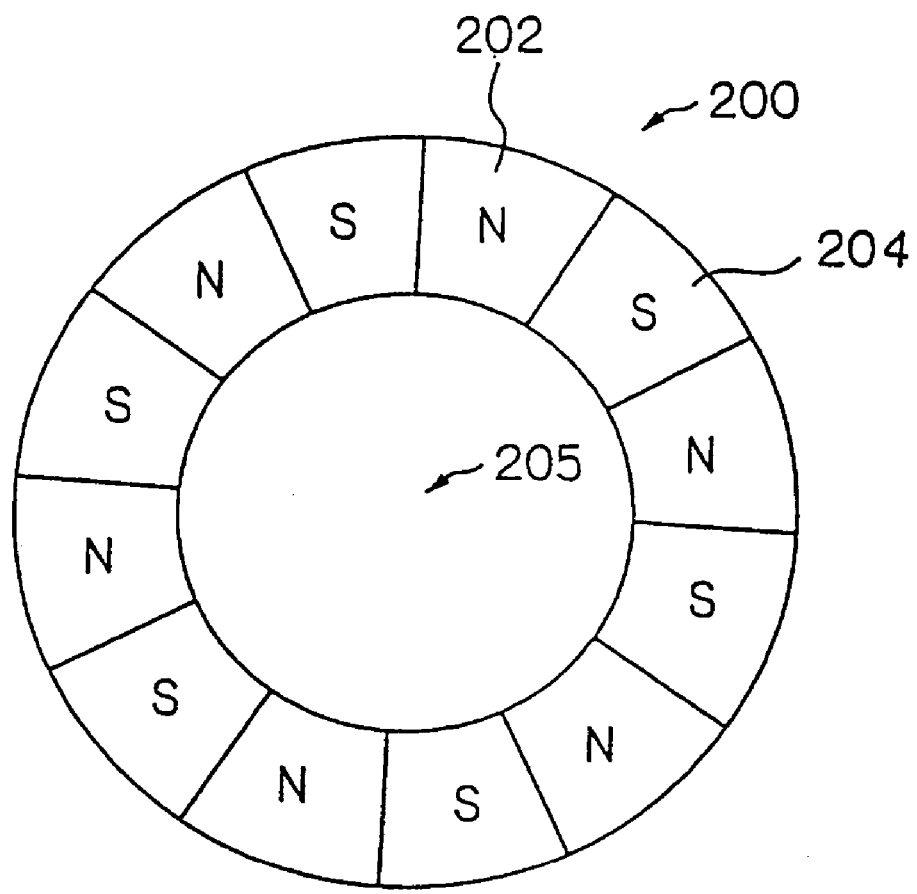
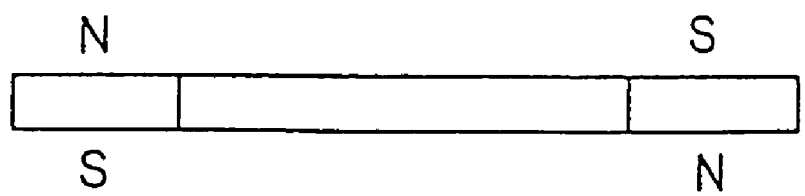

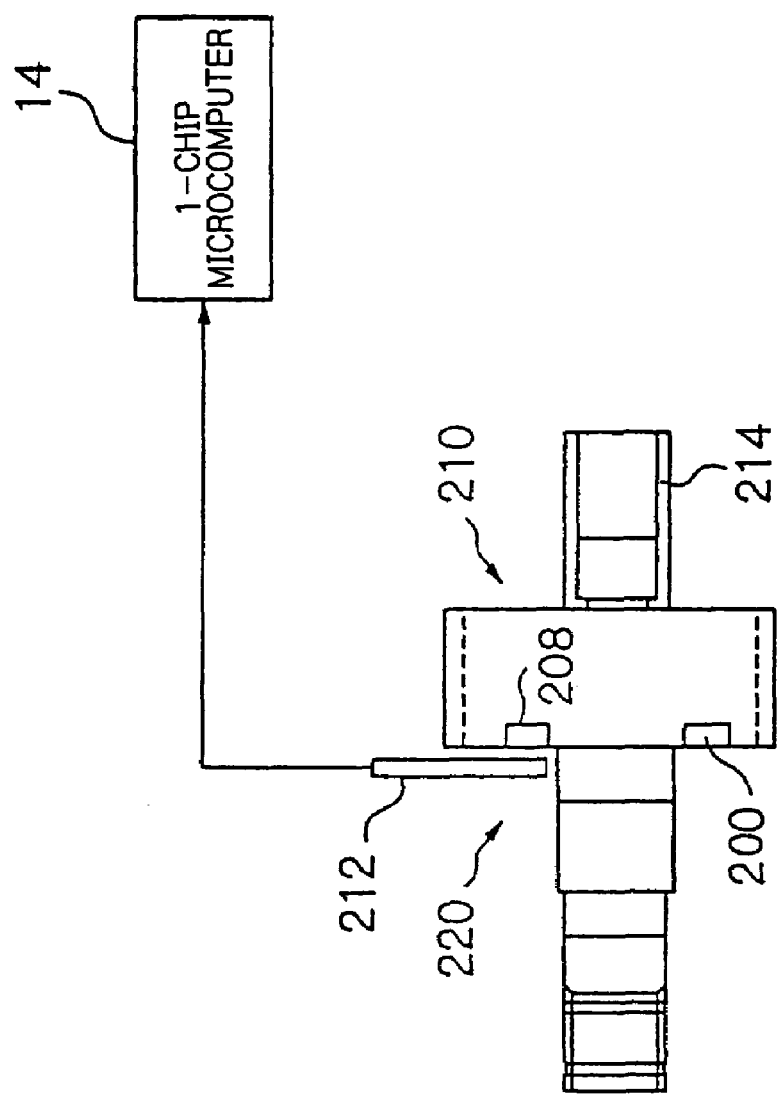
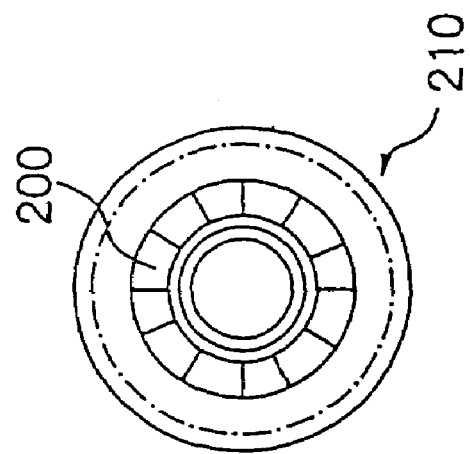
Fig. 12

220

Fig. 14
(a)
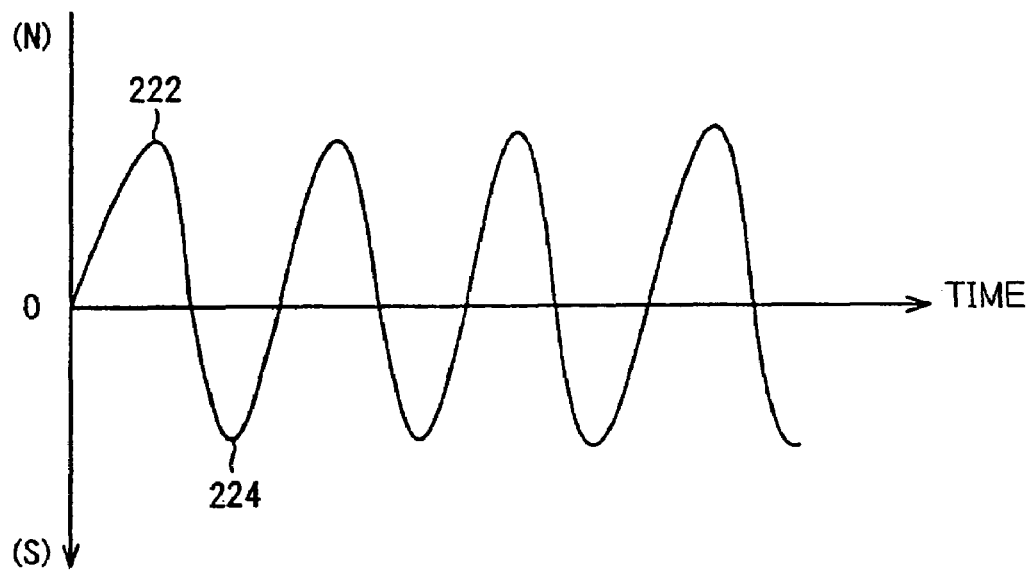
(b)
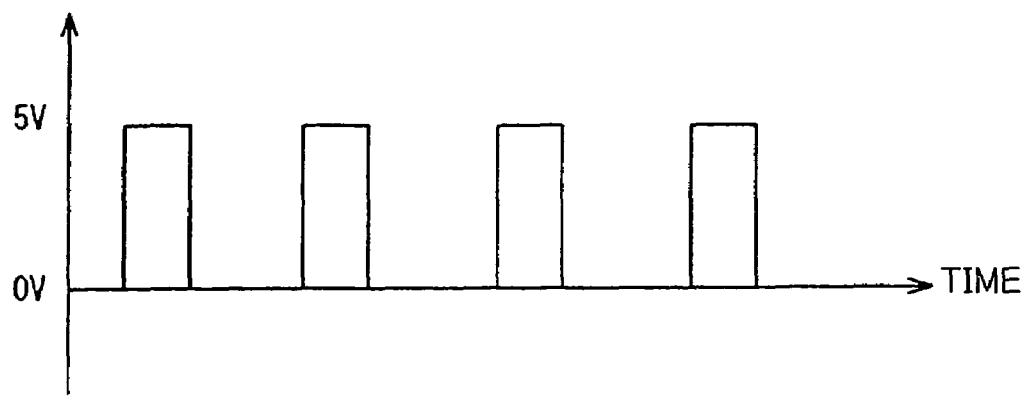

Fig. 18
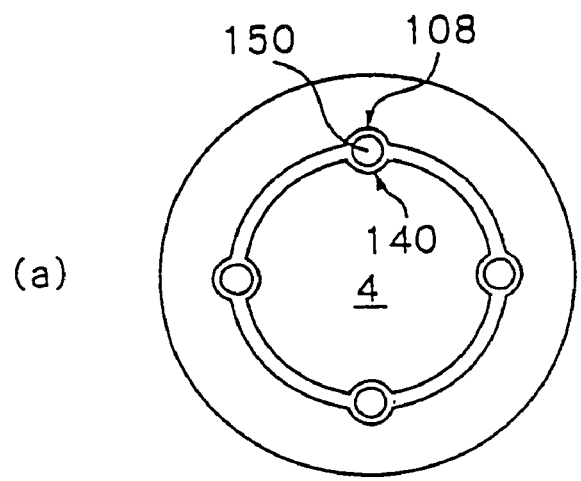
(a)
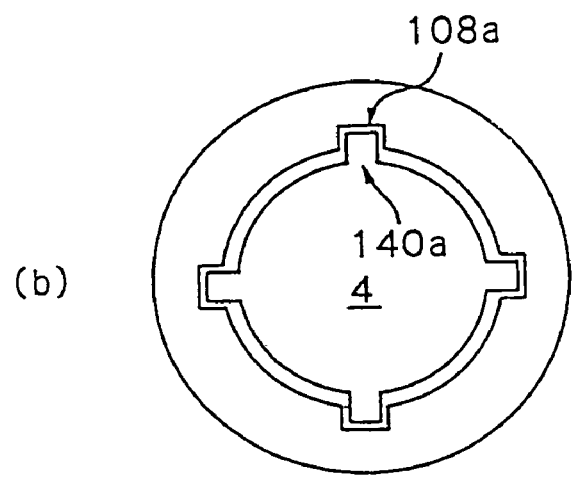
(b)
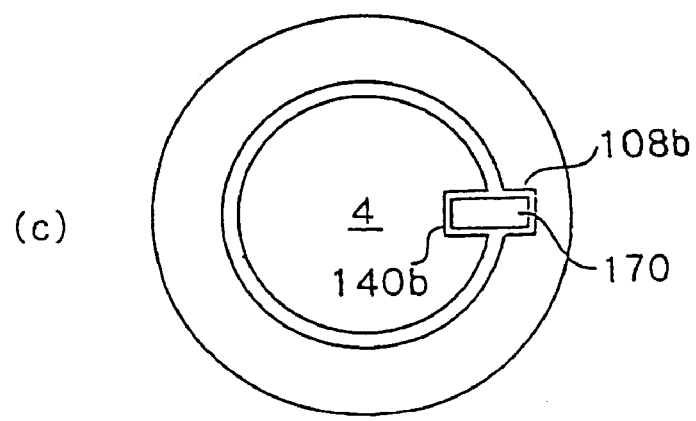
(c)

Fig. 19
(a)
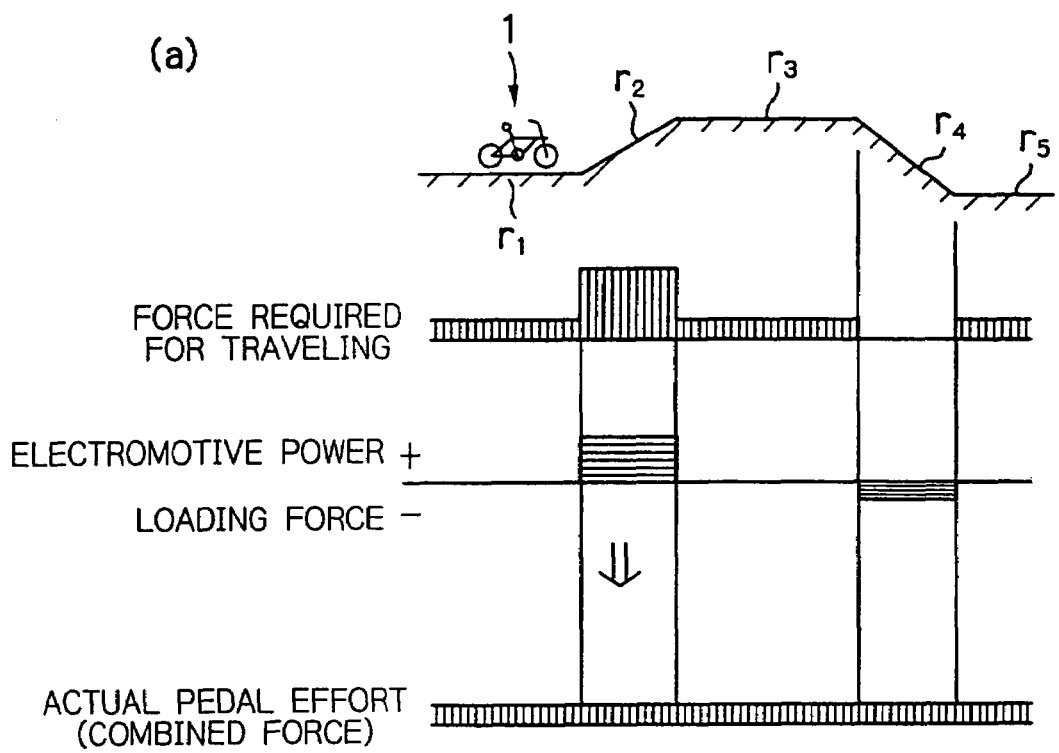
(b)
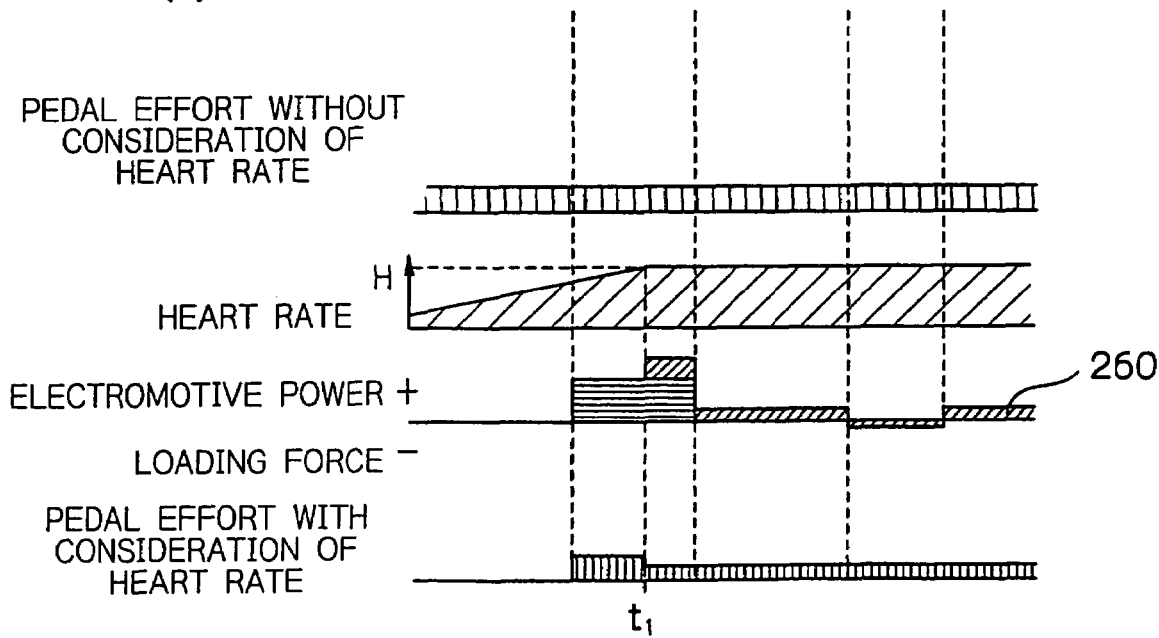

Fig. 21
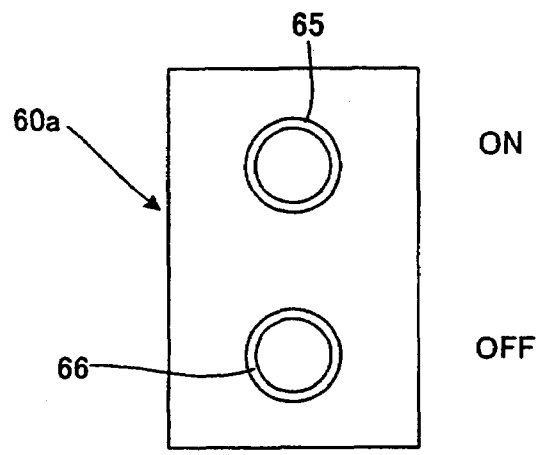
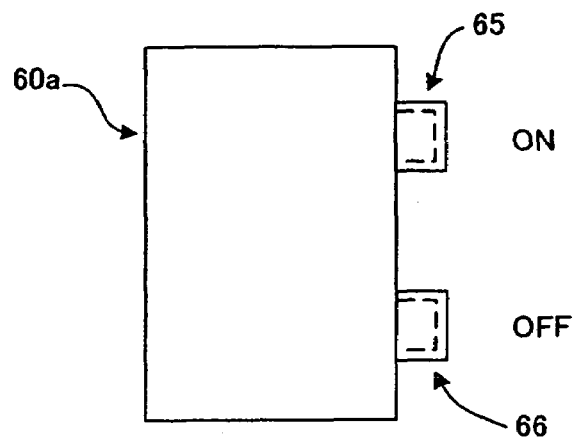
| SWITCH PRESSING OPERATION FOR TURNING ON POWER SUPPLY: NEUTRAL (INITIAL STATE) → ON → NEUTRAL SWITCH PRESSING OPERATION FOR TURNING OFF POWER SUPPLY: NEUTRAL (INITIAL STATE) → OFF → NEUTRAL |
|---|
| SWITCH PRESSING OPERATION FOR TURNING ON POWER SUPPLY AFTER THE AUTOMATIC DISCONNECTION: NEUTRAL (INITIAL STATE) → ON → NEUTRAL |

Fig. 22
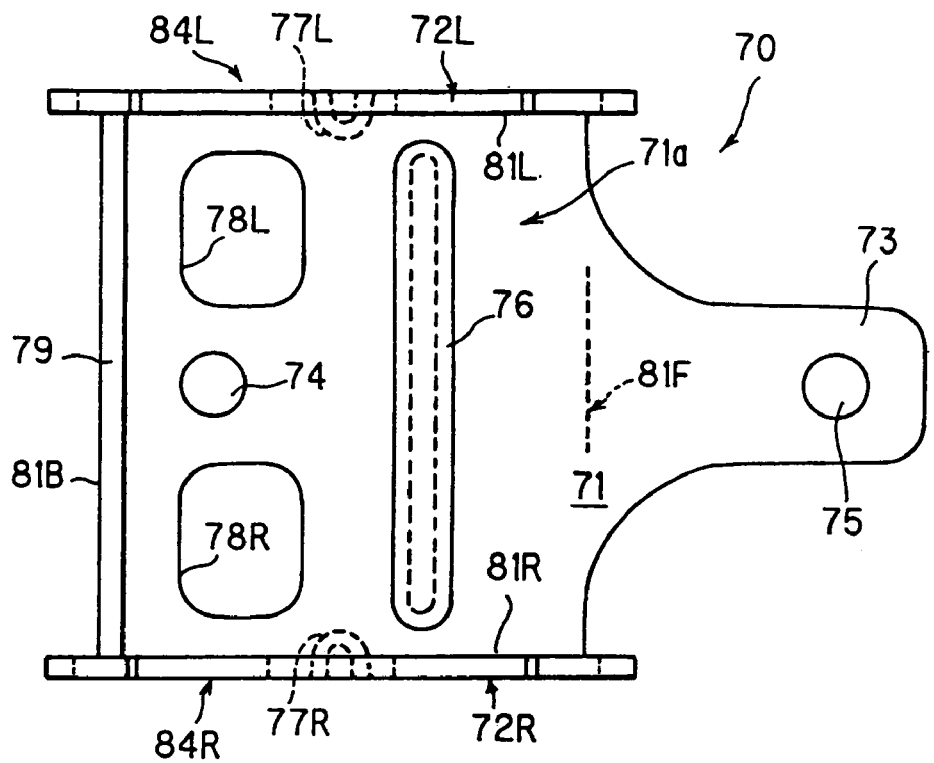
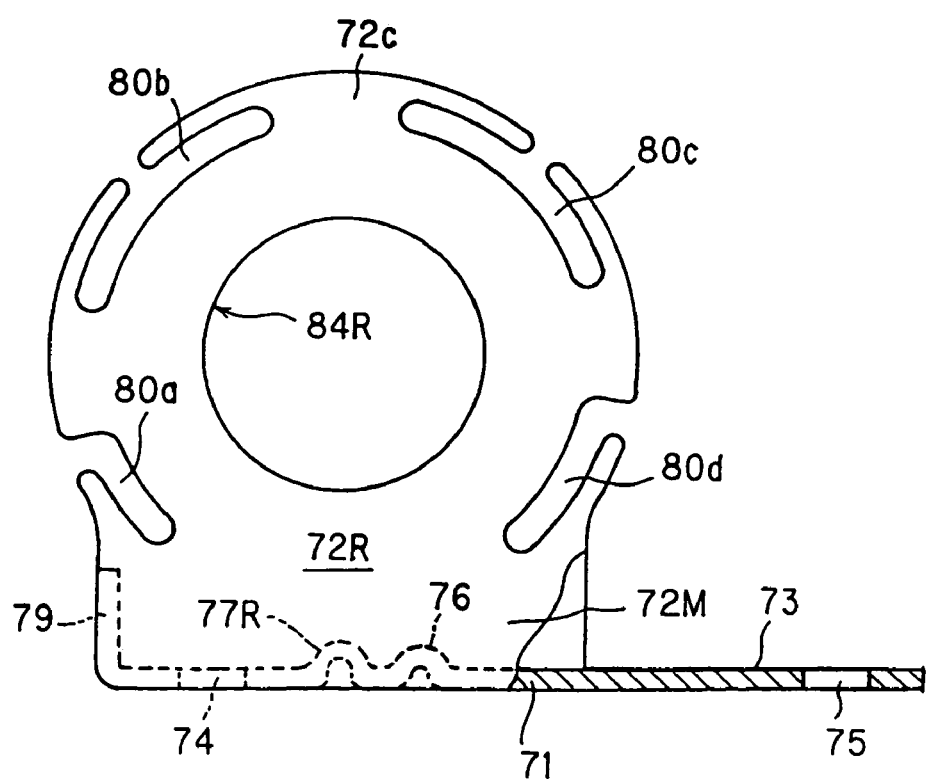

Fig. 23
(a)
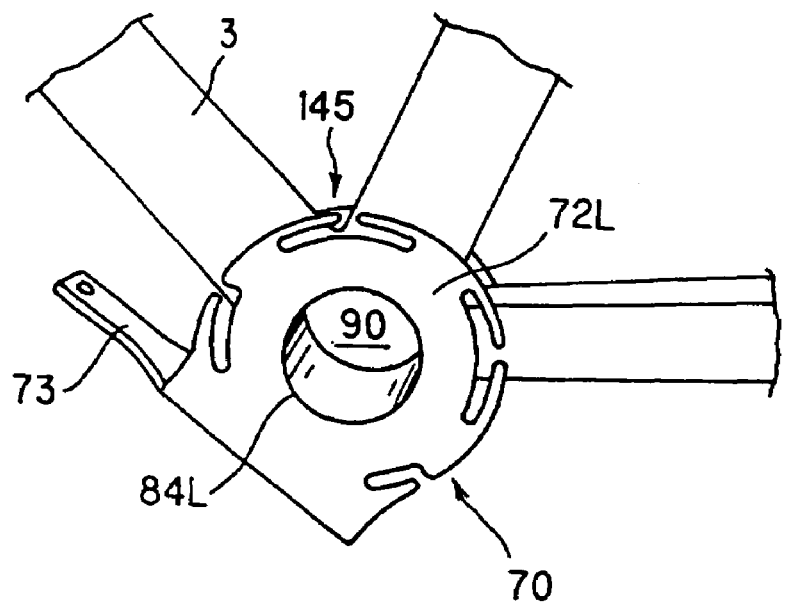
(b)
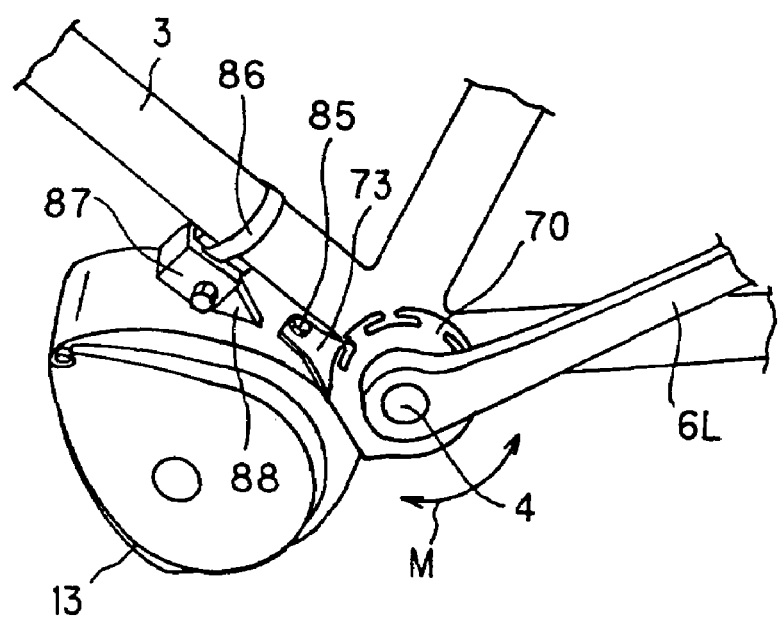

Fig. 24
(a)
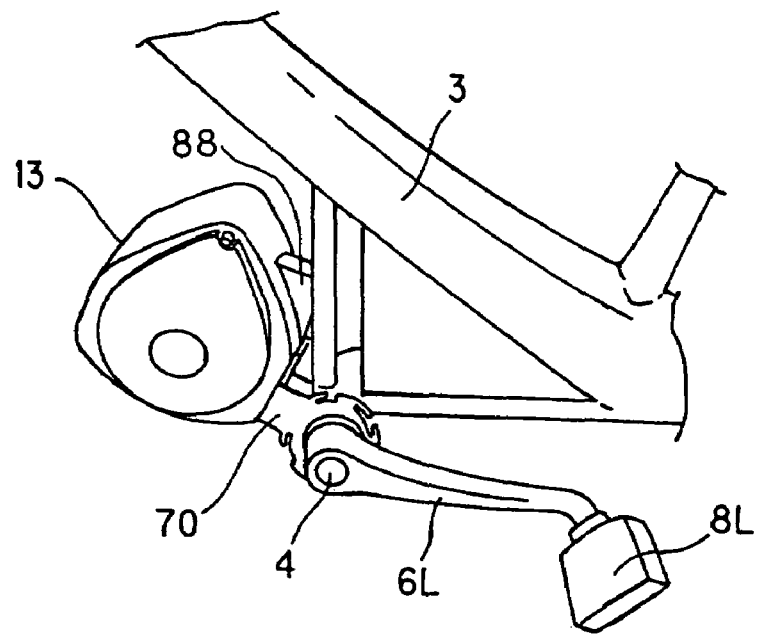
(b)
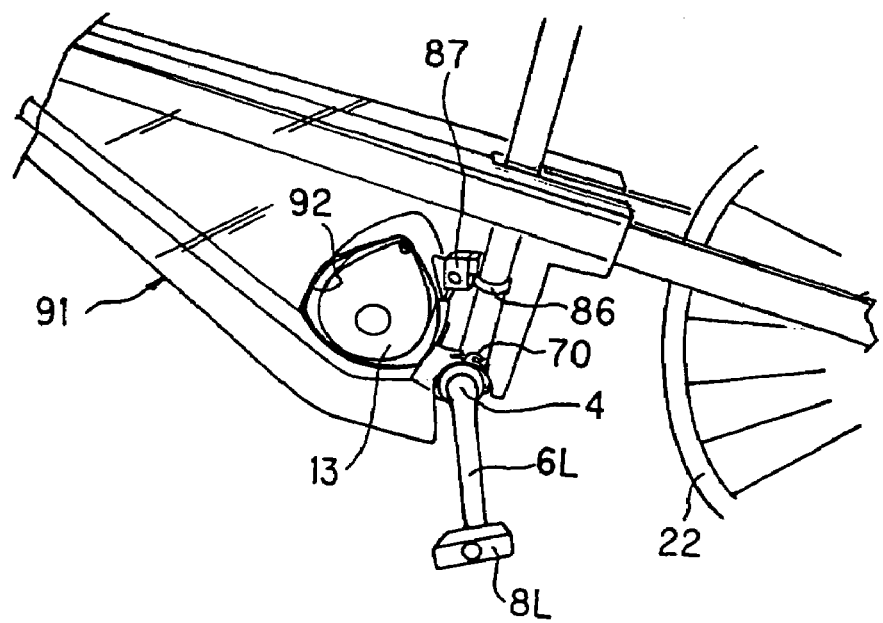

SERVER SYSTEM FOR DISTRIBUTING AN ELECTROMOTIVE POWER ASSISTED BICYCLE

CROSS-REFERENCE TO RELATED APPLICATIONS

This application is a National Stage of International Application No. PCT/JP2003/008483 filed 3 Jul. 2003, published in Japanese as WO 2004/006152 on 15 Jan. 2004, which claims the benefit of Japanese application number 2002-196953, filed 5 Jul. 2002. The disclosures of the above applications are incorporated herein by reference.

FIELD OF THE INVENTION

The present invention relates to a server system for distributing an electromotive power assisted bicycle, which enables, via a communication network, an on-line shopping or a rental service of the electromotive power assisted bicycle, the bicycle comprising a primary bicycle unit having a traveling function basically provided by a pedal effort, which is assembled together with components of an electromotive power assisting kit.

DESCRIPTION OF THE PRIOR ART

A conventional electromotive power assisted bicycle comprises units to be mounted on a bicycle body for providing an electromotive power assisting force, including at least a pedal effort sensor for detecting a pedal effort, a drive unit incorporated with a motor for outputting electromotive power, a force combining mechanism for combining the electromotive power output from the motor with the pedal effort, a battery for the motor, a bicycle speed sensor for detecting a speed of bicycle and the like. The units are typically bulky, and especially the pedal effort sensor using a bulky spring member that is expanded and contracted in response to a variation in the pedal effort makes it difficult to install it directly onto an ordinary bicycle frame, and so requires a bicycle body tailored for it. In this connection, those units for providing electromotive power assistance can be installed on a bicycle body at predetermined sites thereof with little freedom of selectivity. Further, a control program for controlling how the assisting electromotive power should be applied in response to the variation in the pedal effort and the bicycle speed is stored as a control program of a microprocessor disposed within the drive unit.

Besides, recently such an electromotive power assisted bicycle has been developed that has not only a single function as an electromotive power assisted bicycle for assisting the pedal effort, but also an additional function for reducing body fat mass and improving metabolic function of a bicycle rider simply through aerobic exercise, by applying an appropriate load to the bicycle (see Japanese Patent Laid-open Publication No. Hei 10-203467). This publication has disclosed an example that at least one of brake-applying units for a rear wheel is shared as a load-applying element for applying a load, in which an electromotive power assisting unit containing an electric motor is disposed in the vicinity of a crank shaft and the load-applying element represented by a hydraulic disc brake unit operating for the rear wheel is disposed in the vicinity of the rear wheel. In addition, such an electromotive power assisted bicycle has been additionally provided with another function for modifying a control program by operating a switch to make a variety of exercise patterns available to a rider.

However, in the business field of selling an electromotive power assisted bicycle according to the above-described prior art, the business only resides in selling a completed assembly of an electromotive power assisted bicycle having an electromotive power assisting unit installed in a tailored body in advance, and suffers from a problem of difficulty in configuring the bicycle frame, the electromotive power assisting unit to be installed on the bicycle frame, the positions of the respective components to be installed and the control program, precisely in conformity to a user's taste and/or purpose, consequently restricting a range of selection to be extremely narrow.

Also in the electromotive power assisted bicycle of such a type that enables aerobic exercise, there has been a fear due to its bulky load-applying element that the possibility in selection of not only the body frame but also the type of electromotive assisting units could be restricted.

Further, even if the control programs for respective exercise patterns were made selectable, the rider usually does not have a precise knowledge of his/her physical strength and health condition, and so a control program suitable for the rider could not always be selected. Further, it is also difficult to provide an operation in real time in response to any difference in physical strength or health condition in relation to a ride or rider, or in response to any change in physical condition during riding.

SUMMARY OF THE INVENTION

The present invention has been made in the light of the above-mentioned fact that only a fully-assembled electromotive power assisted bicycle has been conventionally available for sale, and an object thereof is to provide a server system for distributing an electromotive power assisted bicycle, which allows a unit sale of an electromotive power assisted bicycle capable of being responsive to individual purposes of use and tastes of a user.

To solve the problems described above, the present invention provides a server system for distributing an electromotive power assisted bicycle, that enables, via a communication network, an on-line shopping or a rental service of an electromotive power assisted bicycle comprising a primary bicycle unit having a traveling function basically provided by a pedal effort, which is assembled together with components of an electromotive power assisting kit, in which said electromotive power assisting kit comprises at least:
  a pedal effort detection means adapted to detect a pedal effort;
  a drive unit adapted to output electromotive power based on the detected pedal effort in accordance with a control program;
  a force-combining means for combining the output electromotive power with the pedal effort; and
  a battery for said drive unit, wherein a plurality of options are made available for at least one component of said electromotive power assisting kit, said server system for distributing an electromotive power assisted bicycle characterized in comprising:
  a control means;
  a communication means connectable to a user terminal via the communication network;
  a first searching means for searching bicycle information defining said primary bicycle unit; and
  a second searching means for searching electromotive power assisting information defining said electromotive power assisting kit, wherein said control means includes:

a first display function for indicating at least a part of said bicycle information in said user terminal;

a second display function for indicating at least a part of said electromotive power assisting information in said user terminal under a condition where some components of the electromotive power assisting kit having a plurality of options have been made available for a user to choose; and a designing function for creating design information so that, when either one of said components of said electromotive power assisting kit having a plurality of options is selected and determined in said user terminal, said electromotive power assisting kit containing said component of selected aspect can be assembled with said primary bicycle unit.

In this connection, the user terminal may include, for example, a personal computer, a cellular phone or a PHS, and the communication network may include any form of network which can communicate with those user terminals, including, for example, the Internet, an intranet or a local area network. Further, the server system for distributing an electromotive power assisted bicycle may be controlled by a server computer, for example.

According to the server system for distributing an electromotive power assisted bicycle of the present invention, for example, when a user accesses the server system for distributing an electromotive power assisted bicycle from his/her user terminal via a communication network, the first searching means of the server system searches for the bicycle information defining the primary bicycle unit and the second searching means searches for the electromotive power assisting information defining the electromotive power assisting kit. The first and the second searching means may be any storage means such as a hard disk in the server system and a DVD-ROM, or by a program executing function for searching for information on other webs via the Internet, or by both of them used in combination. Preferably, the bicycle information includes at least image data of the primary bicycle unit and data of dimension and position of each frame, and the electromotive power assisting information includes at least image data of said electromotive power assisting kit and data of geometry and dimension of the components of the electromotive power assisting kit.

Then, the control means of the server system accesses the user terminal via the communication network, and the first display function of the server system indicates at least a part of the bicycle information, such as the image data of the primary bicycle unit or a compressed image thereof in the user terminal. Further, the second display function, under a condition where the components of the electromotive power assisting kit having a plurality of options have been made available for a user to choose, indicates at least a part of the electromotive power assisting information, such as the image data of the electromotive power assisting kit or the compressed image thereof in the user terminal. Further, if a plurality of types of unit is made available for the primary bicycle unit, the first display function may indicate the bicycle information in said user terminal with the plural types of primary bicycle made available for a user to choose.

In this connection, when the user has selected and determined either one of the components of the electromotive power assisting kit having a plurality of options and/or the type of the primary bicycle unit in the user terminal, the designing function creates design information for assembling the electromotive power assisting kit containing the selected component together with the selected type of the primary bicycle unit. This design information is sent as an instruction to a supplier and/or an assembler to which an order for the electromotive power assisted bicycle is issued.

In this way, the present invention enables a sales or a rental service of the electromotive power assisted bicycle which is built up by assembling the electromotive power assisting kit, which has been selected by the user via the communication network, together with the desired primary bicycle unit, and thus provides a distributing service of a made-to-order electromotive power assisted bicycle that has been made in conformity with a user's specified preferences.

To extend the range of this service, preferably the server system of the present invention further comprises a third searching means for searching information about suppliers and assemblers of primary bicycle units, electromotive power assisting kits and the assembling thereof respectively, and a user information acquisition means for acquiring user information from said user terminal, wherein the designing function of the control means firstly issues an order for the primary bicycle unit and the electromotive power assisting kit, which have been selected by the user, to respective corresponding suppliers via a communication network, secondly sends information about the assembler to the respective suppliers via the communication network, and then sends the design instruction for assembling the electromotive power assisting kit together with the primary bicycle unit and the acquired user information to the assembler.

According to this aspect, firstly the third searching means searches for the information about the supplier and the assembler of the primary bicycle unit, the electromotive power assisting kit and the assembly thereof, respectively. The supplier of the primary bicycle unit may include a typical bicycle shop, for example. The supplier of the components included in the electromotive power assisting kit may include a parts-shop or a convenience store, in addition to a bicycle shop. Secondly, the user information acquisition means acquires the user information from the user terminal. In this regard, the user information represents such information that should be necessary in providing the electromotive power assisted bicycle to the user, including, for example, a name, an address and a phone number of the user. In addition, it may include a fax number, an E-mail address and the like of the user for the convenience of correspondence. Further, it may include information that is necessary for payment, including, for example, a credit card number and a user's preference on the form of payment, payment on arrival, transfer in bank account and the like.

Subsequently, the designing function of the control means issues the orders for the primary bicycle unit and the components of the electromotive power assisting kit, which have been selected by the user, to respective suppliers via the communication network. At that time, the information about the determined design instruction may be sent to the suppliers. Further, the information about the assembler may be sent to the respective suppliers via the communication network. This information about the assembler may include information that is necessary for shipping the components of the electromotive power assisting kit and the primary bicycle unit from the respective suppliers to the assembler, including, for example, an address, a name and a phone number of the assembler. Then, the server system is required to send the design instruction for assembling the electromotive power assisting kit together with the primary bicycle unit and the acquired user's information to the assembler. Thus, the assembler can completely make up the electromotive power assisted bicycle from respective components of the electromotive power assisting kit and the primary bicycle unit, which have been sent from the respectively suppliers, based on that design instruction and then deliver the completed electromotive power assisted bicycle to the user.

A currently most preferred aspect of electromotive power assisted bicycle for accomplishing the server system for distributing the above-described made-to-order electromotive power assisted bicycle is characterized in that the primary bicycle unit includes a one-way clutch means for connecting a drive shaft with a sprocket such that the rotating torque of the drive shaft substantially only in one direction is selectively transmitted to the sprocket, and the pedal effort detection means detects a physical quantity that varies in response to a deformation of the one-way clutch means caused by the pedal effort.

According to this aspect of the electromotive power assisted bicycle, since the physical quantity that varies in response to the deformation of the one-way clutch caused by the pedal effort, which is essential in an ordinary bicycle, is detected as an indicator of the pedal effort, it is no longer necessary to additionally install a bulky and heavy spring member for detecting the pedal effort. Therefore, this allows the electromotive power assisted bicycle to be completely built simply by installing individual components of the electromotive power assisting kit on any type of bicycle having an ordinary body frame, without limiting to dedicated bicycle frames. Thus, the present invention can extend a range of selectivity of the user significantly and provide an electromotive power assisted bicycle in conformity with a user's specified preferences.

More preferably, the one-way clutch means includes two torque transmission parts disposed adjacently to each other along the axial direction of the drive shaft, which are engagingly locked to each other during a rotation in one direction so as to extend a space between said two parts, and an elastic member disposed so as to resist against the extension in the space between the two torque transmission parts, wherein the torque detection means includes a strain sensor for detecting a strain in said elastic means. The one-way clutch means includes, by way of example, a ratchet gear comprising a torque transmission part having a rotatable pawl and another torque transmission part having a tooth to be engaged with this pawl during the rotation in one direction.

Preferably, a plurality of options that have been prepared for at least one of the components included in the electromotive power assisting kit relate to at least either one of type and position of installation of the component of the electromotive power assisting kit. In this regard, the type of the electromotive power assisting kit implies a concept including not only an exterior geometry of the electromotive power assisting kit but also an interior specification and performance thereof. At that time, the second display function provides an image display of the type of the electromotive power assisting kit. Further, when there is a difference in the interior specification, it may be indicated at the same time. More preferably, the second display function provides an image of a certain type of electromotive power assisting kit, which has been selected in the user terminal, superimposed on the image of the primary bicycle unit in a state where the kit is virtually assembled with the primary bicycle unit, so as to be displayed at the user terminal.

In one preferred example allowing the user to select the position of installation of the component of the electromotive power assisting kit, for example, if the user terminal is equipped with a mouse, the second display function may make the position of installation of the component of said electromotive power assisting kit in the image display selectable, by moving the specific component selected by a mouse click in accordance with a mouse drag so as to be displayed in a desired position.

In order to allow the user to finally make an optimal selection after a series of examination trials with different positions of installation and different types of the components of the electromotive power assisting kit, preferably, the designing function issues the design information after a notice that either one of the options of the electromotive power assisting kit having a plurality of options has been determined in said user terminal.

In order to exclude any unfeasible combinations in advance, preferably the designing function of the control means further comprises a determining function for determining whether it is possible for the component of the electromotive power assisting kit selected in the user terminal to be assembled with the primary bicycle unit, based on the bicycle information and the electromotive power assisting information and a notifying function for notifying the user terminal of the determination that it is impossible for the selected component of the electromotive power assisting kit to be assembled with the primary bicycle unit when the determining function has so determined. The unfeasible combination may include, for example, a case where the position of installation of the drive unit selected by the user is not acceptable for installation to the selected primary bicycle unit and/or a case where the drive unit selected by the user cannot connect with the force combining unit. In such unfeasible cases, the designing function may be linked with the second display means so as to inhibit the mouse drag from transferring the indicated component of the electromotive power assisting kit to the unfeasible position of installation.

Further, in order to assist ordering of the design by the user, preferably the designing function of the control means is adapted such that, if the component of the electromotive power assisting kit selected in the user terminal needs other components of the electromotive power assisting kit that have not been selected, the designing function may create design information for additionally assembling said required component of the electromotive power assisting kit together with said selected component. For example, if the selected drive unit is incorporated with a control program requiring data of a bicycle speed, design information instructs that a bicycle speed sensor should be included in the kit.

Alternatively, a plurality of options of the drive units may be prepared, wherein each aspect may include at least a different control program from each other. In that case, the drive unit may be identical in the exterior geometry and specification but not in the control program. As a set of plural different control programs, at least one of the following programs may be prepared, including a plurality of electromotive power assisting control programs for inducing a variation in an assist ratio relative to a bicycle speed in each different manner; an aerobic exercise control program enabling an aerobic exercise; a muscle exercise control program enabling muscle exercise; and a control program allowing for traveling exclusively using electromotive power. It is a matter of course that the purposes and the contents of the control operations of those control programs can be presented in the user terminal by the second display function. For example, there may be a control program with an assist ratio of 1.0 or higher specifically for the elderly or those with below average strength, and another program with an increasing assist ratio for applying a speed restriction.

Preferably, the drive unit controlled by the aerobic exercise control program or the muscle exercise control program selects either one of an electromotive power or a loading force based on at least the pedal effort detected by the pedal effort detection means so as to achieve a pedal effort level enabling an aerobic exercise, or a muscle exercise, and allows for either one of the electromotive power or the loading force to be added to the pedal effort via the force-combining means. For example, in the aerobic exercise control, in case of ascending on a slope, in which the detected pedal effort is likely to increase to be higher than said pedal effort level enabling the aerobic exercise, the drive unit provides an output control of the electromotive power such that the pedal effort could be maintained in said pedal effort level. This prevents muscle exercise, which otherwise should be induced from the rider's pedaling with a great pedal effort in response to the increased loading of the bicycle, thus allowing calories to be consumed. In case of descending traveling on a slope in which the detected pedal effort is likely to be lower than said pedal effort level for the aerobic exercise, the drive unit provides the control to increase the loading force until the detected pedal effort reaches said pedal effort level. This requests the rider to apply the pedal effort against the loading force to thereby induce calorie consumption. It is to be noted that the pedal effort level may encompass a certain range of pedal effort. In case of the muscle exercise control, the pedal effort level should be set higher as compared to that in the aerobic exercise control, and, for example, the control may be provided such that the rider can travel with a constant muscle power regardless of whether traveling on a slope or flat land.

Thus, in this aspect of the present invention, both of the loading force and the electromotive power can be output from the single drive unit. Therefore, the present invention not only allows an entire mechanism of the electromotive power assisted bicycle to be made simple and lightweight as compared to the prior art mechanism, in which the loading unit has been implemented as a bulky control unit separately from the electromotive power unit, but also minimizes a demand for a fabrication of a dedicated bicycle body frame and thus allows a rider to take advantage of an existing typical frame manufacturing process. Therefore, the present invention can extend a range of selectivity by the user significantly.

In one aspect to provide the loading force output from the drive unit, the drive unit has an electric motor and an electromagnetic clutch interposed between the electric motor and the force-combining means, wherein the loading force may be applied as a rotational resistance of the electric motor, which is produced by connecting the electric motor with the force-combining means through the electromagnetic clutch under a condition where the electric motor is not energized. In this way, since the means for providing the electromotive power and the means for providing the loading force are integrated in a single unit, the simplification of the bicycle body can be further advanced and thus the range of selectivity can be extended more. It is to be noted that, during the ordinary traveling in neither assisted operation mode nor aerobic exercise mode, the electromagnetic clutch can be released so that the loading force may not be applied to the motor.

There is a mode selectable for the battery, in which the battery can be charged by an electromotive force to be produced when the electric motor is rotated by a pedal effort against the loading force under a condition where the electric motor is not energized. According to this mode, the user's effort for charging the battery can be omitted.

As one of the components of the preferred electromotive power assisting kit, a human body parameter measuring means may also be prepared, wherein the drive unit may set a pedal effort level based on at least a human body parameter measured by the human body parameter measuring means and execute a control such that the detected pedal effort can represent the required pedal effort level.

In a preferred aspect, a set of plural types of parameter is prepared as the human body parameter, wherein the second display function of said control means indicates one or more of the plural types of human parameter to be selectable in the user terminal, and the designing function creates design information for assembling at least a human body parameter measuring means for measuring the selected human body parameter and a drive unit capable of executing a control based on the selected human body parameter with the primary bicycle unit. The human body parameter may include at least one of heart rate and blood pressure.

If the heart rate is selected as the human body parameter, then the drive unit sets the pedal effort level based on at least the heart rate detected by a heart rate detection means. For example, if the heart rate is higher, the set pedal effort level should be decreased, while on the contrary, if the heart rate is lower, then the set pedal effort level should be increased. This provides an adequate electromotive power assisting control in real-time response to the user's health condition at the beginning of riding, or a variation in physical strength in each rider or in physical strength condition during riding.

In the more preferred aspect of the present invention, the server system further comprises a physical strength/health information acquisition means for acquiring physical strength/health information of a user via the communication network, a program selecting means for selecting a control program or a parameter for the control program, which is most suitable for the user, based on the acquired physical strength/health information, and a program transmission means for transmitting the control program or the parameter for the control program, which has been selected by the program selecting means, to a user terminal via the communication network. In this aspect, any version upgrading to the control program would be feasible even after the electromotive power assisted bicycle has been distributed as a finished product, by downloading the control program received in the user terminal by means of the wired or wireless connection of the user terminal with the drive unit.

The physical strength/health information acquisition means may be represented by a physical checkup result input from the user terminal or an inquiry in the form of a user terminal questionnaire, and preferably the user terminal and the human body parameter measuring means are prepared as the components of the electromotive power assisting kit, in which the user terminal acquires the human body parameter measured by the human body parameter measuring means as the physical strength/health information of the user. Further, the (averaged) magnitude of the pedal effort detected by the pedal effort detection means and its variation over time could be the physical strength information of the rider. In this regard, it is preferred that the user terminal can download the control program or the parameter of said control program received from the program in the server system of the present invention to the drive unit of the electromotive power assisted bicycle of the user.

In the latter aspect, even during traveling, the control program or the parameter thereof can be updated based on the instruction from the server system, and this allows an adequate exercise responsive to the physical strength condition of the user to be performed in real time.

According to another aspect of the present invention, a server system further comprises a physical strength/health information acquisition means for acquiring physical strength/health information of a user via the communication network, and a program selecting means for selecting a control program or a parameter of the control program, which is most suitable for the user, based on the acquired physical strength/health information, wherein the designing function of the control means creates design information for downloading the selected control program or parameter of the control program to the drive unit. In this aspect, the user can select the drive unit that contains the downloaded control program suitable for the physical strength/health information of the user in the stage for selecting the components of the electromotive power assisting kit.

In a case where such a drive unit has been selected that stores the control program defining an extremely high assist ratio or allowing traveling only with the electromotive power, occasionally a motorbike driver's license may be necessary. To meet with such a requirement, the preferred aspect of control means further includes an ID entry function that, if any components of said electromotive power assisting kit that require proof of authorization are selected in a user terminal, indicates an entry screen for prompting the user to enter information representing an ID for the authorization in the user terminal, wherein the design information is issued only when the entered ID is verified. The authorization ID may contain such information as a license number that indicates the user is a license holder.

In order to allow for the above-described components of the electromotive power assisting kit to be assembled with the primary bicycle unit more easily and in a more flexible manner, preferably the drive unit may be mounted to the primary bicycle unit via a unit mounting bracket.

More preferably, the primary bicycle unit includes a drive shaft that is rotated by a pedal effort and a support section for supporting the drive shaft with a bearing, and the unit mounting bracket has a pair of side plates and a bottom plate connected to the pair of side plates, wherein the unit mounting bracket is secured to the support section with the drive shaft passing through the pair of side plates and with the supporting section clamped between the pair of side plates, and the drive unit is mounted on the bottom plate and thereby the drive unit is securely mounted to a bicycle body.

In this aspect, the unit mounting bracket is configured such that when the drive unit is installed on the electromotive power assisted bicycle via the unit mounting bracket, the bottom plate, onto which the drive unit is to be installed, can be held with its rotational position to be adjustable around the side holes of the side plates, through which the drive shaft extends. In that case, preferably, the unit mounting bracket is secured to the support section, with the drive shaft passing through the pair of side holes and with the supporting section clamped between the pair of side plates, by fastening it inwardly along the axial direction of the drive shaft. In this way, since the adjustment in the position of installation of the drive unit can be performed accurately and freely yet without any need for the dedicated frame, the present invention can extend the range of selection by the user for the position of installation of the drive unit.

When the user has selected and determined the position of installation of the drive unit, preferably the designing function of the control means creates the design information for instructing a mounting aspect and a position of the unit mounting bracket based on the selected options of the drive unit and the primary bicycle unit.

The primary bicycle unit has a primary sprocket that is rotatable for transmitting a pedal effort to a driving wheel, and the force-combining means includes a secondary sprocket that is rotatable coaxially with said primary sprocket, a power sprocket to be rotated by the drive unit, and an auxiliary chain stretched across between the secondary sprocket and the power sprocket. This configuration allows the power sprocket to be installed in a desired location so far as the location would not cause any interference of the power sprocket with the primary sprocket or other components of the body frame, thus extending the range of freedom for the installation of the drive unit. For example, the power sprocket can be disposed in any desired location in the circumferential direction with respect to the secondary sprocket (and thus the primary sprocket). Further, changing the length of the auxiliary chain can adjust the distance of the power sprocket from the secondary sprocket (and thus the primary sprocket) freely. Thus, the present invention allows the ordinary bicycle having no dedicated frames to be powered by electromotive force and consequently extends the range of selection by the user for the position of installation of the drive unit.

In that case, preferably the second display function provides an indication in which the auxiliary chain is stretched over the power sprocket of the drive unit located in the position defined by the installation condition of the drive unit. This can improve the recognition by the user relating to the exterior appearance of the bicycle with the electromotive power assisting kit fitted therein. The designing function of the control means determines a length of the auxiliary chain based on the selected options of the drive unit and the primary bicycle unit and creates the design information to be issued.

A preferred type of battery is mounted to a frame of the primary bicycle unit via a battery bracket, wherein the battery bracket includes a bracket member capable of detachably accommodating the battery and engagingly locking the accommodated battery by a key and a bracket retainer to be coupled with the bracket member so as to clamp the body frame. This configuration allows the bracket member to accommodate the battery in a detachable manner and to engagingly lock the battery with the key. This provides both easy operation in attaching and detaching of the battery, and a security function to prevent the battery from being stolen, and also allows addition of a preferred selection for the user. Preferably, the bicycle frame to which the battery bracket is secured is a seat post. It is a matter of course that the battery bracket may be secured to other locations on the bicycle frame, including a seat tube, for example. When the position of the battery is selected in the user terminal, the designing function of the control means creates design information for giving an instruction on the frame and the position in the frame for the battery bracket to be installed.

Preferably, a bicycle speed sensor for detecting a bicycle speed is further prepared as a component of the electromotive power assisting kit, wherein the speed sensor includes a ring magnet having a generally flat surface on which a plurality of magnet segments are formed so as to induce a magnetic field that varies spatially at a constant angular interval along a circumferential direction over the surface, said ring magnet capable of being installed so as to rotate coaxially with the section subject to the detection, a magnetic field detection means for detecting a magnetic field in a fixed location adjacent to a surface of the ring magnet, and a signal processing means for detecting a rotational speed of the section subject to the detection or a physical quantity relating thereto based on a magnetic field signal detected by the magnetic field detection means. Preferably, the section subject to the detection represents a rotational part within the drive unit, and in that case, the speed sensor has been previously installed within the drive unit.

A control switch for operationally providing an ON-OFF command for operation of the drive unit is further prepared as the component of the electromotive power assisting kit, wherein the control switch is initially in a neutral mode, defining neither an ON-mode nor an OFF-mode, and being adapted to return to the neutral mode position after the shifting operation either to the ON-mode position or to the OFF-mode position. In this configuration, even if the control switch is shifted from the neutral mode position to either the ON-mode position or the OFF-mode position, the switch should return to its initial neutral mode position without fail after completing the shifting operation. Accordingly, even in case of the power supply being turned off for any reason, the user should simply follow the procedure for turning on the power supply for the first time and execute the switching operation from the neutral mode to the ON-mode in order to turn on the power supply again. Further, the present invention eliminates the situation of power supply being turned off during the ON-mode. This may enable selection of a user-friendly electromotive power assisted bicycle for the user.

In addition, a cover housing for covering an area defined by components of the frame of the primary bicycle unit is further prepared as the component of the electromotive power assisting kit, wherein the second display function further provides an indication in which the area to be covered by the cover housing can be designated in the user terminal, and the designing function further creates design information for assembling the cover housing suitable for covering the area designated in the user terminal with the primary bicycle unit.

Firstly, the user designates in the user terminal the area to be covered with the cover housing. In one example, when the user uses a computer mouse to select some of the components of the frame in the primary bicycle unit image displayed on the user terminal, the control means of the server system determines that the area enclosed by the selected components of the frame define the area to be covered with the cover housing. Then, the designing function executes an arithmetic operation for the design information, including a dimension of the cover housing, for example, used to assemble the cover housing suitable for covering the designated area with the primary bicycle unit. Preferably, the designing function allows design of a geometry and dimension of the cover housing suitable for covering the enclosed area designated in the user terminal based on at least the frame of the primary bicycle unit and a physical relationship relative to other components of the electromotive power assisting kit. For example, if a portion of the drive unit protrudes beyond the cover housing, the designing function creates the design information for making a hole in a site of protrusion.

Preferably, the second display function of the control means provides an indication in which at least one of a color, a transparency and a type of decoration of the cover housing can be selected by a user. This allows provision of an electromotive power assisted bicycle meeting with the user's preferences.

According to a second aspect of the present invention, there is provided a server system for distributing an electromotive power assisted bicycle that enables, via a communication network, an on-line shopping or a rental service of an electromotive power assisted bicycle comprising a primary bicycle unit having a traveling function basically provided by a pedal effort, which is assembled with components of an electromotive power assisting kit, in which a plurality of types of said primary bicycle unit is prepared, and said electromotive power assisting kit comprises at least:
a pedal effort detection means adapted to detect a pedal effort;
a drive unit adapted to output an electromotive power based on the detected pedal effort in accordance with a control program;
a force-combining means for combining the output electromotive power with the pedal effort; and
a battery for said drive unit, said server system for distributing an electromotive power assisted bicycle characterized in comprising:
a control means;
a communication means connectable to a user terminal via the communication network;
a first searching means for searching bicycle information defining said primary bicycle unit; and
a second searching means for searching electromotive power assisting information defining said electromotive power assisting kit, wherein said control means includes:
a first display function for indicating at least a part of said bicycle information in said user terminal under a condition where a plural types of primary bicycle unit have been made available for a user to choose;
a second display function for indicating at least a part of said electromotive power assisting information in said user terminal; and
a designing function for creating design information such that, when either one of said plural types of primary bicycle unit is selected in said user terminal, respective components of said electromotive power assisting kit can be assembled with said selected type of said primary bicycle unit.

In the second aspect of the present invention, even if the respective components of the electromotive power assisting kit are defined in a black box to the user, once the user simply selects the primary bicycle unit, then the server system automatically selects the type, position of installation and dimension of each component of the electromotive power assisting kit suitable for the selected primary electromotive power assisted bicycle and issues an instruction for assembling those components of the electromotive power assisting kit together with the selected primary bicycle unit.

Thus, according to the present invention, such an advantageous effect may be obtained that the unit sales system of the electromotive power assisted bicycle capable of dealing with the purpose of use and the taste of the user with a wide range of flexibility can be achieved.

Other objects and advantages of the present invention will be clearly understood by reading the following description on preferred embodiments of the present invention with reference to the attached drawings.

BRIEF DESCRIPTION OF THE DRAWINGS

FIG. 9 is a diagram showing a force combining mechanism of FIG. 8, wherein FIG. 9(a) is an enlarged front elevation view thereof viewed from the reverse side of the primary sprocket and FIG. 9(b) is a side sectional view thereof, respectively;

FIG. 11 is a top plan view and a side elevation view of an NS polarized ring magnet serving as one component of a rotational speed sensor to be assembled in an electromotive power assisted bicycle;

FIG. 12 is a front elevation view showing the rotational speed sensor that has been built up by mounting the NS polarized ring magnet of FIG. 11 onto a surface of a gear and a side sectional view taken along the vertical line of the rotational speed sensor;

FIG. 14 shows a waveform representing a variation over time in magnetic field signal detected by the Hall IC disposed adjacent to the NS polarized ring magnet;

FIG. 18 is a diagram showing an example of an anti-rotation means for inhibiting the relative rotation of the pawl with respect to the drive shaft, wherein FIG. 18(a) is a top plan view of general configuration of a ball spline, FIG. 18(b) of a spline key and FIG. 18(c) of a key slot, respectively;

FIG. 19 is a diagram illustrating a specific process of control and its result for traveling on an exemplary illustrated road in the process of FIG. 6, wherein FIG. 6(a) relates to the control without a heart rate taken into account and FIG. 6(b) relates to the control with the heart rate taken into account, respectively;

FIG. 21 is a schematic diagram of a push-button type control switch representing a different type from the lever type control switch of FIG. 20;

FIG. 22 is a top plan view and a side elevation view of a unit mounting bracket according to a first embodiment of the present invention for installing a drive unit onto a body frame, which is used in an electromotive power assisted bicycle according to an embodiment of the present invention;

FIG. 23 is a schematic perspective view illustrating a procedure for installing the unit mounting bracket shown in FIG. 22 onto the body frame, wherein FIG. 23(a) shows a state where the bracket has been initially aligned with a drive shaft receiving hole and FIG. 23(b) shows a state subsequent to the state of (a), where the drive shaft, a crank shaft and the drive unit have been installed;

FIG. 24 is a schematic perspective view illustrating a state where the unit mounting bracket has been installed onto a different type of body frame in an upright position, wherein FIG. 24(a) shows the installation without a cover housing and FIG. 24(b) shows the installation with the cover housing.

DESCRIPTION OF THE PREFERRED EMBODIMENTS

[Server System for Distributing an Electromotive Power Assisted Bicycle]

Figure 1:
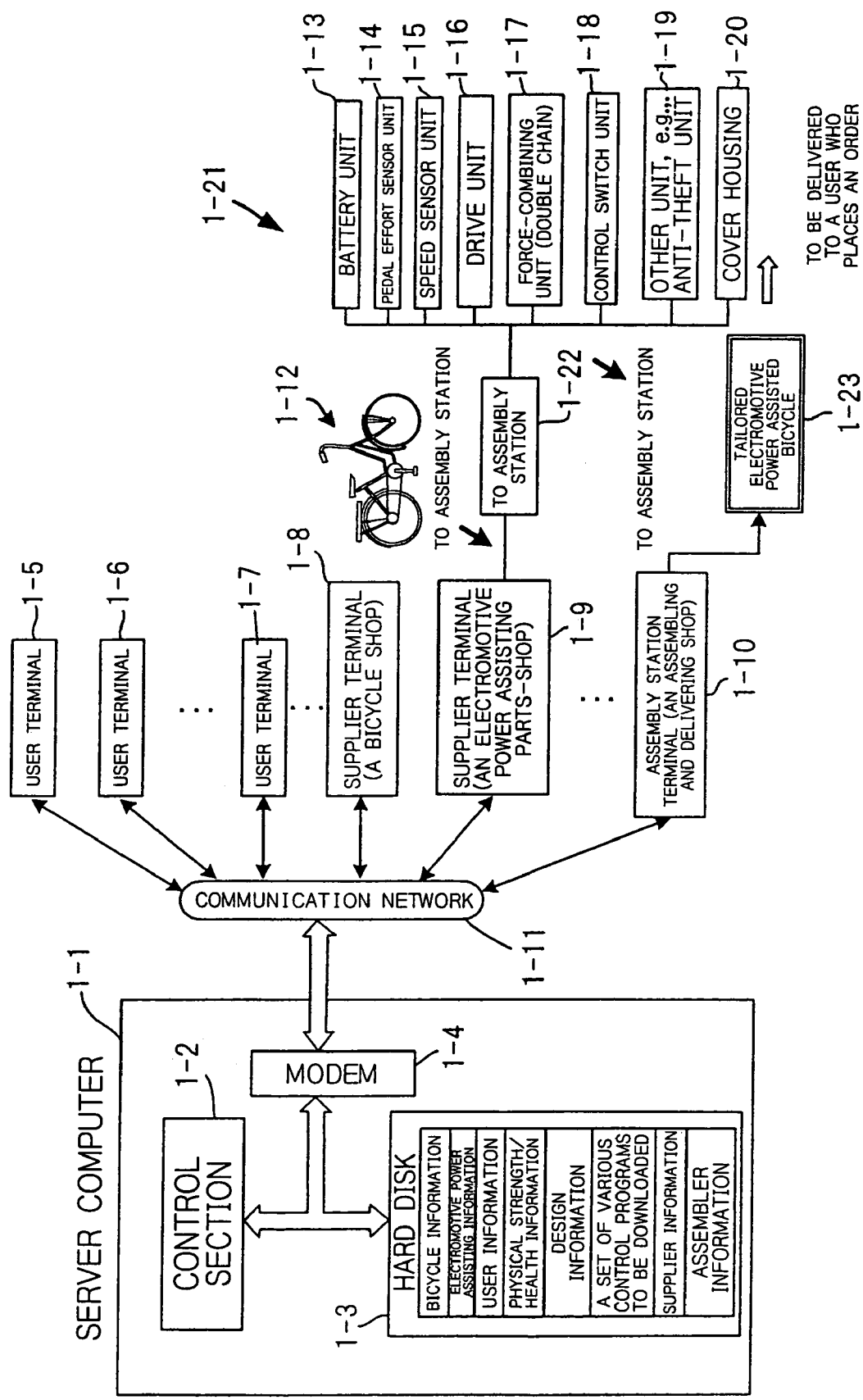
FIG. 1 is a schematic block diagram illustrating a system of a server computer for distributing an electromotive power assisted bicycle according to an embodiment of the present invention.

FIG. 1 shows a general configuration of a server computer system for distributing an electromotive power assisted bicycle. As illustrated, a server computer 1-1 comprises a control section 1-2 for providing general control and management of the computer, a hard disk 1-3 for storing a set of a variety of information for distributing an electromotive power assisted bicycle and a modem 1-4 enabling a connection to be established over a communication network to a variety of terminals. The hard disk 1-3 contains bicycle information, electromotive power assisting information, user information, physical strength/health information, a set of many different control programs to be downloaded, information about a supplier to which an order is issued, information about an assembly station and so on, which will be described later in detail. Those stored contents may be updated by storing into the hard disk 1-3 from any external storage media or by retrieving from different terminals 1-5, ... 1-10 via a communication network 1-11 and/or from a site on the Internet by using a searching function of the control section 1-2.

This server computer 1-1 enables, via a communication network, an on-line shopping or a rental service of an individually tailored electromotive power assisted bicycle 1-23 comprising an ordinary primary bicycle unit 1-12 having a traveling function basically provided by a pedal effort, which is further assembled with components of an electromotive power assisting kit 1-21 in response to an order from a user. In order to achieve this function, the server computer 1-1 contains a program installed therein, which has the same function as or a similar function to that in a server computer for a provider to allow a personal computer in each home to have access to the Internet, for example.

The electromotive power assisting kit 1-21 includes a battery unit 1-13, a pedal effort sensor unit 1-14 for detecting a pedal effort of a rider, a speed sensor unit 1-15 for detecting a bicycle speed, a drive unit 1-16 for outputting an electromotive power based on the detected pedal effort and bicycle speed in accordance with the control program, a force-combining unit 1-17 for combining the electromotive power output from the drive unit with the pedal effort, a control switch unit 1-18 for operationally providing an ON/OFF command of an operation of the drive unit, an anti-theft unit 1-19 and a cover housing 1-20 for covering an enclosed area surrounded by frame, all of which will be described later in detail. Some components of the electromotive power assisting kit 1-21 can be installed to the body frame or the like of the primary bicycle unit 1-12 by using, for example, a universal basket 1-22.

The terminal connectable to the server computer 1-1 includes a user terminal 1-5, 1-6, . . . , 1-7, . . . , used by a user who wishes to make an on-line shopping of an electromotive power assisted bicycle, a supplier terminal 1-8 located in, for example, a bicycle shop that is selling the primary bicycle unit 1-12, a supplier terminal 1-9 located in, for example, a parts-shop that manufactures components of the electromotive power assisting kit 1-21, and an assembler terminal 1-10 located in a shipping center where the components of the electromotive power assisting kit 1-21 are assembled with the primary bicycle unit 1-12 and thus assembled product of a tailored electromotive power assisted bicycle 1-23 is delivered to the user.

The user terminal 1-5, 1-6, . . . , 1-7 may include, for example, a personal computer or a server computer installed in each home, company or any places dedicated for the sales or rental service of the electromotive power assisted bicycle, and additionally includes a personal data assistant such as a cellular phone and PHS. The supplier terminals 1-8 and 1-9 and the assembly station terminal 1-10 may include similar devices to those designated above.

It is to be noted that the communication network implies all types of communication networks enabling data transmission with other terminals, including the Internet, an intranet and a local area network. In this regard, the Internet is accessed from the user terminal typically after communication has been established with the server computer in the provider via a phone line, and the communication network 1-11 depicted in FIG. 1 comprehensively covers any of such situations.

One example of the on-line shopping of the tailored electromotive power assisted bicycle by the user terminal will now be described.

Figure 2:
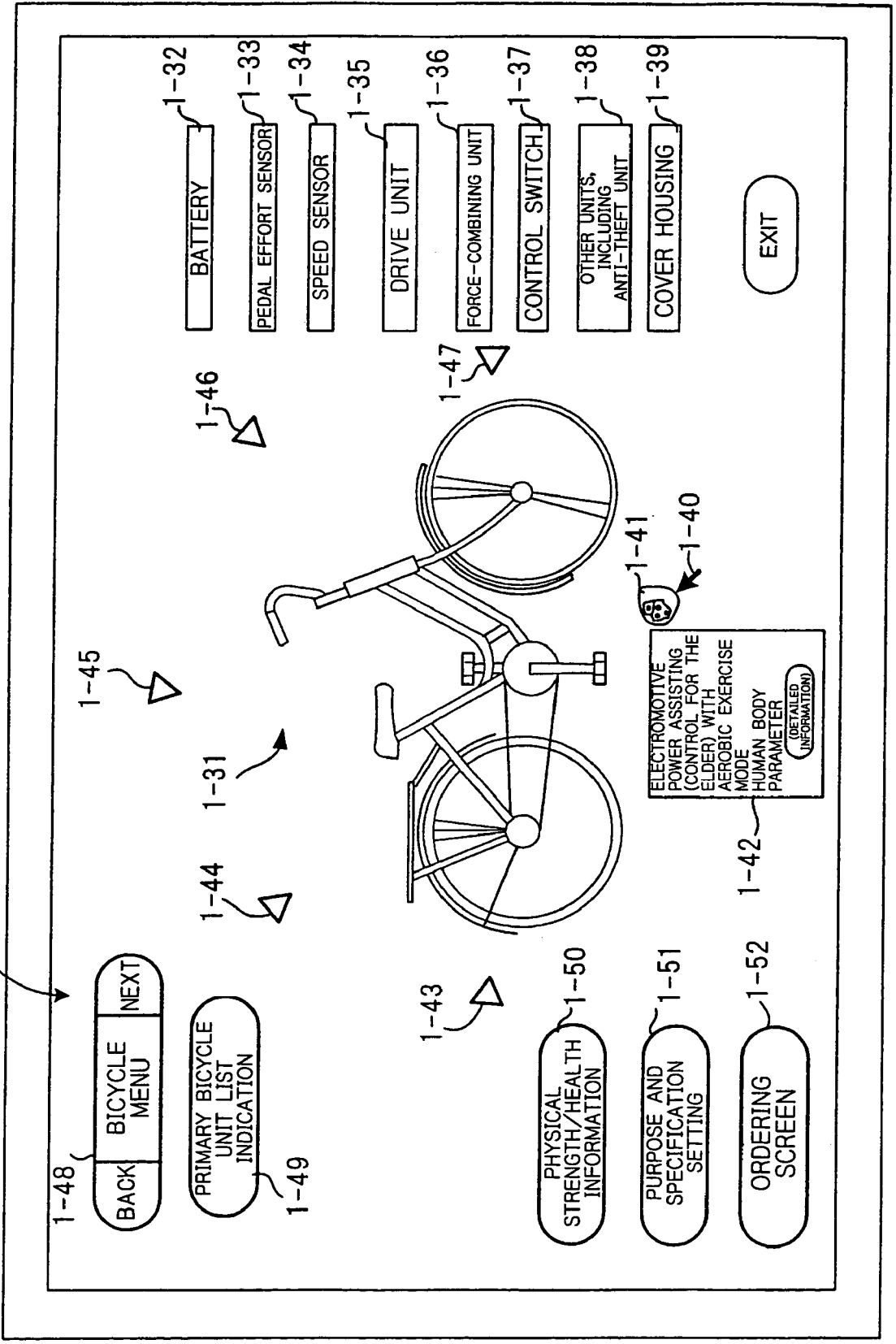
FIG. 2 is a schematic diagram showing an example of a selecting screen indicated in a user terminal when a user is communicating with the server computer of FIG. 1 through the user terminal to build an electromotive power assisted bicycle.

FIG. 2 shows a selection screen 1-30 for the tailored electromotive power assisted bicycle 1-23 indicated in a display of the user terminal 1-5, 1-6, 1-7, . . . . This selection screen 1-30 may appear by, for example, making an access from the user terminal via the Internet to a home page for distributing the tailored electromotive power assisted bicycle provided by the server computer 1-1.

The bicycle information in the hard disk 1-3 of the server computer 1-1 contains at least image data, data on dimension and position of each frame and specification data of each one of many different types of primary bicycle unit. Further, the electromotive power assisting information in the hard disk 1-3 includes at least image data, data on geometry and dimension and specification data of the electromotive power assisting kit, or each of those components including the battery, the pedal effort sensor, the speed sensor, the force-combining unit, the control switch, and other units such as the anti-theft unit and the cover housing. In response to a request from a user who has opened the selection screen 1-30 in the user terminal, at least a part of the bicycle information and the electromotive power assisting information is read out from the hard disk 1-3 of the server computer and forwarded to the user terminal, either in response to the user request, or automatically.

As a user selects a bicycle menu icon 1-48 on the selection screen 1-30 with a mouse, either one of the bicycle images 1-31 (which may be a compressed image) contained in the transferred bicycle information is indicated. Further, information relating to a specification of the indicated primary bicycle unit may be also displayed at the same time. As the user selects "NEXT" from the menu icons 1-48, bicycle images of different types are sequentially displayed on the screen. If the user selects "BACK", then the indication returns to the previously shown bicycle images in a sequential manner. Otherwise, if a primary bicycle unit list indication icon 1-49 is selected, a set of many different types of bicycle images in reduced size is displayed, and then if one of them is selected, an enlarged image of the selected image is displayed such as, for example, the image 1-31, with the rest of the images deleted. Besides, directional indication icons 1-43, . . . , 1-47 are arranged in a peripheral region with respect to the bicycle image on the selection screen 1-30. If one of the directional indication icons 1-43, . . . , 1-47 is selected, then the image of the electromotive power assisted bicycle viewed from the direction designated by the icon is indicated on the screen. For example, if the top directional indication icon 1-45 is selected, the image of the primary bicycle unit 1-31 viewed from the top is indicated. Thus, the user can select his/her desired primary bicycle unit easily.

The selection screen 1-30 further contains a set of selection icons 1-32, 1-33, 1-34, 1-35, 1-36, 1-37, 1-38 and 1-39 for the electromotive power assisting kit or its components including the battery, the pedal effort sensor, the speed sensor, the force-combining unit, the control switch, and another unit, such as the anti-theft unit and the cover housing, respectively. If either of those icons is selected, the image of the selected component of the electromotive power assisting kit (which may be a compressed image) and a detailed specification thereof is indicated. At this time, another window may be activated so as to allow the information of the electromotive power assisting kit to be indicated in that window. When the component of the electromotive power assisting kit having plural types of variation is selected, a selection screen is indicated to prompt the user to designate which type of component is to be selected.

For example, if the selection icon 1-35 for the drive unit is selected, an image of the drive unit 1-41 and an information window thereof 1-42 are displayed on the selection screen 1-30. Preferably, the drive unit image 1-41 should be an compressed image of the actual drive unit, and a dimension of the image shown on the screen should be indicated in the same scale as that applied to the dimension of the bicycle image 1-31 shown on the screen.

The information window 1-42 contains a brief description of a control program of the selected drive unit 1-41. Looking into FIG. 2 by way of example, there is an indication of "Electromotive power assisting (control for the elder)" (control with higher ratio of assistance). If this item is further selected, the window switches its indications sequentially, and as such it displays the indications of "Electromotive power assisting (control for the young)" (control with lower ratio of assistance), "Electromotive power traveling control" (switchable between traveling-only-with-electromotive-power mode and traveling-only-with-pedal-effort mode), . . . , . Further, if the indication of "With aerobic exercise mode" is selected, the window displays the indications sequentially, which are switched to "Without aerobic exercise mode", "With muscle training exercise mode", and to "With both modes of aerobic exercise and muscle training exercise".

Further, a human body parameter to be considered in the electromotive power assisting control (including aerobic exercise and muscle training exercise) is also selectable. The human body parameter may include, for example, heart rate, blood pressure and so on. If the human body parameter is selected, a sensor for measuring the selected human body parameter is automatically selected as the component of the electromotive power assisting kit. In this case again, a sensor image appears on the screen, and any modifications of the position of installation thereof is allowed within a possible range.

To know the information in more detail, selecting a detailed information icon in the information window 1-42 displays, for example, the contents of the electromotive power assisting control that has taken the human body parameters into account, such as a graphical indication of a variation in assist ratio relative to a bicycle speed, and/or a detailed description of the aerobic exercise.

To determine the contents of the selected control, the user brings a mouse pointer 1-40 into the information window 1-42 and gives a right-click, for example, and then the selected control program is determined. At this time, if the speed sensor has not yet been selected, in spite of the fact that the control program using the bicycle speed has been selected in the electromotive power assisting control, then the control section 1-2 of the server computer 1-1 either selects automatically the speed sensor or provides an indication notifying that the speed sensor is necessary on the selection screen 1-30 to thereby prompt the user to select a speed sensor selection icon 1-34. This speed sensor may be disposed within the drive unit, and in that case, since the user needs not be conscious of the point of exterior appearance or function, the speed sensor may be removed from a group of the selection items on the selection screen 1-30. If the group of selection items includes the speed sensor, then in one example, the screen may provide a selection on whether or not the speed meter for indicating the bicycle speed should be mounted.

Further, a physical specification for the drive unit 1-41, including, for example, a maximum output value, a weight, a dimension and a cost of an electric motor incorporated in the drive unit may be displayed in the information window 1-42, and in that case, some items may be prepared to be selectable.

Further, if a plurality of geometries of the drive unit 1-41 has been prepared for selection, respective geometries are sequentially displayed by the user's operation to bring the mouse pointer 1-40 onto the drive unit image 1-41 and then to click sequentially, and a specific geometry is determined by a right-click, so that a drive unit having a desired geometry for the user can be selected.

Further, the user is allowed to move the drive unit image 1-41 to any desired location by a mouse drag. For example, giving firstly a mouse drag to an allowable installation position of the drive unit in the bicycle image 1-31 and then, for example, a double-click thereto may allow the drive unit to be displayed as it has been installed in that position. In this way, the user can designate the position of installation of the component of the electromotive power assisting kit. In the selection of the position of installation, the server computer 1-1 firstly retrieves the bicycle information and the drive unit information, secondly determines whether or not the selected position of installation is acceptable with no interference involved, based on the physical relationship with the frame of the selected primary bicycle unit and the information about the shapes and dimensions of the drive unit and other components of the electromotive power assisting kit, and if an unacceptable position of installation has been selected, notifies the user of that fact on the indication screen. Preferably, the drag movement should be restricted such that the drive unit image 1-41 can not be moved onto any unacceptable position of installation. This may help the user give a fine-adjustment to the position of installation within an acceptable range of installation of the drive unit image 1-41.

As for each of other components of the electromotive power assisting kit, especially the battery, the control switch, and the anti-theft unit, the user is also allowed to select the aspect thereof including the position of installation and the type (performance, geometry, dimension, exterior appearance) of the component depending on the characteristics of each component.

As for the cover housing 1-39, in one example, if giving mouse clicks on some of the components of the frame of the displayed bicycle image 1-31, the control section 1-2 of the server computer 1-1 determines that an area enclosed by the components of the frame that have been designated by the mouse clicking defines an area to be covered with the cover housing. An operation for creating a design is performed to determine the geometry and dimension of the cover housing suitable for covering the enclosed area designated in the user terminal based on at least the selected frame of the bicycle and the physical relationship with other components of the electromotive power assisting kit, and the created design is provided on the selection screen. For example, if a part of the drive unit is protruding beyond the cover housing, the displayed design includes a hole created for the protruding portion. This allows the user to have a knowledge of the approximately actual exterior appearance of the tailored electromotive power assisted bicycle.

Further, at least either one of a color, transparency and a type of decoration may be selectable. This enables the electromotive power assisted bicycle satisfying the user's preferences to be provided.

Since the force combining unit is an essential component but transparent for a user, it may be deleted from the group of selection items in the selection screen 1-30 on the assumption that a double chain system should be employed and accordingly assembled with related components, which is currently considered to be most preferable and will be described later. For the double chain system to be employed, the display may provide a second chain in different length depending on the position of installation of the drive unit.

As for the pedal effort sensor again, since it is an essential component but transparent for a user, it also may be deleted from the group of selection items in the selection screen 1-30, on the assumption that a ratchet gear type pedal effort detection system should be employed and accordingly assembled with related components, which is currently considered to be most preferable and will be described later.

As the respective components of the electromotive power assisting kit are selected sequentially as explained above, the control section 1-2 of the server computer 1-1 stores the types of the selected bicycle and the components of the electromotive power assisting kit as well as the position of installation and the orientation of the components of the electromotive power assisting kit in the hard disk 1-3 as design information. Further, the dimension and the way of installation of a universal basket 1-22 that will be necessary in the assembling to the selected bicycle body is incorporated in the design information.

Although some of the components of the electromotive power assisting kit are selectable by the user in the above example, the system may limit the user to selecting the primary bicycle unit. In this case, the electromotive power assisting kit is determined in advance, and the control section 1-2 of the server computer 1-1 performs an operation relating to the design information for assembling the components of the predetermined electromotive power assisting kit to the selected primary bicycle unit.

Further, if a click is given on a purpose and specification setting icon 1-50, some input items relating to a plurality of purposes and specifications appear on the screen, and clicking on either one of the items may cause the server computer 1-1 to automatically select the components of the electromotive power assisting kit in conformity with the purpose and the desired specification, without the user consciously selecting those components of the electromotive power assisting kit.

Further, for example, if the electromotive power assisting control with the higher ratio of assistance or the control for enabling the traveling with the electromotive power only is selected, which may further need an authorization for the operation of the tailored electromotive power assisted bicycle, the system may be adapted to provide an authorization screen in order to verify a driver's license or the like. On the authorization screen, an authorized ID (i.e., the data that can provide a unique verification to confirm that the user is an identified person and holding a license) is input. In case of falsehood or no entry on this authorized ID, the selecting operation of the component of this type of electromotive power assisting kit is disabled.

After the user has made a selection of the primary bicycle unit and/or all of the components of the electromotive power assisting kit in either one of the ways as described above, when the user selects on an ordering screen icon 1-52 with a mouse, then the form of assembling is determined to trigger the switching to the ordering screen. The ordering screen provides a price of the configured tailored electromotive power assisted bicycle, followed by the items to be entered, prompting the user to input the name, address, telephone number and form of payment. After confirming the entries of those items, the server computer 1-1 sends an order for the primary bicycle unit selected by the user to the terminal 1-8 in the bicycle shop via the communication network 1-1. The server computer 1-1 further sends an order for the electromotive power assisting kit to be assembled with the primary bicycle unit to the terminal 1-9 in the parts-shop, via the communication network 1-11. At the same time, the information about the company name, address, telephone number and the like of the assembly station is also sent to the terminals 1-8 and 1-9. In addition, the design information and the shipping destination of the user are sent to the terminal 1-10 in the assembly station. Thus, the assembly station, based on the design information, now can complete the assembly of the electromotive power assisted bicycle from the components of the electromotive power assisting kit and the primary bicycle unit, which have been delivered from the respective suppliers, and be ready to deliver the finished product to the user.

Further, the server computer 1-1 allows not only for the assembling of the tailored electromotive power assisted bicycle but also for any version upgrading to the tailored electromotive power assisted bicycle as the finished product already obtained by the user. For example, it is preferred that the drive unit stores the data on the pedal effort detected by the pedal effort sensor and/or the human parameter such as the detected heart rate in the memory. The former represents physical strength information, and the latter represents health information. For example, the selection screen 1-30 contains a physical strength/health information icon 1-50, and if this icon is selected, the user terminal retrieves the physical strength/health information of the rider from the memory of the drive unit by a wireless or wired transmission and sends the information automatically to the server computer 1-1. Alternatively, the user terminal may transmit the physical strength/health information periodically to the server computer 1-1. This enables the server computer 1-1 to select the suitable control program in accordance with physical strength/health information of the rider. For example, a corresponding relationship between the levels in physical strength/health information and the different control programs is stored in the hard disk 1-3 in a form of Table, and in that case, the control section 1-2 may select the control program corresponding to the level in the received physical strength/health information and send it to the user terminal automatically. The user terminal downloads the received control program into the drive unit to thereby allow traveling suitable for the physical strength/health of the user. Implementing the user terminal by a personal data assistant attachable to the bicycle can provide traveling performance adapted to the physical strength that will be changed in real time during riding of the bicycle. Further, other applications of the bicycle may be feasible, including physical recovery and rehabilitation exercise of the rider, in which the server computer 1-1 is connected to a terminal of a user's physician or to a control center of a hospital via the communication network 1-11 wherein the pedal effort in the control program will be set later under the diagnostic instruction from the physician in charge or the bicycle will be used under supervision of the physician.

The following description discloses preferred options of a completed tailored electromotive power assisted bicycle, respective components of the electromotive power assisting kit, and an example of the universal basket 1-22, with reference to the drawings.

[Tailored Electromotive Power Assisted Bicycle]

Figure 3:
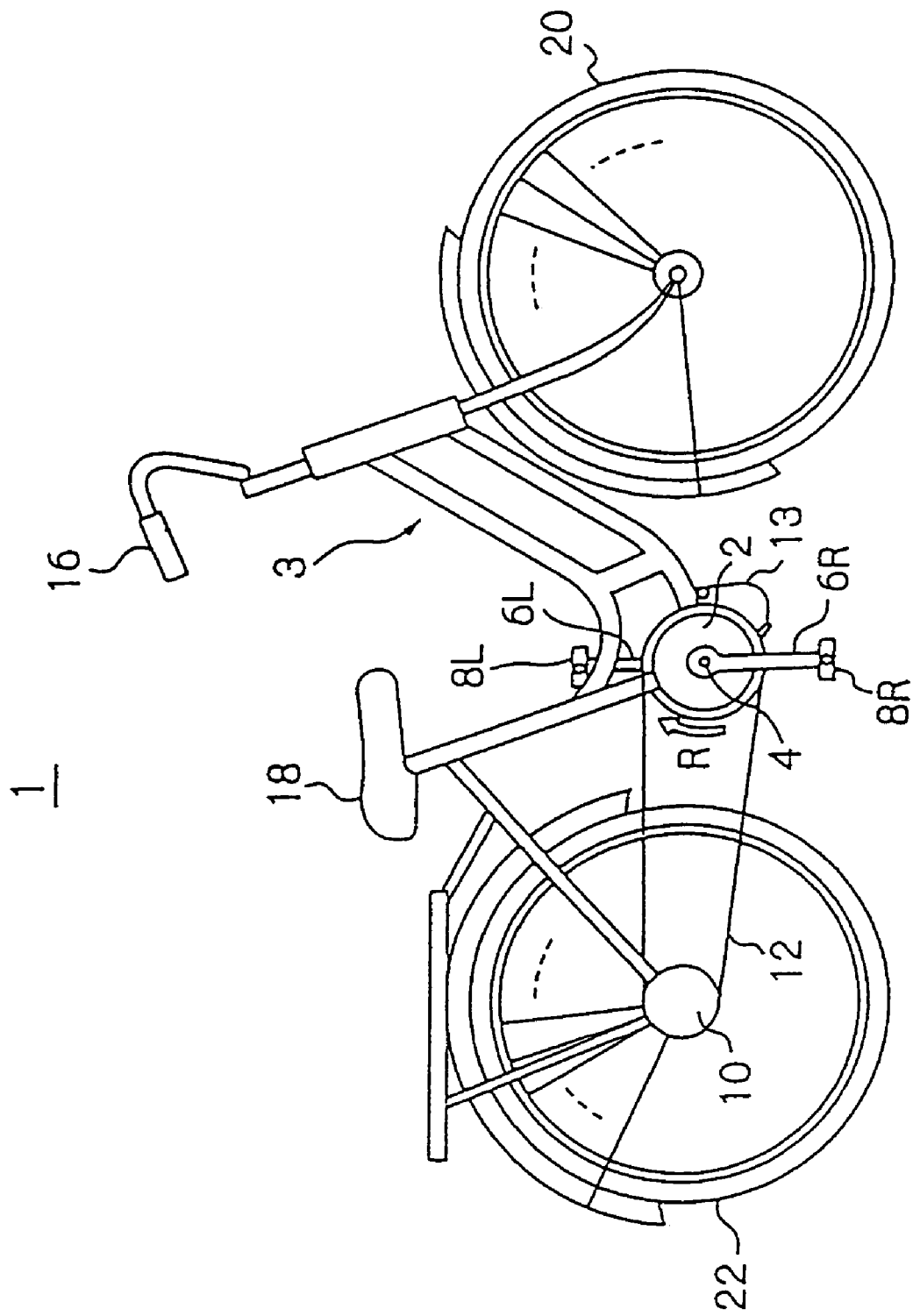
FIG. 3 is a schematic diagram of a tailored electromotive power assisted bicycle presented by a server computer for distributing an electromotive power assisted bicycle according to the present invention.

FIG. 3 shows a general configuration of the "my" electromotive power assisted bicycle 1 enabling the electromotive power assisting control and the aerobic exercise. As shown in FIG. 3, a main framework of this electromotive power assisted bicycle 1 comprises, similarly to an ordinary bicycle, a body frame 3 made of metal pipe, and to said body frame 3 are mounted a front wheel 20, a rear wheel 22, a handle 16 a saddle 18 and so on in a known manner.

Further, a drive shaft 4 is rotatably supported in a lower central portion of the body frame 3, and a left and a right end of the drive shaft 4 are fitted with pedals 8L, 8R via crank bars 6L, 6R, respectively. This drive shaft 4 is coaxially fitted with a primary sprocket 2 via a one-way clutch (see 99 in FIG. 9(*b*), which will be described later) for transmitting the revolution exclusively in the R direction corresponding to the forward driving direction of the body. An endless chain 12 is stretched across between this primary sprocket 2 and a rear wheel power mechanism 10 disposed in a central location of the rear wheel 22.

The electromotive power assisted bicycle 1 of the present embodiment can run in either one of an aerobic exercise mode enabling a rider to perform an aerobic exercise during traveling, or an electromotive power assisting mode for traveling by the pedal effort with the assistance of the electric force according to at least an assisting ratio (assisting electric force/pedal effort) determined based on the bicycle traveling speed and the pedal effort, or a normal operation mode representing an application as an ordinary bicycle added with no electric force or loading force.

Figure 4:
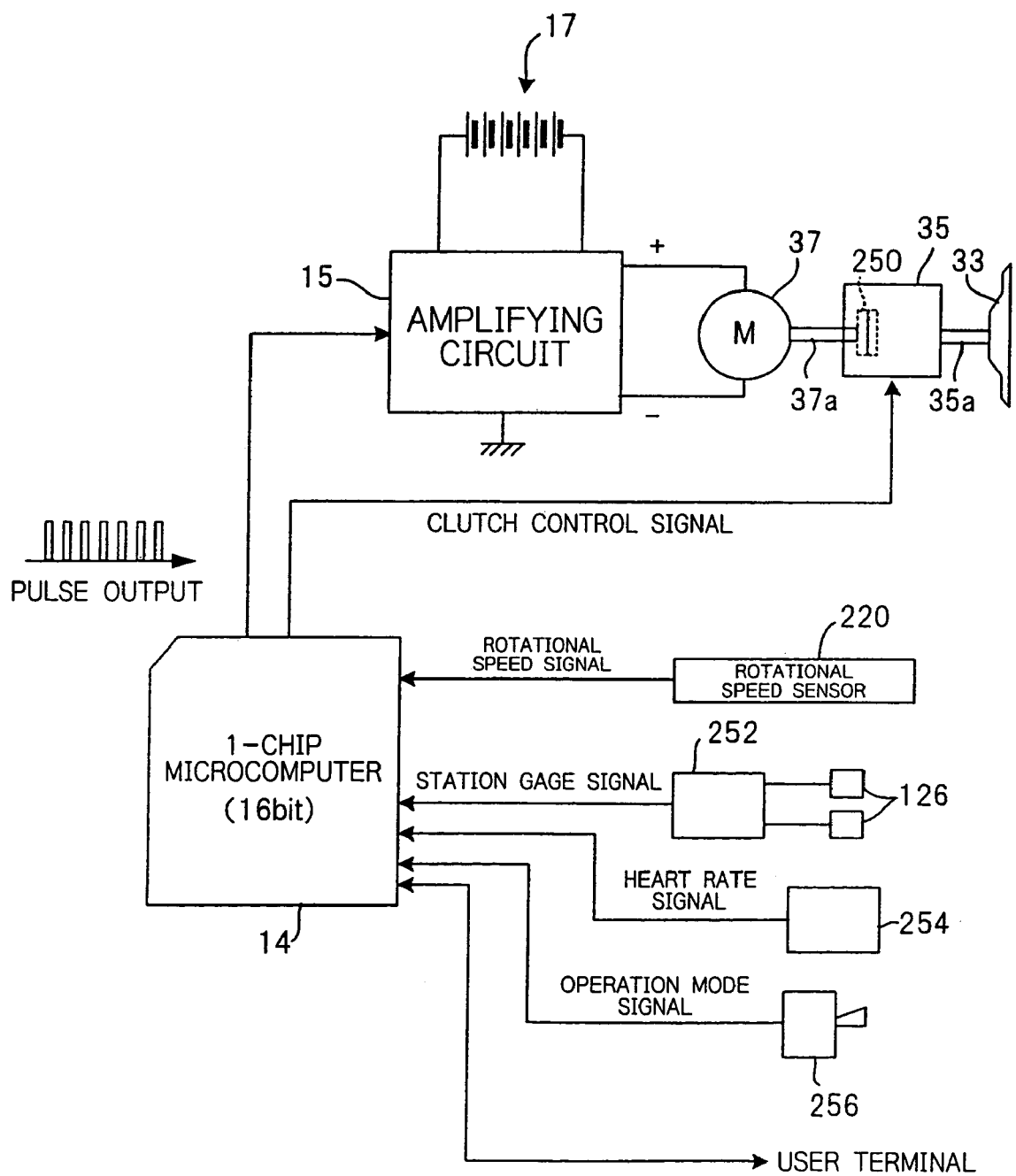
FIG. 4 is a schematic diagram showing a control system and a detection system of the electromotive power assisted bicycle of FIG. 3.

Turning now to FIG. 4, an overview of a main section for executing the aerobic exercise mode and an electromotive power assisting mode in an electromotive power assisted bicycle 1 according to the present embodiment will be described. This main section is controlled by a single 16-bit 1-chip microcomputer 14. The 1-chip microcomputer 14, in which one unit of data or command is composed of 16 bits, executes a processing according to a desired program stored in a non-volatile memory, not shown. The 1-chip microcomputer 14 is further provided with a clock function and it can measure a time period during a desired event by a clock count.

The control system by the 16-bit 1-chip microcomputer 14 includes a PWM controllable electric motor 37 and an amplifying circuit 15 for amplifying electric power of a control signal output from the 1-chip microcomputer 14 and then outputting it to said electric motor 37. It is to be noted that a battery 17 is connected to the amplifying circuit 15 to supply electric power to the electric motor 37. The 1-chip microcomputer 14 executes an arithmetic operation to determine an assisting force according to the predetermined algorithm, as will be described later, and sequentially outputs pulse signals that have been modulated to have pulse widths corresponding to said assisting forces to instruct the electric motor 37 to output the rotational torques in response to said assisting forces. It is to be noted that the amplifying circuit 15 is equipped with not only the electric power amplifying function for the pulse signals but also a function as a buffer for the pulse signals.

An output shaft 37a of the electric motor 37 is connected to a speed reducing unit 35 for reducing a rotational speed of the electric motor at a variable reduction ratio, and further an output shaft 35a of the speed reducing unit 35 is connected with a power sprocket 33 for combining the output electric force with the pedal effort. The details of the force combining mechanism will be described later.

The speed reducing unit 35 may be embodied by an epicyclic gear mechanism comprising, for example, a sun gear, a planet gear, a ring gear, a clutch and so on. In an example having this configuration, the reduction ratio of the speed reducing unit 35 can be controlled by providing an electromagnetic control of the engagement and disengagement of a variety of clutches through control signals from the 1-chip microcomputer 14. Further, the speed reducing unit 35 is provided with an electromagnetic clutch 250 on a rotational torque transmission path from the output shaft 37a of the electric motor 37 to the output shaft 35a of the speed reducing unit 35. This electromagnetic clutch 250 moves to an engaged position or a disengaged position in response to the control signal from the 1-chip microcomputer 14, to thereby turn on or off the transmission of the rotational torque to the power sprocket 33.

On the other hand, if the electromagnetic clutch 250 moves into the engaged position in the state where the electric motor 35 is not supplied with the electric power, inversely the electric motor 35 is revolved by the rotational torque from the power sprocket 33 or by the pedal effort, wherein a reaction torque produced in the electric motor 35 will act as a loading force against the pedal effort. At the same time, an electromotive force is generated in the electric motor 35. The amplifying circuit 15 may be designed such that this electromotive force of the motor is used to charge the battery 17. It is to be appreciated that the battery may be charged by way of polarity inversion in response to the rotational direction of the motor such that in whichever direction the motor may rotate, polarity of the voltage supplied to the battery should be always the same.

The main section of the detection system shown in FIG. 4 includes: a rotational speed sensor 220 for detecting a rotational speed of a part reflecting the bicycle speed, for example, the drive shaft 4; at least two strain gages 126 for outputting a signal representative of a pedal effort; an arithmetic operation section 252 for averaging (or adding and outputting) the output signals from said strain gages and outputting the result; a heart rate detection sensor 254 for detecting a heart rate of a rider; and a mode shifting control switch 256 for shifting the mode among said three operation modes. Those output signals or the rotational speed signal, the strain gage signal, the heart rate signal and the operation mode signal are input to the 1-chip microcomputer 14 and stored in the memory, though they are not shown. Further, the 1-chip microcomputer is connectable to the user terminal to establish data communication therebetween.

It is to be noted that the 1-chip microcomputer 14 stores a code for identifying the operation mode designated by the mode shifting switch 256 as an operation mode flag "Fd", and in addition, the 1-chip microcomputer is provided with a function to rewrite the operation mode flag Fd to the code representing the normal operation mode in such a condition that there remains insufficient capacity of the battery or the temperature of the electric motor outside the acceptable range even if the mode shifting switch 256 designates the aerobic exercise mode or the electromotive power assisting mode.

The torque detection mechanism using the rotational speed sensor 220 and the strain gage 126 will be described later in detail.

The heart rate detection sensor 254 may use a well-known sensor wearable on any desired sites on the body, including, for example, an ear, a fingertip or an arm of the rider. Further, instead of the heart rate detection, or in addition to it, a sensor that can detect a variety of parameters of the human body, such as blood pressure, may be employed.

[Force Combining and Auxiliary Power Mechanism]

Figure 9:
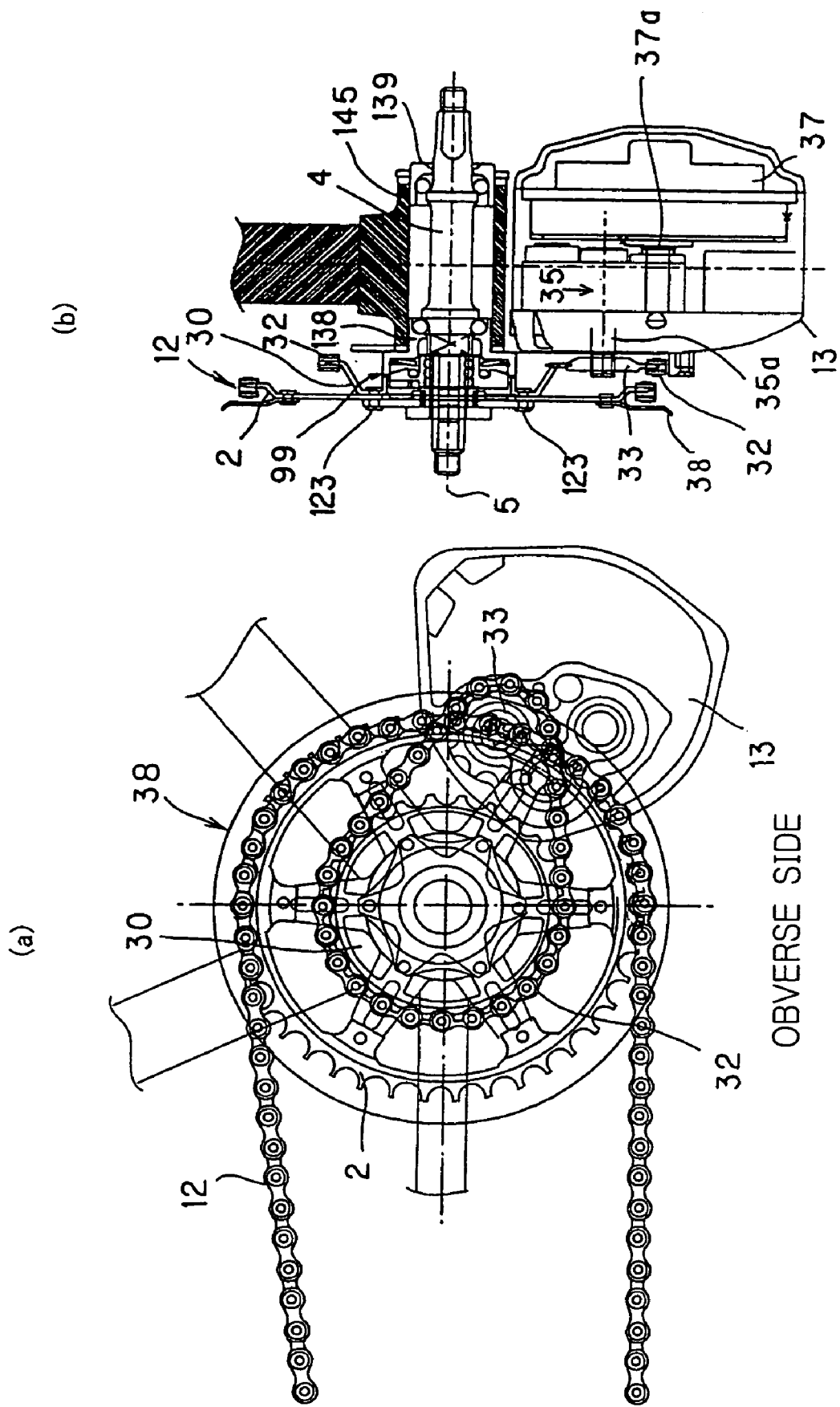
Figure 10:
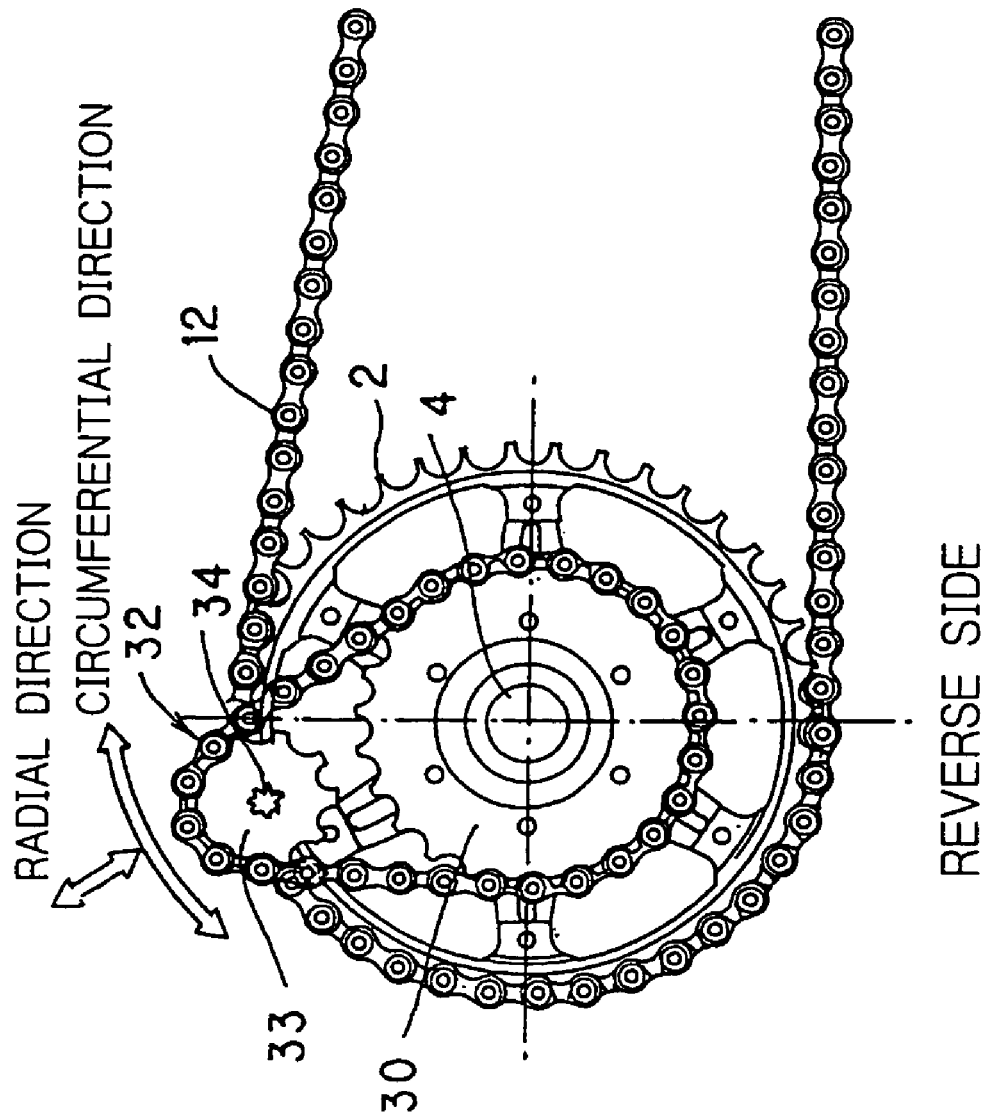
FIG. 10 is an enlarged front elevation view of the force combining mechanism viewed from the reverse side of the primary sprocket for illustrating an aspect in installing a double chain system in different positions.

The force combining mechanism for combining the assisting force and the pedal effort in the electromotive power assisted bicycle 1 and a mechanism for supplying said assisting force are described with reference to FIGS. 8 through 10.

Figure 8:
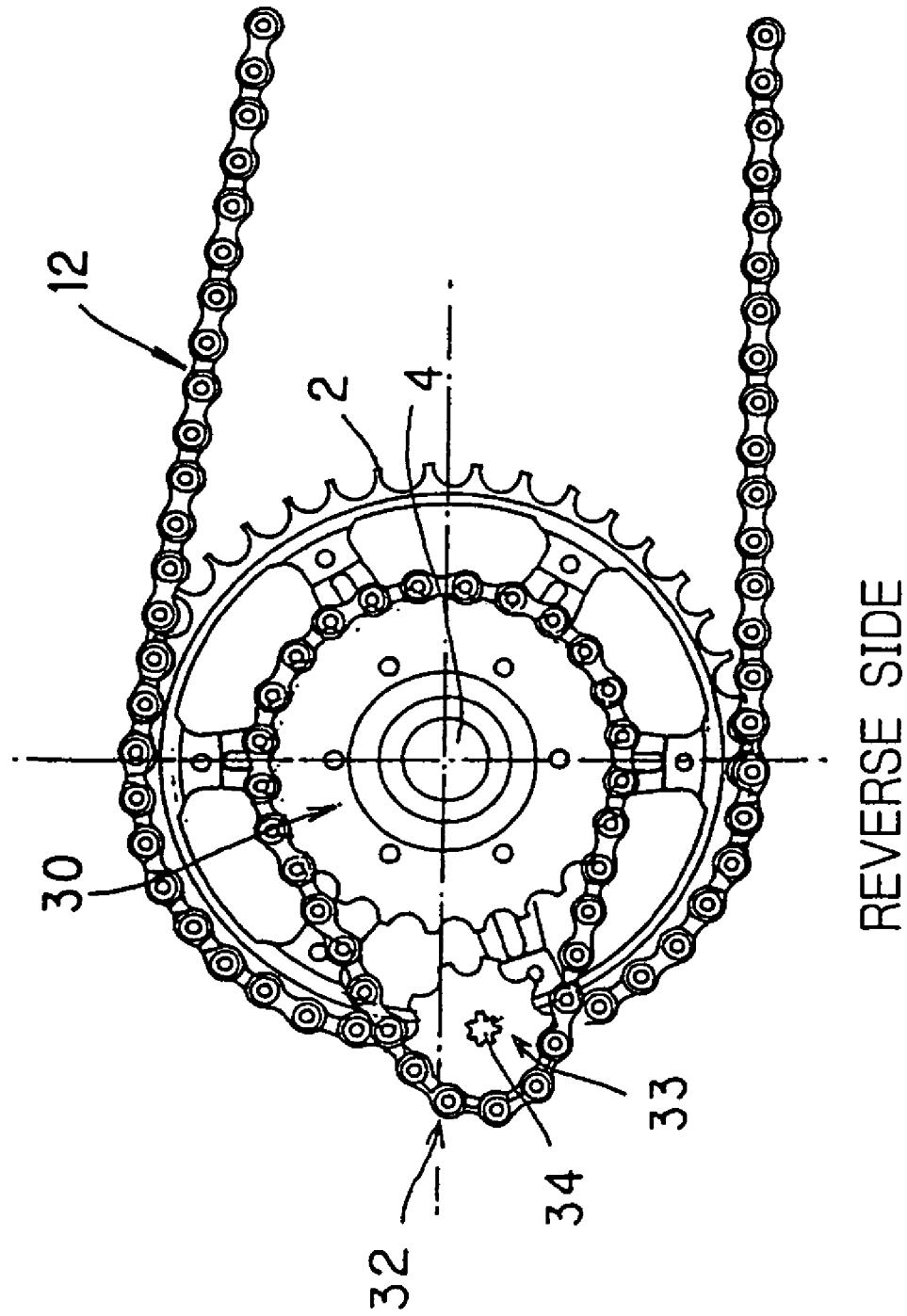
FIG. 8 is an enlarged front elevation view of a force combining unit viewed from a reverse side of a primary sprocket for illustrating a double chain system presented as an example of the force combining unit of an electromotive power assisting kit.

FIG. 8 shows an example of the force combining mechanism when the primary sprocket 2 is viewed from the reverse side thereof (the opposite side of FIG. 3). This force combining mechanism comprises a secondary sprocket 30 supported coaxially with the primary sprocket 2, a power sprocket 33 capable of being rotated by an assisting force to be output under a predetermined condition, and an assist chain 32 of endless rotation, which has been stretched between the power sprocket 33 and the secondary sprocket 30 in order to transmit the assisting force from said power sprocket 33 to said secondary sprocket 30. The power sprocket 33 and the secondary sprocket 30 are equipped with the teeth arranged in the same pitch, wherein preferably the number of teeth of the power sprocket 33 is smaller than that of the secondary sprocket 30.

Since the force combining mechanism of FIG. 8 is disposed in the inner side of the body with respect to the primary sprocket 2, the secondary sprocket 30 and the power sprocket 33 do not protrude outwardly from the body, thus allowing the body to be made compact. Further, as illustrated, since a distance between the primary sprocket 2 and the power sprocket 33 can be made smaller than a radius of the primary sprocket 2, the entire force combining mechanism can be integrally formed in a low-profile unit. Owing to this, as shown in FIG. 9(a), if viewed from the outside of the bicycle (i.e., from the front side), the force combining mechanism, in its majority portion, is hidden in the axially inner side of the primary sprocket 2, giving no risk of spoiling the exterior appearance. Installing a chain cover 38 over the primary sprocket 2 so as to hide the chain 12 provides protection for the chain as well as further improvement in the exterior appearance.

FIG. 9(b) shows a cross sectional view of FIG. 9(a) taken along a vertical line passing through the center of the primary sprocket 2. As illustrated in FIG. 9(b), the primary sprocket and the secondary sprocket 32 are fixed by pins 123 so that they do not move separately from each other (i.e., but rotate as one unit), and they are both coupled to a drive shaft 4 via a one-way clutch 99. The power sprocket 33 is operatively coupled to a drive unit 13 via a power shaft 35a extending in parallel with the drive shaft 4. By forming a serration (see FIGS. 8 and 10) in a center hole 34 of the power sprocket 33, a slipping rotation between the power shaft 35a and the center hole 34 can be prohibited.

The drive unit 13 is mounted to a frame similar to that for an ordinary bicycle, and its housing contains the above-described electric motor 37 and the speed reducing unit 35.

An operation of the force combining mechanism of the present embodiment will now be described.

When the electric motor 37 is controlled to rotate under a predetermined condition and the assisting force thereby created is provided to the power sprocket 33 via the speed reducing unit 35, the torque of the power sprocket is transmitted to the secondary sprocket 30 via the assist chain 12, which in turn is immediately transmitted to the main sprocket 2 that has been fixed to said secondary sprocket 30 and designed to be rotated by the pedal effort. Thus, combining of the assisting force and the pedal effort can be achieved.

When the electric motor 37 is not driven to revolve, a load necessary for revolving the motor 37 is prevented from being transmitted to the power sprocket 33 by said one-way clutch, though not shown, disposed within the speed reducing unit 35, thereby allowing light driving of the bicycle.

Thus, the present embodiment has employed a so-called double chain system, in which, differently from the prior art system, the assisting force is not directly transmitted to a chain 12 serving for transmitting the pedal effort but the assisting torque from the power sprocket 33 is transmitted via a separate chain 32 to the secondary sprocket 30 rotating along with the primary sprocket 2. Owing to this configuration, the degree of freedom for installing the drive unit 13 can be extended broadly as compared to the prior art. For example, as shown in FIGS. 8 and 9(a), since the drive unit can be placed in the forward direction of the bicycle, the drive unit 13 can also be installed in an ordinary bicycle frame, other than the dedicated frame that has been specially prepared for the electromotive power assisted bicycle.

It is a matter of course that the power sprocket 33 may be located in any location along a circumferential direction. FIG. 10 shows an example where the position of the power sprocket 33 has been offset by about 90 degrees clockwise in the circumferential direction. In that case, the drive unit 13 can be mounted to a support frame of a saddle 18 (FIG. 3). Further, by selecting the length of the assist chain 32, the position of the power sprocket 33 in the radial direction (i.e., a distance from the center of the primary sprocket 2 to the center of the power sprocket 33) can be also modified as desired to be further towards the outer side or towards the inner side. Thus, a minimum ground clearance of the drive unit 13 can be made larger or smaller.

In this way, since the double chain system provides a great freedom for installation, any bicycle can be equipped with the electrical power system without any restriction otherwise imposed by the type thereof. In other words, the degree of freedom of design can be significantly increased.

In addition, if the number of teeth of the power sprocket 33 is selected to be smaller than that of the secondary sprocket 30, as illustrated, then the force combining mechanism can independently provide the speed reduction system. Owing to this, the reduction ratio of the speed reducing unit 35 can be made small, and consequently the speed reducing unit can be made simple and small. Thus, in this embodiment, the degree of freedom for the reduction ratio can also be extended.

Figure 5:
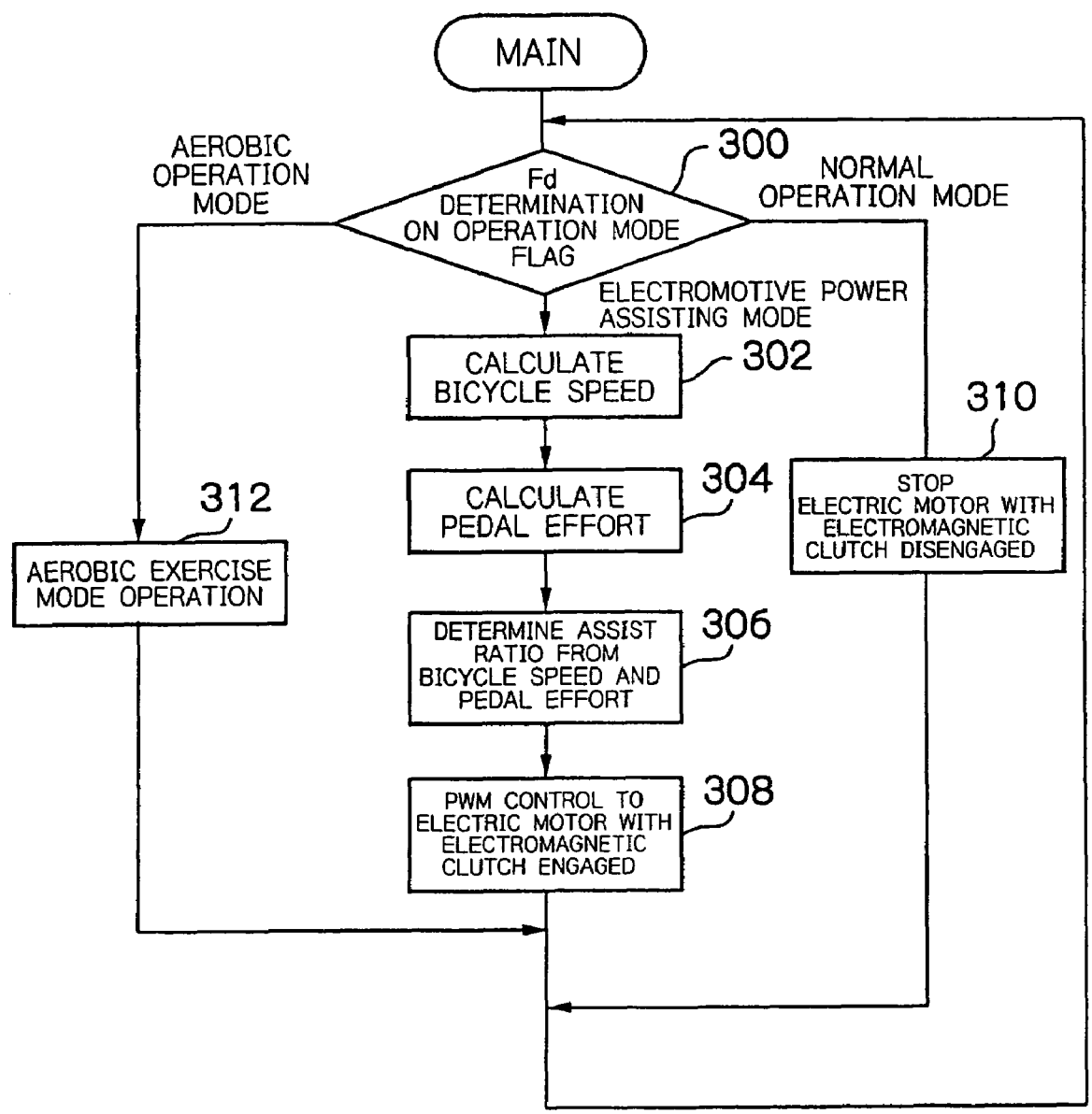
FIG. 5 is a flow chart showing a flow of main control of an electromotive power assisted bicycle.

A flow chart of FIG. 5 generally shows by way of example a flow of main processing by the 1-chip microcomputer 14 shown in FIG. 4. This main routine is repeated by a predetermined cycle.

As shown in FIG. 5, first of all, a determination is made on the operation mode flag Fd stored in a resister (Step 300). Depending on the code information of this operation mode flag Fd, the subsequent process is selected.

If the electromotive power assisting mode has been selected as a result from Step 300, the 1-chip microcomputer 14 calculates a bicycle speed "v" or a physical quantity relating thereto based on the input rotational speed signal (Step 302). Subsequently, the 1-chip microcomputer 14 calculates a pedal effort or a physical quantity "Pq" relating thereto based on a strain gage signal from an arithmetic calculator 252 (Step 304). Then, based on the calculated bicycle speed and the pedal effort Pq, the 1-chip microcomputer 14 determines an assist ratio (electric force/pedal effort) or a control quantity relating thereto (Step 306). The determination of the assist ratio may be executed by, for example, referring to a look-up table defining a relation between each level of the bicycle speed and pedal effort and the control quantity for the assist. Then, the 1-chip microcomputer 14, under the state where the electromagnetic clutch 250 is engaged, applies a PWM (Pulse Width Modulation) control to the electric motor 37 to generate an assisting force corresponding to the determined assist ratio (Step 308). Specifically, the pulse signals that have been modulated to have pulse widths corresponding to said assisting force are sequentially output. As long as the operation mode flag Fd "electromotive assisting mode" is not rewritten, Steps 302 through 308 are continuously repeated.

If the normal operation mode has been selected in Step 300, the 1-chip microcomputer 14 disengages the electromagnetic clutch 250 and at the same time stops the electric motor 37 (Step 310). As long as the operation mode flag Fd "normal operation mode" is not rewritten, Step 310 is continuously repeated.

If the aerobic exercise mode has been selected in Step 300, an operation enabling the rider to perform an aerobic exercise is executed (Step 312). As long as the operation mode flag Fd "aerobic exercise mode" is not rewritten, Step 312 is continuously repeated.

A flow of a conceptual processing of the aerobic exercise mode operation of Step 312 will now be described with reference to the flow chart of FIG. 6.

Firstly, the 1-chip microcomputer 14 calculates the pedal effort or the physical quantity Pq relating thereto based on the strain gage signal from the arithmetic calculator 252 (Step 330). Subsequently, a heart rate "h" is detected based on the signal from the heart rate detection sensor 254 (Step 332). Then, based on at least the heart rate h, a pedal effort level "Pr" enabling the rider to perform an aerobic exercise is set as a target of control (Step 334). For example, if the heart rate h is relatively high, the pedal effort level Pr may be set low, while if the heart rate h is relatively low, the pedal effort Pr may be set high. This Step may be achieved by retrieving the table in which an ideal pedal effort level value for each heart rate has been stored.

Next, the Pq is compared with Pr to determine which is higher (Step 336).

If the detected pedal effort Pq is greater than the set pedal effort level Pr (i.e., Pq>Pr), then the electric force Te necessary for decreasing the pedal effort Pq to the Pr representative of the target value is calculated (Step 338). This electric force Te is a function of (Pq−Pr) (in the simplest case, a proportional function thereof). Then, under a condition where the electromagnetic clutch 250 is engaged, the PWM control is applied to the electric motor 37 so as to generate the electric force Te calculated in Step 338 (Step 340).

In contrast to this, if the detected pedal effort Pq is smaller than the set pedal effort level Pr in the determination from Step 336 (i.e., Pq<Pr), then a loading force "L" necessary for increasing the pedal effort Pq to the Pr representative of the target value is calculated (Step 342). This loading force L is a function of (Pr−Pq) (in the simplest case, a proportional function thereof). Next, the speed reducing unit 35 has its gear shifted to a reduction ratio necessary for achieving the calculated loading force L (Step 344). Then, under the condition where the electromagnetic clutch 250 is engaged, the electric motor 37 is turned off to generate the loading force against the pedal effort (Step 346). It is to be noted that if the pedal effort Pq has not reached the Pr after a certain period has elapsed, the loading force L may be further increased to thereby reduce the bicycle speed and to urge the rider to increase the pedal effort.

If the detected pedal effort Pq is substantially equal to the set pedal effort level Pr that has been detected in the determination of Step 336 (i.e., Pq≈Pr), then the electromagnetic clutch 250 is disengaged and the electric motor 37 is turned off. By way of this, the electric force or the loading force would not be applied, but the operation only by the current pedal effort substantially equal to the set pedal effort level Pr is continued.

Figure 6:
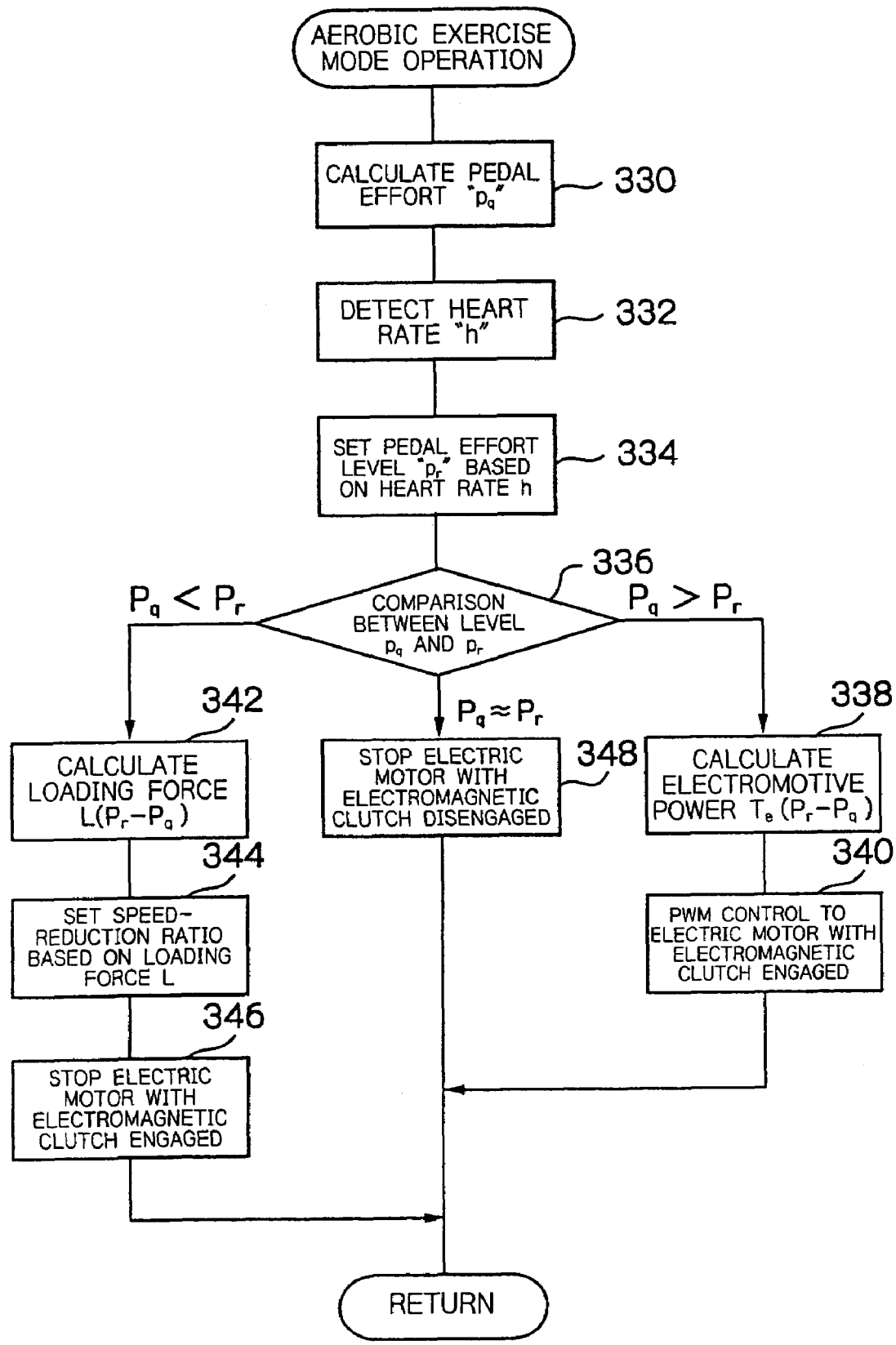
FIG. 6 is a flow chart showing a flow of control during an operation in an aerobic exercise mode.

If either one of the branched processing described above has been ended, the process exits a sub-routine shown in FIG. 6 and returns to Step 300 of the main routine shown in FIG. 5 to repeat the same processing.

As described above, in the present invention, the drive unit 13 that has been configured as a single unit, can provide not only the electric force but also the loading force. Consequently, as compared to the prior art in which the loading unit has been embodied as a large scale braking system separate from the electromotive power unit, the present invention can simplify the entire mechanism of the electromotive power assisted bicycle 1 and reduce the weight thereof. Further, in conjunction with the advantage of employing said double chain system as the force combining mechanism, the present invention minimizes the need for fabricating the dedicated body frame but allows the existing frame manufacturing process to be utilized.

Further, when the bicycle is stationary, at a traffic light or the like, in the prior art which has utilized the loading to be produced by the rotation of the rear wheel, pedaling must be performed after the rear wheel has been raised from the ground by using a bipod stand or the like, thereby reducing speed when the bicycle starts to move. However, since the present embodiment uses the rotational resistance of the electric motor as the loading force, and also the force combining mechanism by way of the double chain system or the like is employed, even during a stationary period (i.e., when the bicycle speed is zero) with the rear wheel in contact with the ground, if the bicycle body is held firm so as not to fall down with mono-pod stand and pedaling is performed in an inverse direction, then the aerobic exercise can be continued during a halting time under a condition where the loading is applied as it was (aerobic exercise during the halting period).

An overview of the processes in the sub routine of FIG. 6 will be described in more detail with reference to FIGS. 19(*a*) and (*b*). As shown in FIG. 19(*a*), it is assumed that the electromotive power assisted bicycle 1 according to the present example runs on a road consisting of a flat land "$r_1$", an upward slope "$r_2$", a peak flat land "$r_3$", a downward slope "$r_4$" and a flat land "$r_5$". At this time, as to the propulsive force required for traveling on respective road surfaces, an approximately constant value (set pedal effort level value) suitable for aerobic exercise is exhibited on the flat land, $r_1$, $r_3$ and $r_5$, as illustrated. On the other hand, the propulsive force on the upward slope $r_2$ exhibits a maximum propulsive force value much higher than that on the flat land, while on the downward slope $r_4$, the propulsive force will exhibit a minimum value, zero. Thus, since the pedal effort Pq is approximately equal to the set pedal effort level value Pr for the traveling on the flat land, $r_1$, $r_3$ and $r_5$, neither of the electric force nor the loading force is applied in this example. In contrast to this, since the pedal effort will be higher than the set level value for traveling on the upward slope $r_2$, an excess thereof would be compensated by the electric force and said pedal effort would be lowered to a proximity to the set level value. On the contrary, since the bicycle could run downward even without any pedal effort applied, the loading force should be provided to thereby decrease the bicycle speed and to urge the rider to apply the pedal effort, as illustrated.

Thus, even during traveling on a road including upward slopes and downward slopes, the rider can run with an approximately constant pedal effort to thereby carry out aerobic exercise appropriately.

In practice, the heart rate varies during the traveling, and FIG. 19(*b*) shows an example of control taking this fact into account. As illustrated, the variation in the heart rate is assumed to be such that the heart rate increases by a relatively high rate when traveling on the upward slope $r_2$ and it is approximately constant when traveling on the flat land $r_1$, $r_3$, $r_5$ and also on the downward slope $r_4$.

In the example of FIG. 19(*b*), the heart rate exceeds a threshold value "H" at the time "$t_1$" in the middle of traveling on the upward slope $r_2$, and at this point, the control is provided such that the additional torque 260 determined based on the heart rate may be added to the electric force and loading force of FIG. 19(*a*). As a result, the pedal effort by the rider is decreased to a lower level than the previous one after the time "$t_1$" so as to prevent the heart rate from being increased any more. Thus, in the mode taking the heart rate into account, an adequate aerobic exercise may be feasible, which is sequentially associated with the health condition of the rider or the difference in physical strength of each individual rider during riding and the changes in the condition of physical strength during the exercise.

Figure 7:
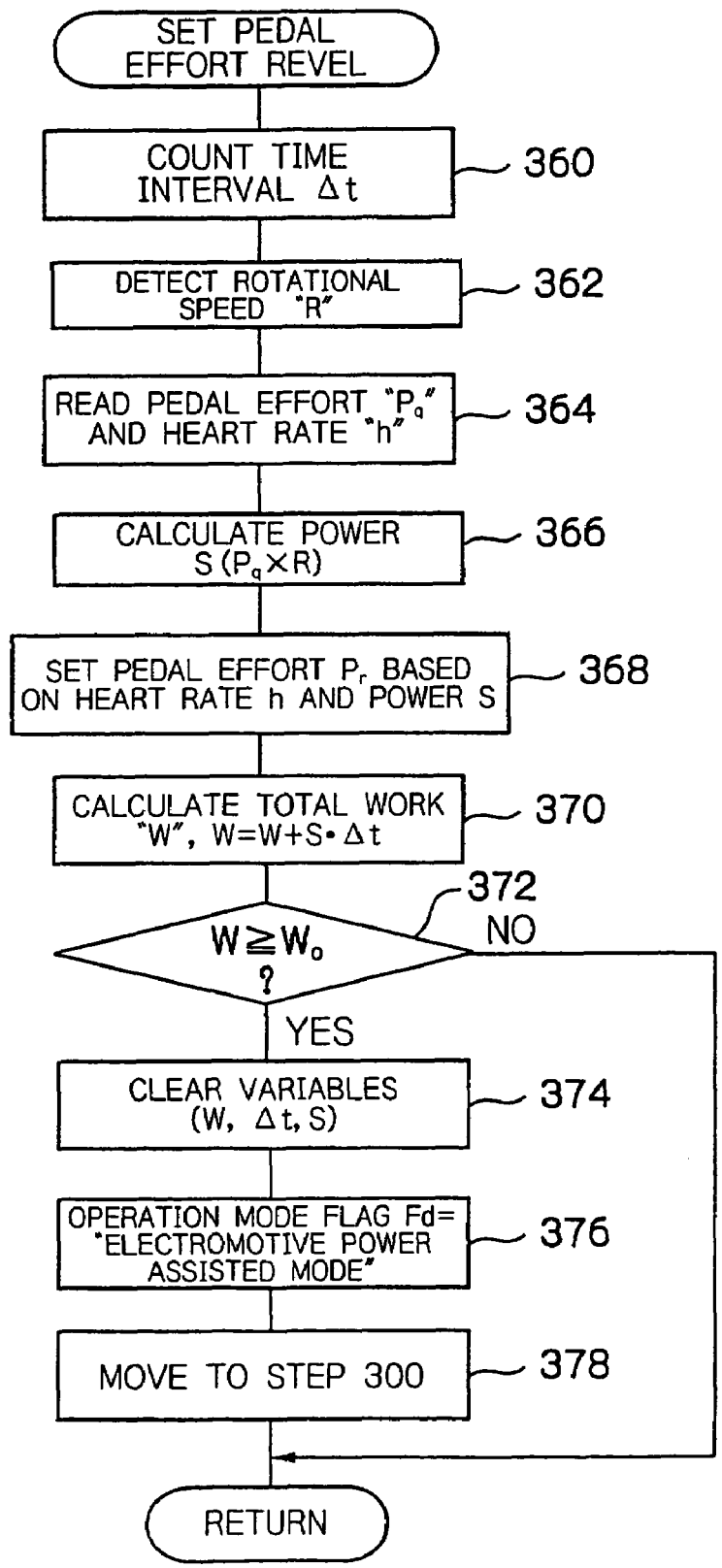
FIG. 7 is a flow chart showing a flow for setting a level of pedal effort according to an alternative aspect.

Alternative mode of Step 334 of FIG. 6 will now be described in detail with reference to the flow chart of FIG. 7. This serves for setting the pedal effort level from the viewpoint of power as well as for managing the workload of the aerobic exercise.

Firstly, a time interval, "Δt", is counted (Step 360). The time interval Δt is defined by the time interval between a point immediately before the process exits the sub-routine of FIG. 7 to a point when the process calls this routine next time, which represents a minute time period for which the pedal effort, the rotational speed and the like are considered to be almost constant.

Secondly, a rotational speed "R" of the drive shaft 4 is detected (Step 362), and the pedal effort "Pq" and the heart rate "h", which have been detected and stored in the memory in Steps 330 and 332 of FIG. 6, are read (Step 364). Subsequently, the power "S" by the pedal effort from the rider is determined as a product of the pedal effort Pq and the rotational speed R of the drive shaft 4 (or as a function thereof) (Step 366).

Next, the pedal effort Pr is set as a target of control based on the heart rate h and the power S (Step 368). For example, if the power S is relatively high, the pedal effort level Pr should be set low, while if the power S is relatively low, the pedal effort level Pr should be set higher. The setting of the Pr in association with the heart rate h will be carried out similarly. This step can be achieved by retrieving a table containing an ideal pedal effort level value for each of heart rate and power S.

Next, a total workload "W" that has been carried out by this point of time through the aerobic exercise is calculated (Step 370).

$$W=W+S\cdot\Delta t$$

Herein, the W has been initialized to 0 at the time of starting of the aerobic exercise, and the second term of the above equation is sequentially added each time this routine is repeated. In the above equation, from the assumption that the power S is almost constant during the time period of Δt counted in Step 360, the second term, S·Δt, can be considered to be a work carried out by the rider through the pedal effort.

Subsequently, it is determined whether the workload W has reached a predetermined threshold value $W_0$ or higher (Step 372). Herein, the threshold value $W_0$ is considered an acceptable value for the aerobic exercise quantity, which may be appropriately set by the rider depending on the desired quantity of exercise or alternatively may be set automatically by the 1-chip microcomputer in response to the average heart rate of the rider. If the workload W is lower than the predetermined threshold value $W_0$ (by the negative determination in Step 372), the process exits this routine and the operation in the aerobic exercise mode shown in FIG. 5 may be continued.

When the workload W has reached the threshold value $W_0$ or higher (by the affirmative determination in Step 372), variables (W, Δt, S) are cleared (Step 374), the operation mode flag Fd is rewritten to the code of "the electromotive power assisting mode" (Step 376), and the process moves to Step 300 of FIG. 5 (Step 378). That is, when the total workload W of the aerobic exercise has reached the desired workload, the operation is shifted to the electromotive power assisting mode.

The power S calculated in Step 366 can reflect the caloric expenditure more correctly as compared to a mere pedal effort (i.e., if the pedal effort is high but the rotational speed R is low, the caloric expenditure will not be high, and if the pedal effort is low but the rotational speed R is high, the caloric expenditure will not be low). Accordingly, the aerobic exercise can be performed in a proper manner by setting the pedal effort based on the power as shown in FIG. 7.

Further, since the workload of the aerobic exercise can be grasped, the above process can be applied to the case of performing the aerobic exercise by utilizing the opportunity of traveling on a predetermined road. For example, even if the workload is small on the designated road, such as a school-commuting road or an office-commuting road, a shortfall may be supplemented by performing beforehand the aerobic exercise during a stopping period as described above.

Preferably, the 1-chip microcomputer 14 can execute the checking of the remaining capacity of the battery regularly. If the remaining capacity of the battery is low, the 1-chip microcomputer 14 may instruct to charge the battery 17 with the motor electromotive force to be generated when the motor 37 is rotated by the pedal effort (Step 346, for example). Further, also in the case where the aerobic exercise during stopping is carried out, if the battery 17 is charged with the motor electromotive force, the effort in the charging operation can be eliminated. At this time, the 1-chip microcomputer 14 determines the rotational direction of the pedal based on the signal from the rotational speed sensor 220, and shifts the connection mode between the battery 17 and the motor 37 by a relay, though not shown, depending on the difference in the polarity of the motor electromotive force due to the difference in its rotational direction.

It is to be noted that, since in the 1-chip microcomputer 14 employed in the present embodiment, one unit of data or one unit of command is composed of 16 bits, the 1-chip microcomputer 14 is able to execute such a program having a higher level of processing function at a higher speed based on a larger scale of data volume as compared with the 8-bit microcomputer that has been typically used in the prior art electromotive power assisted bicycle. In this connection, in the present embodiment, the dedicated PWM control IC has been omitted, but the electronic processing of the above-described respective steps is performed in a batch processing by the 1-chip microcomputer 14, while at the same time, the PWM control such as those in Steps 308, 340, is applied to the electric motor 37 directly. This PWM control may be achieved by software (including firmware) stored in a memory of the 1-chip microcomputer 14, though not shown.

Thus, the present embodiment allows for a single microcomputer, by using the 16-bit microcomputer with high processing capacity, to perform the entire control tasks including, for example, the PWM control that has been performed by using the dedicated IC in the prior art, yet without modifying a basic design by a great degree. Consequently, the number of parts and an area of substrate can be reduced as a whole, and this contributes to overall cost reduction as well as to miniaturization of the system. For example, it is true that a 16-bit microcomputer is more expensive than an 8-bit microcomputer, but if the PWM control dedicated IC, an IC for executing other electronic processing such as monitoring of a remaining capacity of an electric cell and their peripherals are combined with the 8-bit microcomputer as an additional functional means, the system of an 8-bit microcomputer would lead to a higher cost than that of a 16-bit microcomputer.

In addition, since the 16-bit microcomputer can affordably execute a variety of processing with its software without trouble, a circuit can be made simple. Further, since a future functional enhancement may be feasible in a similarly flexible way, from this point, the cost reduction can be possible. Further, since the electromotive power assisting condition can be always monitored by the software, operation of the electric motor 37 can be suspended immediately in any circumstances.

[Rotational Speed Sensor]

A rotational speed sensor for outputting a rotational speed signal to be input to the 1-chip microcomputer 14 will now be described.

FIG. 11 shows an NS polarized ring magnet 200 as one of the components of the rotational speed sensor. This ring magnet 200 is formed generally into a flat ring having an opening 205 in its center. The ring magnet 200 comprises a plurality of magnet segments that divides the ring by an angle of identical degrees, and in those magnet segments, when viewed from the front side, N-pole segments 202 placed with their N-pole sides facing the front and S-pole segments 204 placed with their S-pole sides facing the front are alternately arranged. In that case, preferably the N-S poles of the magnet segments may be arranged, as shown in the side elevation view, such that the direction of magnetic flux may be substantially normal to the ring surface to achieve the condition where the opposite sides of the N-pole segments 202 are S-polar and the opposite sides of the S-pole segments 204 are N-polar. Although 12 magnet segments are arranged in the illustrated example, a greater or lesser number of magnet segments may be employed, which may be desirably and favorably modified according to a rotational speed of the object to be detected and a required detection accuracy.

It is to be noted that if there are normal components of the magnetic field with respect to the ring surface, then the orientation of the N-S pole of each magnet segment can be desirably and favorably modified. For example, one unit of magnets may be placed along a circumferential direction so as to form adjacent N-pole and S-pole segments by respective poles of said one magnet. In that case, the opposite side of the N-pole segment will be N-pole, while the opposite side of the S-pole segment 204 will be S-pole, and it is considered from the viewpoint of the intensity of the magnetic field that the example of FIG. 11 is preferred.

FIG. 12 shows a gear 210 as the object whose rotational speed is to be detected. The gear 210 is rotated by the torque transmitted through the shaft 214 and a ring groove 208 is formed in one surface of the gear 210 to provide a dimension and shape sufficient to accommodate the ring magnet 200. The ring magnet 200 is accommodated in this ring groove 208 and affixed thereto by use of an adhesive or the like. At this time, preferably the ring magnet 200 and the surface of the gear 210 are flush to each other. This prevents the ring magnet from protruding beyond the gear surface and thereby minimizes the loss of space due to the installation of the rotational speed sensor.

Figure 13:
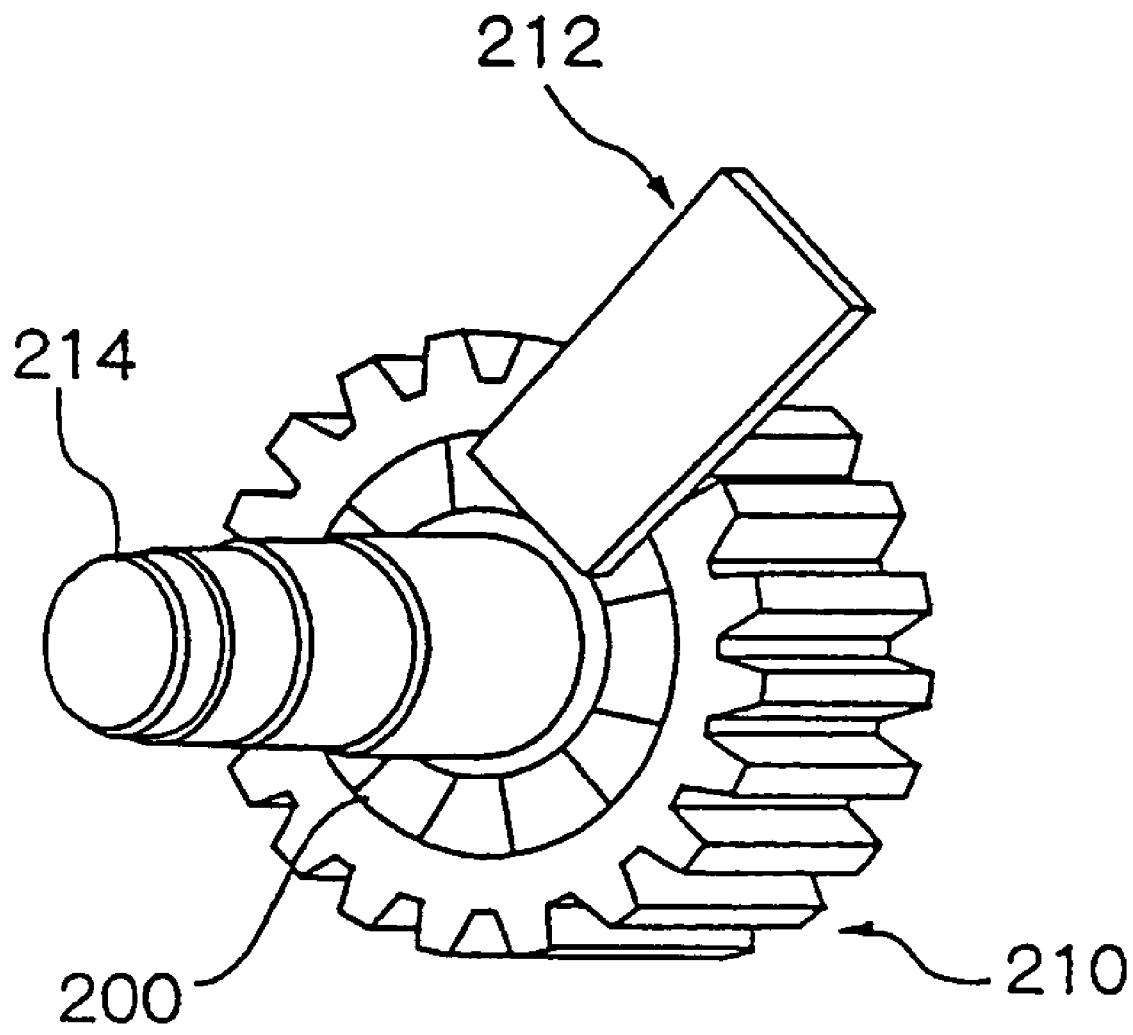
FIG. 13 is a perspective view of the rotational speed sensor of FIG. 12.

A Hall IC 212 for detecting the magnetic field is disposed adjacent to the ring magnet 200 installed in the gear 210. This Hall IC is a well-known magnetic field detecting IC that is equipped with a built-in element that can generate a resistance proportional to a current and a magnetic field in the normal direction to the current and the magnetic field by the Hall effect when the magnetic field is present in the vertical direction with respect to the direction of the current flow within a semiconductor, and the Hall IC 212 also outputs a value of said resistance as a digital signal. An output terminal of the Hall IC 212 is connected to the 1-chip microcomputer 14. FIG. 13 shows the rotational speed sensor 220 of FIG. 12 represented in the perspective view.

The 1-chip microcomputer 14 may analyze the magnetic field detection signal (the rotational speed signal) from the Hall IC 212 in any desired and preferred method to detect the rotational speed of the gear 210. Herein, FIG. 14(a) shows one example of the magnetic waveform by the ring magnet 200 in a point of detection by the Hall IC 212. The Hall IC 212 detects such a variation in a magnetic field as shown in FIG. 14(a) and outputs a pulse signal shown in FIG. 14(b). The pulse signal of FIG. 14(b) corresponds in its timing to a local maximum portion of the N-pole side of the magnetic waveform of FIG. 14(a). In this case, the positive values (N-pole side) are exclusively extracted and the negative values (S-pole side) are deleted, but exclusively negative values or both the positive and negative values may be employed. The cycle of this pulse signal sequence (period between pulses) is proportional to the rotational speed of the ring magnet 200. Therefore, the 1-chip microcomputer 14 can detect a time interval of the pulse signal from the Hall IC 212 and determine the rotational speed of the ring magnet 200 and thus of the gear 210 immediately.

It is a matter of course that a magnetic field sensor other than the Hall IC, for example, a coil or the like, may be used, as long as it is capable of detecting the magnetic field. In this case, the output from the magnetic field detection sensor will appear to be such an analog waveform as shown in FIG. 14(a), and the 16-bit 1-chip microcomputer 14 is further added with a function for detecting, for example, a zero intersection point of the magnetic field signal (the time at the point of zero magnetic intensity), a peak in the N-pole side, or a peak in the S-pole side and for determining those times. Since the peak in the N-pole side 222 and the peak in the S-pole side 224 shown in FIG. 14(a) indicate the points when the poles of maximum magnetic intensity of the N-pole segment and the S-pole segment have passed through the detection area of the magnetic field sensor, the time period "T" necessary for the gear 210 to make one revolution can be detected from the count of occurrences of respective peaks and the times thereof. Thus, the rotational speed ($2\pi/T$) of the gear 210 can be determined immediately. It is a matter of course that the rotational speed of the gear may be determined when it is rotated by a predetermined angle, without waiting for a full revolution.

Since the rotational speed sensor of the present embodiment includes the NS polarized ring magnet 200 that has been formed in the flat ring shape, it can achieve a low profile and thus a space-saving and lightweight rotational speed sensor. Further, since it has a very simple structure, the fabrication thereof may be easy and thus the cost therefore may be reduced.

Further, since a plurality of magnetic segments has been integrated into a single flat ring, therefore the assembling operation to a carrying component may be feasible in a very easy manner. For example, as shown in FIG. 12, a ring groove is cut in the surface of the gear 210 and the ring magnet is simply embedded and secured therein with an adhesive or the like. As compared to the procedure of embedding each one of discrete magnets representing respective poles, the above manner can improve the working efficiency outstandingly. Furthermore, if the depth of the groove is matched with the height of the ring magnet, then there will be no protrusion to the outside, contributing to the space saving.

Further, the time resolution of the rotational speed can be improved by reducing the angular range occupied by each magnetic segment.

The rotational speed sensor 220 can be mounted to a desired portion to be detected, which is rotated so as to reflect the traveling speed of the electromotive power assisted bicycle 1. As for this portion to be detected, a gear (not shown) within the speed reducing unit 35 operatively coupled with the power sprocket 33 directly or indirectly via another gear may be preferred because it allows the rotational speed sensor 220 to be accommodated in the housing of the drive unit 13. It is to be noted that in the processing shown in FIG. 7, since the rotational speed of the crank shaft 4 has to be always detected regardless of the engagement or disengagement of the electromagnetic clutch, preferably the crank shaft 4, the sprocket 2 or the secondary sprocket 30 may be employed as a part to be detected.

A location other than the above may include, for example, a gear, though not shown, disposed within a rear wheel power transmission mechanism 10, the power sprocket 33 and a revolving portion of a front wheel. The 1-chip microcomputer 14 may have a look up table used for converting the rotational speed of the portion to be detected which has been determined as described above into the traveling speed of the electromotive power assisted bicycle 1.

[Pedal Effort Detection Mechanism]

A pedal effort detection mechanism which outputs strain gage signals 1, 2 to be input to the 1-chip microcomputer 14 will now be described with reference to FIGS. 15 through 18. The pedal effort detection mechanism according to the present embodiment detects a strain which varies in association with a deformation of the one-way clutch 99 in response to a pedal effort.

Figure 15:
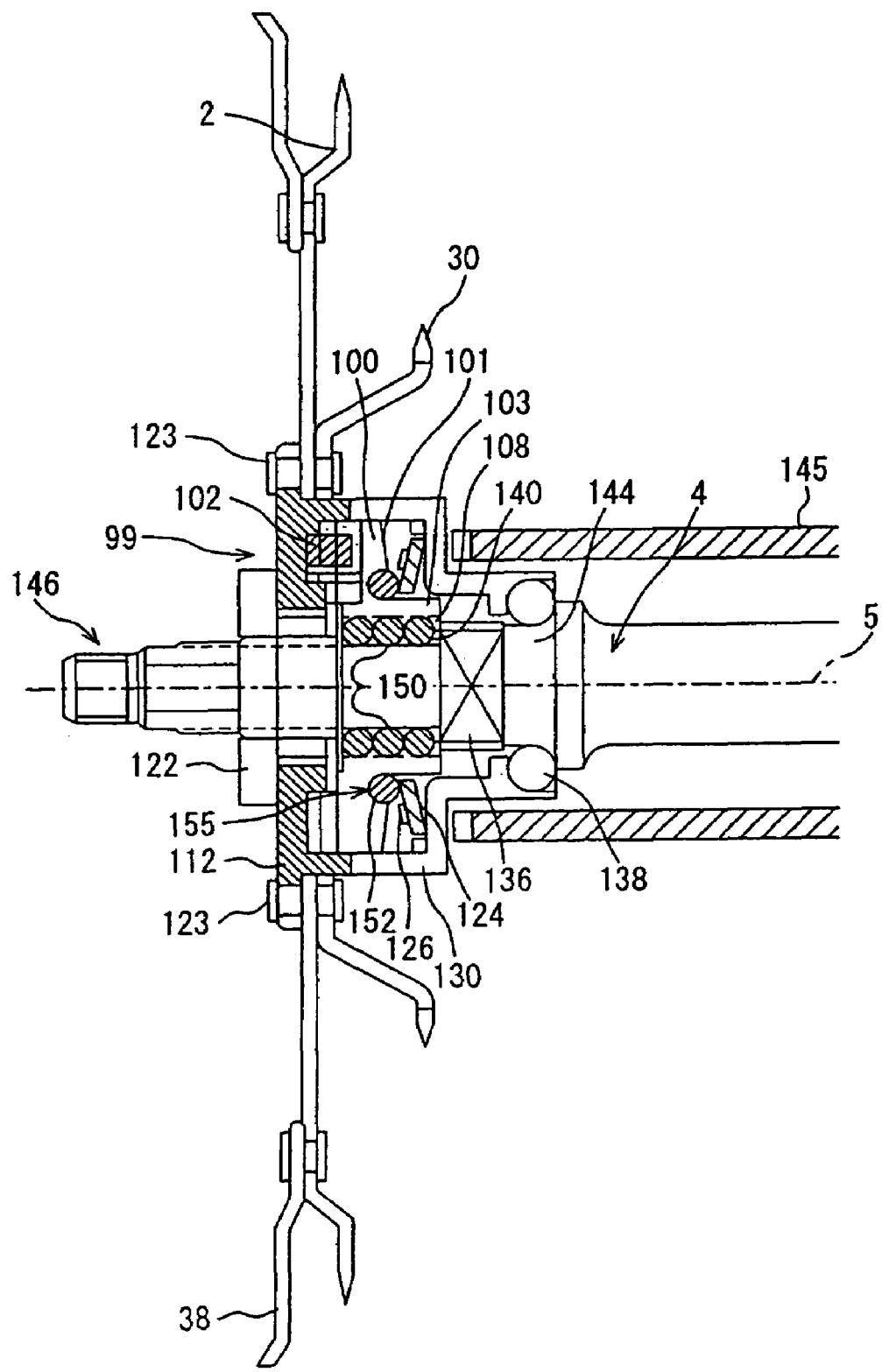
FIG. 15 is a side sectional view showing a region around a drive shaft including a one-way clutch embodying a pedal effort detection mechanism of an electromotive power assisted bicycle of the present invention.
Figure 16:
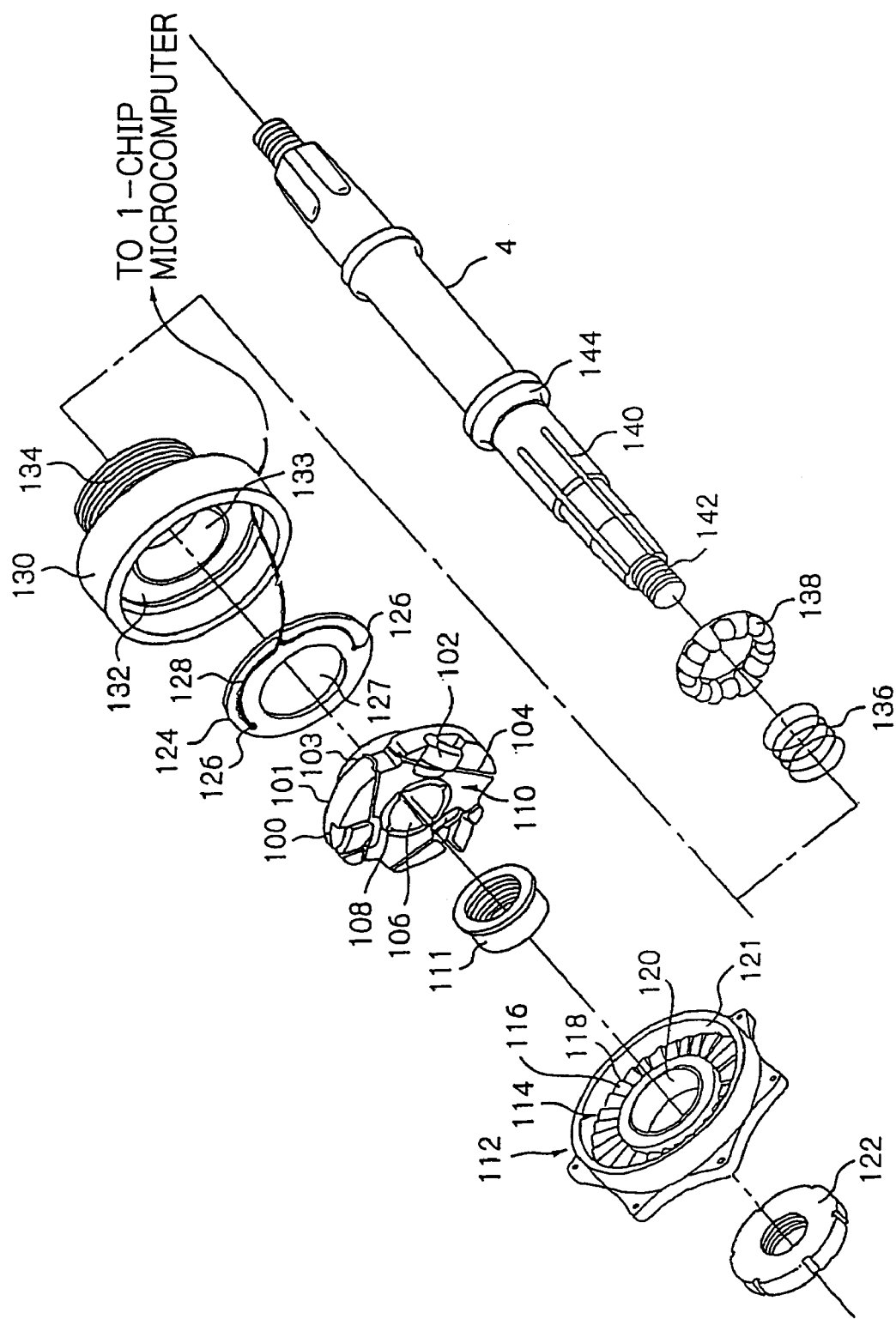
FIG. 16 is an exploded perspective view of the one-way clutch shown in FIG. 15.

As shown in FIG. 15, the primary sprocket 2 is supported by the drive shaft 4 via the one-way clutch 99. This one-way clutch 99 comprises a pawl member 100 and a tooth member 112, as shown in FIG. 16.

Figure 17:
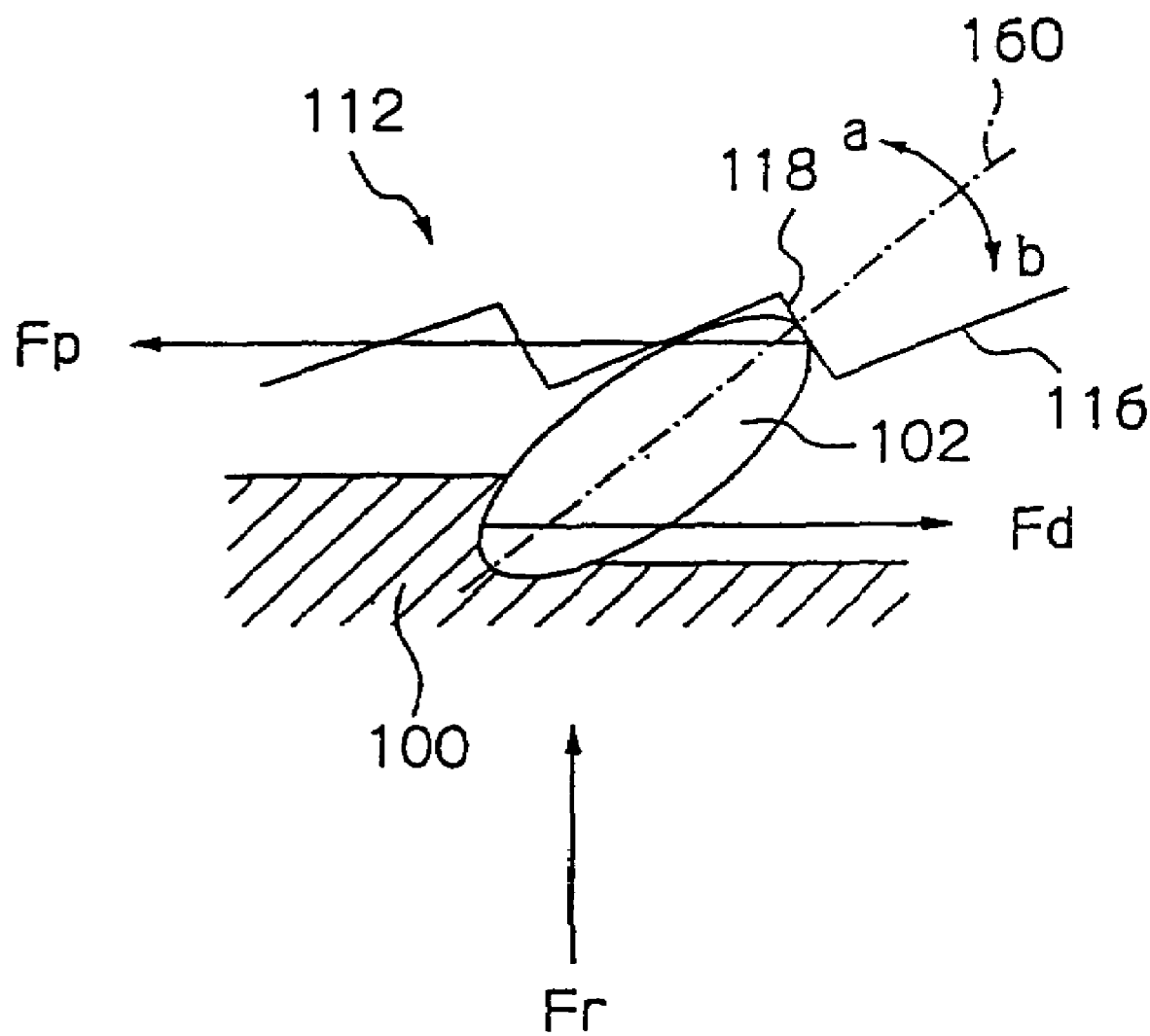
FIG. 17 is a diagram showing an engaged state of a tooth and a pawl of the one-way clutch (ratchet gear) for illustrating a principle of detecting the pedal effort of an electromotive power assisted bicycle.

In the pawl member 100, three ratchet pawls 102 are arranged on a second engaging surface 110 along the circumference spaced apart by an angle of equal degrees. The ratchet pawl 102 is made of rigid material and configured to be capable of rotating around the shaft extending approximately along the radial direction of the second engaging surface 110. The ratchet pawl 102 is biased by a pawl erecting spring 104 so that a longitudinal direction thereof may makes a predetermined angle with respect to the engaging surface 110 (a balancing direction 160 of FIG. 17) when no force is applied to the ratchet pawl 102. As shown in FIG. 17, when the ratchet pawl 102 is deviated from the balancing direction 160 to an ascending direction "a" or a descending direction "b", the erecting spring 104 exerts a slight elastic force to the ratchet pawl 102 so as to cancel the deviation and to return it to the balancing direction 160.

Further, in the central area of the pawl member 100 is formed a pawl member bore 106 for receiving the drive shaft 4, and this pawl member bore 106 penetrates through a cylindrical portion 103 protruding from a back surface 101 of the pawl member 100. In the back surface 101, a circular groove 155 (FIG. 15) is formed on the outer surface of the cylindrical portion 103, and a number of steel balls 152 are fitted therein so as to rotate freely. This constructs a bearing serving for receiving an axial load as well as serving as a sliding bearing.

A coned disc spring 124 is brought into contact with the back surface 101 of the pawl member 100 with the cylindrical portion 103 passed through the center hole 127 thereof. At this time, the coned disc spring 124 is in slidable contact with the back surface 101 via the steel balls 152 or the load carrying bearing in a direction allowing for an elastic force of the coned disc spring 124 to resist against the pressure from the pawl member 100. Strain gages 126 are attached onto the surface of the coned disc spring 124 at two locations opposite from each other by 180 degrees. Those strain gages 126 are electrically connected to the 1-chip microcomputer 14 via a lead 128. More preferably, three or more strain gages may be attached onto the coned disc spring 124. At this time, it is preferred that a plurality of strain gages is disposed such that they are in the rotationally symmetrical positions, respectively, on the surface of the coned disc spring 124.

The coned disc spring 124 is accommodated in the inner bottom portion 132 of a bowl-shaped supporter 130. In the supporter 130 are formed a support bore 133 allowing the drive shaft 4 to pass through and a supporting cylindrical section 134 protruding from the back surface of the supporter 130. The outer surface of the supporting cylindrical portion 134 is threaded, so that the supporter 130 can be fixedly secured to the body by thread-engaging said threaded portion with the threaded inner wall of the support section 145. The inner wall of the supporting cylindrical portion 134 is engaged with a bearing 138 adaptable to support the load both in the axial direction and in the radial direction (see FIG. 15), and the bearing 138 is also supported by a stopper inclined plane 144 formed in the drive shaft 4. Similarly, another bearing 139 is mounted on the other side of the drive shaft 4 (see FIG. 9(b)), so that the drive shaft 4 may be rotatably supported with respect to the body.

Four of the first anti-rotation grooves 108 extending in the axial direction are formed on the inner wall of the pawl member bore 106. Also, four of the second anti-rotation grooves 140 extending in the axial direction 5 so as to face to the first anti-rotation grooves 108 are formed on the outer wall of the driving shaft 4 to be in slidable contact with the inner wall of the pawl member bore 106. As shown in FIG. 18(a), the first anti-rotation grooves 108 and the second anti-rotation grooves 140 facing thereto define cylindrical grooves extending along the axial direction, and a number of steel balls are contained in each cylindrical groove thus to fill the groove. Owing to this, the pawl member 100 can move along the axial direction 5 with a minimized frictional resistance, while preventing the relative rotation to the drive shaft 4. This constructs a kind of ball spline, and a ball spline of other types, including, for example, a ball spline of endless rotation type, may be applied as such an anti-rotation means capable of sliding.

Further, as to the method for coupling the pawl member 100 to the drive shaft 4, a means other than the ball spline of FIG. 18(a) may be employed. For example, such a system as shown in FIG. 18(b), or a so-called key-spline system may be applicable as the anti-rotation means, in which the protrusion 140a extending in the axial direction is formed on the drive shaft 4, and a third anti-rotation groove 108a for accommodating the protrusion 140a is formed in the pawl member 100. Alternatively, in FIG. 18(b), the protrusion 140a may be formed in the pawl member 100 side and the third anti-rotation groove 108a may be formed in the drive shaft 4 side. Further, such a system as shown in FIG. 18(c), or a so-called key-groove system may be applicable as the anti-rotation means, in which a fourth anti-rotation groove 108b extending in the axial direction and a fifth anti-rotation groove 140b facing thereto are formed in the pawl member 100 and the drive shaft 4, respectively, and the key plate is contained in the groove in the rectangular parallelepiped shape formed by those grooves.

A plurality of ratchet teeth 114 are formed on a first engaging surface 121 of the tooth member 112, which are to be engaged with the ratchet pawl 102. The ratchet teeth 114 comprise relatively sharply inclined planes 118 and relatively moderately inclined planes 116 with respect to the first engaging surface 121, which are formed alternately in a cyclic manner along a circumferential direction of the tooth member.

The tooth member 112 is supported by the drive shaft 4 via a collar 111 so as to be in slidable contact therewith in such a manner that its first engaging surface 121 may face the second engaging surface 121 of the pawl member 100. At this time, the ratchet pawl 102 and the ratchet tooth 112 are engaged with each other (FIG. 17). Specifically, the drive shaft 4 is operatively coupled to the tooth member 112 exclusively via the engaging portion between the ratchet pawl 102 and the ratchet tooth 112. The end portion 142 of the drive shaft 4 having passed through the tooth member bore 120 via the collar 111 is mated with a washer 122 to prevent the tooth member 112 from being shifted outwardly in the axial direction (FIG. 15). The tooth member 112 is attached to the primary sprocket 2 by the pin 123 (FIG. 15) so as to prevent the relative movement therebetween, and further the top end of the drive shaft 4 is fitted with a pedal shaft 146. Thus, the ratchet gear is completely built, and serves for coupling the drive shaft 4 and the primary sprocket 2 so as to transmit exclusively the rotation by the pedal effort in the forward direction of the body to the primary sprocket 2.

Preferably, a bias spring 136 is interposed between the stopper inclined plane 144 of the drive shaft 4 and the back surface 101 of the pawl member 100. This bias spring 136 forces the pawl member 100 to be biased in the axial direction so as to produce a clearance between the steel balls 152 accommodated in the back surface 101 and the coned disc spring 124 when the pedal effort is not greater than a predetermined value (for example, substantially proximal to zero).

An operation of the pedal effort detecting mechanism will now be described.

As a rider applies a pedal effort to the pedals 8R, 8L (FIG. 3) to rotate the drive shaft 4 in the direction forwarding the body, this rotational driving force is transmitted to the pawl member 100 supported operatively by the drive shaft such that it can not rotate but can slidably move with respect to the drive shaft 4. At that time, as shown in FIG. 17, since the ratchet pawl 102 is applied with a force "Fd" corresponding to the pedal effort from the pawl member 100, the top end thereof is brought into contact with the relatively sharply inclined plane 118 of the ratchet teeth of the tooth member 112, thereby attempting to transmit this force to the ratchet teeth. Since the ratchet tooth member 112 is coupled to the primary sprocket 2, the top end of the ratchet pawl 102 receives a force Fp generated from the load for the driving from the relatively sharply inclined plane 118. The ratchet pawl 102 that has been applied from both its end portions with the force Fp and the force Fd, which are acting in opposite directions to each other, is rotated in the "a" direction to be elected. At this point, the pawl 100 is moved axially inwardly by the erection of the ratchet pawl 102 to press down the coned disc spring 124 disposed between the pawl member 100 and the supporter 130. The coned disc spring 124, in resistance to this, exerts an elastic force "Fr" to the pawl member 100. This force Fr and the force caused by the pedal effort to move the pawl member 100 in the axial direction are balanced within a short time. Thus, each of those parameters, including the stress-strain of the coned disc spring 124, the clearance between the pawl member 100 and the tooth member 112, the angle of the ratchet pawl 102 with the second engaging surface 110, the position of the pawl member 100 with respect to the body frame and a pressure applied to press down the coned disc spring 124, represent a physical quantity reflecting the pedal effort. Accordingly, the pedal effort T can be estimated by detecting at least one of those parameters.

In the present embodiment, the strain caused by the stress (hereinafter referred to simply as "strain") of the coned disc spring 124 will be detected by way of example. The 1-chip microcomputer 14 executes an arithmetic operation at least by an addition (including an averaging) of the signals from the two strain gags 126 attached onto the coned disc spring 124. In this way, measuring and averaging over the amounts of the strain at a plurality of locations may allow for the output variation to be extended even with the same level of pedal effort and also allow for the noise components to be smoothed, and so the SN ratio can be improved and further an estimation accuracy of the pedal effort can be improved. This effect will become greater as the number of strain gages increases.

Besides, for a pedal effort not higher than a predetermined value, since the bias spring 136 produces a clearance between the back surface 101 of the pawl member 100 and the coned disc spring 124, the steel balls 152 impinge less frequently upon the coned disc spring 124. Owing to this, the noise components in the strain gage signals are reduced and thus the stability in the pedal effort detection and also in the electromotive power assisting control can be improved.

Subsequently, the 1-chip microcomputer 14 executes an arithmetic operation to determine an assisting force "Te" to be applied for assistance based on at least the calculated operating force T, and arithmetically determines and outputs a control signal to instruct the electric motor 37 to supply a rotational driving force for said assisting force. Preferably, the 1-chip microcomputer 14 converts the rotational speed signal detected by the rotational speed sensor 220 into a speed of the bicycle, determines an appropriate assisting force Te based on both the pedal effort T and the bicycle speed, and controls the electric motor 37 to generate said assisting force Te.

The pedal effort detection mechanism of the present embodiment can bring about further superior effects as follows:

(1) Since the ratchet gear and the pedal effort detection mechanism have been realized in a single mechanism, reduction in the number of parts, compact arrangement, weight saving and low cost of the mechanism can be realized.

(2) Since the coned disc spring that is an integrated form of the load receiving unit and the load detection sensor is used in the portion serving for detecting the pedal effort and thus two functions have been realized by the single unit, in addition to the above-stated effects, further compactness, weight saving and low cost thereof can be achieved.

(3) Since the compactness, weight saving and simplification of the pedal effort detection mechanism has been achieved at a higher level, as indicated in the above clauses (1) and (2), an allowable range of application of the pedal effort detection mechanism to be installed has been further extended.

(4) For the reasons defined in the above clauses (1) and (2), the transmission loss of the load can be reduced as compared to the traditional mechanism, thereby realizing an assisted feeling of good response in the control.

(5) For the reasons defined in the above clauses (1) and (2), idle motions of the pedal (time lag until being sensed by the sensor) have been successfully eliminated as compared to the traditional mechanism (using the coil spring), and the pedal feeling at the time of applying the pedal effort in the present embodiment has been made similar to that of an ordinary bicycle, in contrast to the spongy pedal feeling associated with the traditional mechanism.

[Control Switch]

Figure 20:
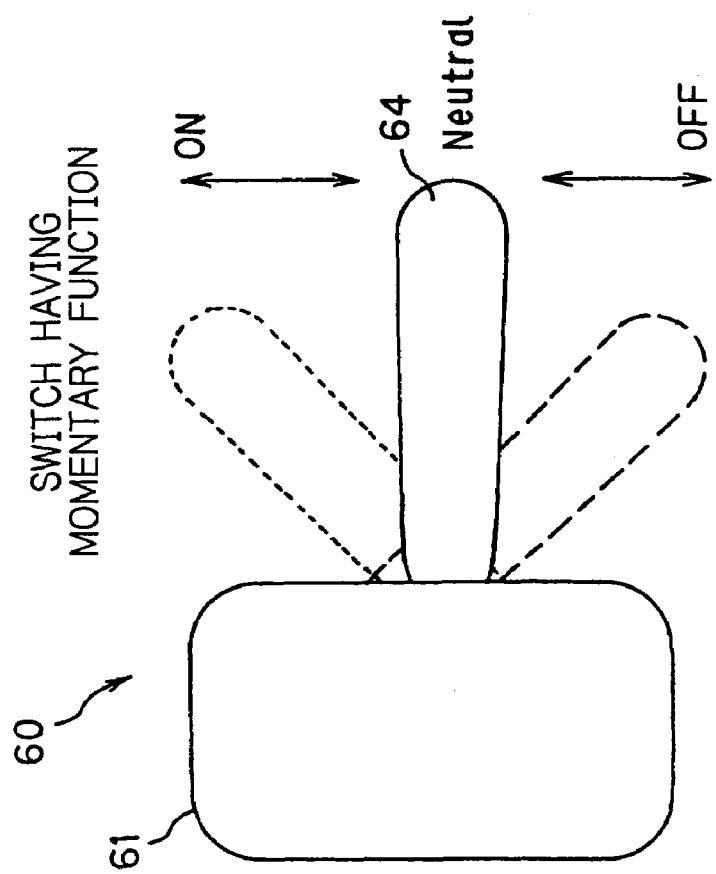
FIG. 20 is a schematic diagram of a lever type control switch presented as an example of a component of an electromotive power assisting kit.

FIG. 20 shows an overview of a lever type control switch 60 having a momentary function. This control switch 60 may be installed in any convenient location for the user to manipulate the switch, for example, the handle 16 of the electromotive power assisted bicycle 1. As shown in FIG. 20, the control switch 60 comprises a main body portion 61 and a switching lever 64 protruding beyond the main body portion. This lever 64 is initially in a neutral mode position, or a center position in switching, and can be shifted appropriately to an ON-mode position to turn on the power supply or to an OFF-mode position to turn off the power supply. This control switch 60 has been configured such that the lever 64 that has been once shifted to the ON-mode or OFF-mode position can return to the neutral mode position when the user releases the lever. It is a matter of course that the once-selected ON or OFF-mode of the power supply can be maintained even in this neutral mode position of the lever. Specifically, the behavior of the switching lever in the turning on operation is such as neutral mode position->ON-mode position->neutral mode position and that in turning off operation is neutral mode position->OFF-mode position->neutral mode position.

According to this control switch 60, under the condition where the above-mentioned automatic disconnecting function is activated to turn off the power supply, it is not necessary for the user to return the lever 64 to the OFF-mode position to turn on the power supply but the user should simply follow the procedure for turning on the power supply for the first time to bring the lever 64 that has been already returned to the neutral mode position into the ON-mode position and release the lever 64 from the hand. Further, since the switch has returned to the neutral mode position in spite of the power supply having been turned off by the automatic disconnection, there should be no situation where the power supply is turned off by the automatic disconnection while the lever is being held in the ON-mode position, so that there is no risk of user's misunderstanding that the device might have failed.

In this connection, the operational positions of the switch 60 may define other positions than those three positions: ON-mode position, neutral mode position and OFF-mode position described above. For example, the ON-mode position and the OFF-mode position may share a common position or such an energy-saving mode position may be additionally provided for decreasing the assist ratio to save the battery power. Furthermore, as the switch 256 in FIG. 2, a control switch may be used for providing a switching operation between the aerobic exercise mode and the electromotive power assisting mode.

Turning now to FIG. 21, an overview (a front and a side elevation view) of a push-button type control switch 60a according to another embodiment of the present invention is shown. As depicted in FIG. 21, the control switch 60a comprises an ON-button 65 and an OFF-button 66, which are protruding beyond a main body portion of the switch. The ON- and OFF-buttons are configured such that they can be pushed in the main body portion exclusively when pressed by a finger (as designated by the dotted lines in the side elevation view) to thereby provide an independent command to turn on or off the power supply. Once the buttons are released, the ON- and OFF-buttons 65, 66 can immediately return to the original positions, respectively (as designated by the solid lines in the side elevation view). In the push-button type control switch 60a, the neutral mode position defines a state where neither the ON-button 65 nor the OFF-button 66 is pressed. It is a matter of course that once selected, the ON or OFF mode of the power supply can be maintained even under this neutral mode position.

According to the embodiment of FIG. 21, the behavior of the switching in the turning on operation is such as a neutral mode position->ON-button 65 to be pressed down->neutral mode position (with the finger off) and that in turning off operation is neutral mode position->OFF-button 66 to be pressed down->neutral mode position(with the finger off). Specifically, according to the control switch 60a, under a condition where the above-mentioned automatic disconnecting function is activated to turn off the power supply, the user should follow the procedure for turning on the power supply for the first time and simply press the ON-button 65. Further, since the switch has been returned to the neutral mode position in spite of the power supply having been turned off by the automatic disconnection, there should be no situation where the power supply is turned off by automatic disconnection while the lever being held in the ON-mode position, so that there is no risk of the user's misunderstanding that the device might have failed.

As for the switch 60a, as with the switch 60, other types of buttons than the ON- and OFF-buttons, may be contemplated.

[Unit Mounting Bracket]

According to an embodiment of the present invention, a unit mounting bracket is employed to install the drive unit 13 onto the body frame 3.

A unit mounting bracket 70 shown in FIG. 22 is made up of a bottom plate 71, and a pair of side plates 72R, 72L originating from a pair of side edges 81R, 81L defining opposite sides of said bottom plate 71 and extending in parallel with each other appropriately in a vertical direction. The pair of side plates 72R, 72L are provided with side holes 84R, 84L through which the drive shaft 4 (see FIG. 14) is to pass.

The bottom plate 71 has a main plate segment 71a, both of whose lateral edges are defined by a pair of side edges 81R, 81L and an extension segment 73 extended from a front edge 81F, different from said side edges, of said main plate segment. A periphery of the main plate segment 71a is defined by the side edges 81R, 81L, the front edge 81F and a rear edge 81B, and it forms approximately a rectangular shape. The extension segment 73 is formed into a tapered shape so that the width thereof is gradually narrowed to a halfway point in proportion to a distance from the main plate segment 71a and it is formed to have the same width after the halfway point. The main plate segment 71a and the extension segment 73 are provided with mounting holes 74, 75, respectively, through which the mounting bolt of the drive unit 13 is to pass. Further, the main plate segment 71a may be provided with openings 78R, 78L for inserting thereinto protrusions of the drive unit 13, though now shown, and thereby securing the drive unit 13 so as not to be moved.

Further, a rib 76 is formed in the main plate segment 71a, which is rising up from one surface of the bottom plate (defined by the surface from which the side plates are extending in the illustrated example) and which is concaved in the opposite surface. The rib 76 extends linearly and across substantially full width of the bottom plate 71 between the pair of side plates 72R, 72L. Preferably, the extended axial line along the length of the rib 76 may be crossed with the pair of side plates 72R, 72L at an approximately right angle.

Further, the bottom plate 71 has, in its rear edge 81B, a folded segment 79 that has been folded approximately at a right angle with respect to the plane defined by said bottom plate 71. Further, a pair of concave segments 77R, 77L is formed in a region where each of the pair of side plates 72R, 72L intersects with the bottom plate 71, in a form depressed toward an inside of the bracket so as to connect said side plate and said bottom plate.

The rib 76, the folded segment 79 and the pair of concave segments 77R, 77L may help reinforce the unit mounting bracket 70 significantly so as to prevent the bottom plate 71 and the connections between the bottom plate and the side plates from being deflected or deformed easily, which may otherwise occur due to the counteraction of the drive unit 13 installed thereon when it generates the electromotive power.

Each of the pair of side plates 72R, 72L is made up of a partial circular segment 72C having outer circumference formed into a partial circle and an upright segment 72M for continuously connecting said circular segment to the bottom plate 71. The side holes 84R, 84L are formed, respectively, in the central portions of the circular segments 72C.

A plurality of slit holes 80a, 80b, 80c and 80d are formed in the pair of side plates for mounting separate members. In order to increase a convenience in mounting operation, notches may be provided in those slit holes as illustrated. The separate members may include, for example, a cover for the primary sprocket 2, the chain 12 and so on.

Now, a method for installing the drive unit 13 by using said unit mounting bracket 70 will be described with reference to FIG. 23.

FIG. 23(a) shows a state where the unit mounting bracket 70 is placed on a support section 145, prior to the drive shaft 4 being actually fitted to the body. The support section 145 (see FIG. 9(b)) is located in a lower portion of the body frame 3 and has a shaft hole 90 for receiving the drive shaft 4 so that the drive shaft 4 may be supported therein via bearings (i.e., the bearings 138, 139 of FIG. 9(b), which will be described later).

First of all, as shown in FIG. 23(a), the side holes 84L, 84R are aligned with the shaft hole 90 with the support section 145 sandwiched between the pair of side plates 72R, 72L.

Subsequently, as shown in FIG. 23(b), the drive shaft 4 is inserted through the shaft hole 90 and the side holes 84L, 84R, and then pedals 8L and 8R are mounted to left and right ends of the drive shaft 4 (precisely, a pedal shaft 146 of FIG. 15) via crank bars 6L, 6R, respectively. At this time, the pair of side plates 72R, 72L are clamped from the left and the right end portions, and thus it is secured fixedly to the support section 145. In actual practice, they are initially clamped in a condition where they are not completely fixed (i.e., in the half-fixed condition), or in a condition where the unit mounting bracket 70 is allowed to be rotated clockwise and counterclockwise (directions of M in the drawing) exclusively when a force is applied thereto. Then, they rest in a condition where the extension segment 73 is tilted by some ten degrees counterclockwise from the final mounting position thereof in order to facilitate the fitting operation of the bolt.

Subsequently, the bolts 85 are inserted into the mounting holes 74 and 75 of the bottom plate 71 and screwed in the corresponding threaded holes formed in the drive unit 13, though not shown, so as to be engaged therewith completely. Then, the unit mounting bracket 70 together with the drive unit 13 mounted thereto is rotated clockwise to its actual mounting position indicated in FIG. 23(b).

In the next step, the pair of side plates 72R, 72L is completely fastened from the left and the right ends to be fixedly secured. Preferably, a mounting unit 87 fixed to the body frame 3 via a band 86 and a protrusion 88 of the frame drive unit 13 are fixedly coupled. In this way, providing at least one additional point for fixation in another location may enforce further the fixation of the drive unit 13.

As described above, the unit mounting bracket of the present embodiment enables the easy mounting of the drive unit 13 without applying any additional processing to a frame of an ordinary bicycle. However, once mounted, it may be impossible to remove the drive unit 13 by loosening the bolt 85 shown in FIG. 23(b) because the frame 3 is located above the head of the bolt 85. Besides, an ordinary instrument can not loosen the fastening of the bracket 70, and so removing the drive unit 13 and remodeling the body can not be realized so easily.

Further, in the present embodiment, since the bracket 70 may be rotated around the side hole 84, the proper mounting position of the unit can be determined automatically without adjusting the mounting position. This means that if the requirement for positioning is strict in the above-described force combining mechanism by the double-chain system, the mounting operation provided by the bracket 70 will be particularly effective.

Furthermore, the bracket 70 of the present embodiment allows the drive unit 13 to be installed in a flexible manner to broadly different frames. In this connection, FIG. 24(a) shows an example of the drive unit 13 that has been installed in the upright state. In FIG. 24(a), the protrusion 88 is fixed to the vertically extending frame.

FIG. 24(b) shows an example according to another configuration of installation. In this example, the drive unit 13 is installed with the bracket 70 such that said unit 13 may be located between an upper and a lower frame coupled to the handle shaft, and the mounting unit 87 connected to the support frame of the saddle via a fastener such as a band 86 or the like and the protrusion 88 of the drive unit 13 are fixedly coupled. Then, the space between the upper and the lower frames and the entire lower portion of the saddle support frame are covered with a cover 91 to provide an improved exterior appearance and protection for machinery. At this time, the cover 91 may be provided with a hole 92 so as to allow the drive unit 13 to be protruded partially from said hole, and in that case, the drive unit 13, may appear to be an accent to enhance the exterior appearance.

While the present invention has been described with reference to the specific embodiments thereof, the present invention is not intended to be limited to those embodiments but may be modified appropriately as desired within the spirit and the scope of the present invention.

For example, while the system for distributing the electromotive power assisted bicycle of FIG. 1 has designated a bicycle shop, a parts-shop and an assembling/delivering shop independently as separate locations to which the orders are to be issued, a single shop performing at least any two functions of the above designated shops may be selected as an locations to which the order is to be issued. Further, the assembling shop (assembler) and the delivering shop may be defined as separate objects, to which the order is to be issued. As a component of the electromotive power assisting other components than those illustrated in the drawings kit may be employed, including a pedal effort indicator, for example.

As for the torque detection mechanism, either one of the pawl member or the tooth member of the one-way clutch 99 is attached to the sprocket and the other of them is attached to the drive shaft, and these members may be desirably and preferably interchangeable. For example, such a configuration may be employed in which the pawl member 100 is attached to the sprocket side, the tooth member 112 is attached to the drive shaft 4 so as to be slidable but un-rotatable, and the coned disk spring 124 is pressed down by the tooth member 12.

Further, while in the above example, the stress-strain of the coned disk spring has been detected as the physical quantity relating to the pedal effort, the present invention is not limited to this, but any physical quantities that vary in response to a deformation caused by the pedal effort in the one-way clutch 99 may be detected. For example, the gradient of the ratchet pawl, the relative distance between the ratchet pawl member and the ratchet tooth member, the position of either one of the ratchet pawl or the ratchet tooth relative to the bicycle body, and the pressure applied to press the coned disk spring may be selected as the physical quantity that reflects the pedal effort.

Further, the elastic member to be disposed against the deformation of the one-way clutch 99 may be desirably and preferably modified in its type and geometry. For example, a rubber elastic member, other than the coned disk spring and the coil spring, may be employed. Further, while the strain gage has been taken as an example of the means for detecting the stress-strain, the means is not intended to be limited to this but other means may be employed so long as it can detect the physical quantity relating to the stress-strain.

The invention claimed is:

1. A server system for distributing an electromotive power assisted bicycle that enables, via a communication network, an on-line shopping or a rental service of an electromotive power assisted bicycle comprising a primary bicycle unit having a traveling function basically provided by a pedal effort, which is assembled with components of an electromotive power assisting kit, in which said electromotive power assisting kit comprises at least:
   a pedal effort detection means adapted to detect the pedal effort;
   a drive unit adapted to output an electromotive power based on the detected pedal effort in accordance with a control program;
   a force-combining means for combining the output electromotive power with the pedal effort; and
   a battery for said drive unit;
   wherein a plurality of options are made available for at least one component of said electromotive power assisting kit;
   said server system for distributing an electromotive power assisted bicycle comprising:
   a control means;
   a communication means connectable to a user terminal via the communication network;
   a first searching means for searching bicycle information defining said primary bicycle unit; and
   a second searching means for searching electromotive power assisting information defining said electromotive power assisting kit, wherein said control means includes:
   a first display function for indicating at least a part of said bicycle information in said user terminal under a condition where a plurality of types of primary bicycle unit is made available for a user to choose;
   a second display function for indicating at least a part of said electromotive power assisting information in said user terminal under a condition where some components of the electromotive power assisting kit having a plurality of options that have been made available for a user to choose; and
   a designing function for creating design information so that, when any one of the types of the primary bicycle unit is selected in said user terminal, creates design information to allow the components of the electromotive power assisting kit to be assembled with the selected type of primary bicycle unit, and when any one of said components of said electromotive power assisting kit having a plurality of options is selected and determined in said user terminal, said electromotive power assisting kit containing said component of selected aspect can be assembled with said primary bicycle unit.

2. A server system for distributing an electromotive power assisted bicycle in accordance with claim 1, in which
   said primary bicycle unit includes an one-way clutch means for connecting a drive shaft with a sprocket such that a rotating torque of said drive shaft substantially only in one direction is selectively transmitted to said sprocket, and
   said pedal effort detection means detects a physical quantity that varies in response to a deformation of the one-way clutch means caused by the pedal effort.

3. A server system for distributing an electromotive power assisted bicycle in accordance with claim 2, in which said one-way clutch means includes:
   two pedal effort transmission parts disposed adjacently to each other along the axial direction of said drive shaft, which are engagingly locked to each other during a rotation in said only one direction so as to extend a space between said two parts; and
   an elastic member disposed so as to resist against the extension in the space between said two pedal effort transmission parts, wherein
   said pedal effort detection means includes a strain sensor for detecting a strain in said elastic means.

4. A server system for distributing an electromotive power assisted bicycle in accordance with claim 1, further comprising:
   a third searching means for searching information about suppliers and assemblers concerning said primary bicycle unit, said electromotive power assisting kit and assembling thereof respectively; and
   a user information acquisition means for acquiring user information from said user terminal;
   wherein said server system;
   issues orders for said primary bicycle unit and said electromotive power assisting kit, which have been selected by the user, to respective corresponding suppliers via the communication network;
   sends information about the assembler to the respective suppliers via the communication network; and sends said design information and the acquired user information to said assembler.

5. A server system for distributing an electromotive power assisted bicycle in accordance with claim 1, in which
said bicycle information includes at least image data on the primary bicycle unit and data on dimension and position of each frame, and said first display function indicates said image data or a compressed image of said primary bicycle unit in said user terminal; and
said electromotive power assisting information includes at least image data on said electromotive power assisting kit and data on geometry and dimension of said electromotive power assisting kit, and said second display function indicates said image data or a compressed image of said electromotive power assisting kit in said user terminal.

6. A server system for distributing an electromotive power assisted bicycle in accordance with claim 1, in which a plurality of options prepared for at least one component of said electromotive power assisting kit relate to at least either one of a type and a position of installation of said component of said electromotive power assisting kit.

7. A server system for distributing an electromotive power assisted bicycle in accordance with claim 6, in which said second display function provides an image display of said types of said components of said electromotive power assisting kit.

8. A server system for distributing an electromotive power assisted bicycle in accordance with claim 7, in which said second display function provides an image of a certain type of electromotive power assisting kit, which has been selected in said user terminal, superimposed on the image of the primary bicycle unit in a state where said selected kit is virtually assembled with said primary bicycle unit, so as to be displayed on the user terminal.

9. A server system for distributing an electromotive power assisted bicycle in accordance with claim 7, in which said user terminal is equipped with a mouse, wherein
said second display function makes a position of installation of said component of said electromotive power assisting kit in said image display selectable by moving the specific component selected by a mouse click in accordance with a mouse drag so as to be displayed in a desired position.

10. A server system for distributing an electromotive power assisted bicycle in accordance with claim 1, in which said designing function issues said design information after a notice that any one of the options of said components of the electromotive power assisting kit having a plurality of options having been determined in said user terminal.

11. A server system for distributing an electromotive power assisted bicycle in accordance with claim 1, in which said designing function of said control means further comprises:
a determining function for determining whether it is possible for said component of said electromotive power assisting kit selected in said user terminal to be assembled with said primary bicycle unit based on said bicycle information and said electromotive power assisting information; and
a notifying function for notifying the user terminal of a determination that it is impossible for the selected component of the electromotive power assisting kit to be assembled with the primary bicycle unit when said determining function has determined so.

12. A server system for distributing an electromotive power assisted bicycle in accordance with claim 1, in which said designing function of said control means is adapted such that, if said component of said electromotive power assisting kit selected in said user terminal needs other components of the electromotive power assisting kit that have not been selected, said designing function creates design information to issue an instruction that those required other components of said electromotive power assisting kit should be additionally assembled together with said selected component.

13. A server system for distributing an electromotive power assisted bicycle in accordance with claim 1, in which a plurality of options of the drive units are prepared, wherein each of the options includes at least a different control program from each other.

14. A server system for distributing an electromotive power assisted bicycle in accordance with claim 13, which has different control programs, including at least one of the following programs:
a plurality of electromotive power assisting control programs for inducing a variation in an assist ratio relative to a bicycle speed in each different manner;
an aerobic exercise control program enabling aerobic exercise;
a muscle exercise control program enabling muscle exercise; and
a control program allowing for traveling exclusively with an electromotive power.

15. A server system for distributing an electromotive power assisted bicycle in accordance with claim 14, in which said drive unit controlled by said aerobic exercise control program or said muscle exercise control program selects either one of an electromotive power or a loading force based on at least said pedal effort detected by said pedal effort detection means so as to achieve a pedal effort level enabling aerobic exercise or muscle exercise and allows for said either one of the electromotive power or the loading force to be added to said pedal effort via said force-combining means.

16. A server system for distributing an electromotive power assisted bicycle in accordance with claim 15, in which said drive unit comprises:
an electric motor; and
an electromagnetic clutch interposed between said electric motor and said force-combining means, wherein
said loading force is applied as a rotational resistance of said electric motor, which is produced by connecting said electric motor with said force-combining means through said electromagnetic clutch under a condition where said electric motor is not energized.

17. A server system for distributing an electromotive power assisted bicycle in accordance with claim 16, in which there is a mode made selectable for said battery, where said battery is charged by an electromotive force to be produced when said electric motor is rotated by a pedal effort against said loading force under a condition where the electric motor is not energized.

18. A server system for distributing an electromotive power assisted bicycle in accordance with claim 1, in which as one of the components of said electromotive power assisting kit, a human body parameter measuring means is prepared, wherein
said drive unit sets a pedal effort level based on at least a human body parameter measured by said human body parameter measuring means and executes a control such that the detected pedal effort represents said pedal effort level.

19. A server system for distributing an electromotive power assisted bicycle in accordance with claim 18, in which a set of plural types of parameters is prepared as said human body parameter, wherein said second display function of said control means indicates one or more of said plural types of human parameters to be selectable in said user terminal; and said designing function creates design information for assembling at least a human body parameter measuring means for measuring said selected human body parameter and a drive unit capable of executing a control based on the selected human body parameter with said primary bicycle unit.

20. A server system for distributing an electromotive power assisted bicycle in accordance with claim 18, in which said human body parameter includes at least one of a heart rate and a blood pressure.

21. A server system for distributing an electromotive power assisted bicycle in accordance with claim 1, further comprising:

a physical strength/health information acquisition means for acquiring physical strength/health information of a user via the communication network;

a program selecting means for selecting a control program or a parameter for said control program, which is most suitable for said user, based on the acquired physical strength/health information; and a program transmission means for transmitting said control program or said parameter for said control program, which has been selected by said program selecting means, to a user terminal via the communication network.

22. A server system for distributing an electromotive power assisted bicycle in accordance with claim 21, in which said user terminal is prepared as a component of said electromotive power assisting kit, wherein said control program or said parameter for said control program that has been received can be downloaded to said drive unit of said electromotive power assisted bicycle of said user.

23. A server system for distributing an electromotive power assisted bicycle in accordance with claim 22, in which said user terminal and said human body parameter measuring means are prepared as components of said electromotive power assisting kit, wherein said user terminal acquires said human body parameter measured by said human body parameter measuring means being said physical strength/health information of said user.

24. A server system for distributing an electromotive power assisted bicycle in accordance with claim 1, further comprising:

a physical strength/health information acquisition means for acquiring physical strength/health information of a user via the communication network; and a program selecting means for selecting a control program or a parameter of said control program, which is most suitable for said user, based on the acquired physical strength/health information, wherein said designing function of said control means creates a command to download said selected control program or said parameter of said control program to said drive unit.

25. A server system for distributing an electromotive power assisted bicycle in accordance with claim 1, in which said control means further comprises an ID entry function that, if any components of said electromotive power assisting kit that require authorization are selected in the user terminal, displays an entry screen for prompting the user to enter information representing an ID for the authorization in said user terminal, wherein said designing information is issued only when the entered ID is verified.

26. A server system for distributing an electromotive power assisted bicycle in accordance with claim 1, in which said drive unit is mounted to said primary bicycle unit via a unit mounting bracket.

27. A server system for distributing an electromotive power assisted bicycle in accordance with claim 26, in which said primary bicycle unit includes a drive shaft that is rotated by a pedal effort and a support section for supporting said drive shaft with a bearing; and said unit mounting bracket has a pair of side plates and a bottom plate connecting to said pair of side plates, wherein said unit mounting bracket is secured to said support section with said drive shaft passing through said pair of side plate and with said supporting section clamped between said pair of side plates, and said drive unit is mounted on said bottom plate and thereby said drive unit is securely mounted to a bicycle body.

28. A server system for distributing an electromotive power assisted bicycle in accordance with claim 27, in which said designing function of said control means creates the design information for instructing a mounting aspect and a position of said unit mounting bracket based on the selected options of said drive unit and said primary bicycle unit.

29. A server system for distributing an electromotive power assisted bicycle in accordance with claim 1, in which said primary bicycle unit has a primary sprocket that is rotatable for transmitting a pedal effort to a driving wheel, and said force-combining means includes:

a secondary sprocket that is rotatable coaxially with said primary sprocket;

a power sprocket to be rotated by said drive unit; and an auxiliary chain stretched across between said secondary sprocket and said power sprocket.

30. A server system for distributing an electromotive power assisted bicycle in accordance with claim 29, in which said second display function provides an indication in which said auxiliary chain are stretched over the power sprocket of said drive unit located in the position defined by the installation condition of said drive unit.

31. A server system for distributing an electromotive power assisted bicycle in accordance with claim 29, in which said designing function of said control means determines a length of said auxiliary chain based on the selected options of said drive unit and said primary bicycle unit and creates the designing information to be issued.

32. A server system for distributing an electromotive power assisted bicycle in accordance with claim 1, in which said battery is mounted to a frame of said primary bicycle unit via a battery bracket, said battery bracket comprising:

a bracket member capable of detachably accommodating the battery and engagingly locking the accommodated battery by a key; and a bracket retainer to be coupled with said bracket member so as to clamp the body frame.

33. A server system for distributing an electromotive power assisted bicycle in accordance with claim 1, in which when said position of said battery is selected in said user terminal, said designing function of said control means creates design information for giving an instruction on the frame and the position in the frame for said battery bracket to be installed.

34. A server system for distributing an electromotive power assisted bicycle in accordance with claim 1, in which a bicycle speed sensor for detecting a bicycle speed is included as a component of said electromotive power assisting kit, said sensor comprising:
   a ring magnet having a generally flat surface on which a plurality of magnet segments are formed so as to induce a magnetic field that varies spatially at a constant angular interval along a circumferential direction over said surface, said ring magnet capable of being installed so as to rotate coaxially with a section subject to be detected;
   a magnetic field detection means for detecting a magnetic field in a fixed location adjacent to a surface of said ring magnet; and
   a signal processing means for detecting a rotational speed of said section subject to the detection or a physical quantity relating thereto based on a magnetic field signal detected by said magnetic field detection means.

35. A server system for distributing an electromotive power assisted bicycle in accordance with claim 34, in which said section subject to the detection represents a rotational part within said drive unit.

36. A server system for distributing an electromotive power assisted bicycle in accordance with claim 1, in which a control switch for operationally providing an ON-OFF command on an operation of said drive unit is included as a component of said electromotive power assisting kit, wherein
   said control switch is initially in a neutral mode, defining neither of an ON-mode nor an OFF-mode, and adapted to return to the neutral mode position after the shifting operation either to the ON-mode position or to the OFF-mode position.

37. A server system for distributing an electromotive power assisted bicycle in accordance with claim 1, in which a cover housing for covering an area defined by components of said frame of said primary bicycle unit is included as a component of said electromotive power assisting kit, wherein
   said second display function further provides an indication in which the area to be covered by said cover housing can be designated in the user terminal, and
   said designing function further creates design information for assembling the cover housing suitable for covering said area designated in said user terminal with said primary bicycle unit.

38. A server system for distributing an electromotive power assisted bicycle in accordance with claim 37, in which said designing function designs a geometry and dimension of said cover housing suitable for covering the enclosed area designated in said user terminal based on at least said frame of said primary bicycle unit and a physical relationship relative to other components of said electromotive power assisting kit.

39. A server system for distributing an electromotive power assisted bicycle in accordance with claim 37, in which said second display function of said control means provides an indication in which at least one of a color, a transparency and a type of decoration of said cover housing can be selected by a user.

40. A server system for distributing an electromotive power assisted bicycle in accordance with claim 1, in which said communication network represents any one of the Internet, an intranet or a local area network.

41. A server system for distributing an electromotive power assisted bicycle in accordance with claim 1, in which said user terminal represents any one of a personal computer, a cellular phone or a PHS.

42. A server system for distributing an electromotive power assisted bicycle that enables via a communication network an on-line shopping or a rental service of an electromotive power assisted bicycle comprising a primary bicycle unit having a traveling function basically provided by a pedal effort, which is assembled with components of an electromotive power assisting kit, in which
   a plurality of types of said primary bicycle unit is prepared, and
   said electromotive power assisting kit comprises at least:
      a pedal effort detection means adapted to detect the pedal effort;
      a drive unit adapted to output an electromotive power based on the detected pedal effort in accordance with a control program;
      a force-combining means for combining the output electromotive power with the pedal effort; and
      a battery for said drive unit;
   said server system for distributing an electromotive power assisted bicycle comprising:
      a control means;
      a communication means connectable to a user terminal via the communication network;
      a first searching means for searching bicycle information defining said primary bicycle unit; and
      a second searching means for searching electromotive power assisting information defining said electromotive power assisting kit, wherein said control means includes:
         a first display function for indicating at least a part of said bicycle information in said user terminal under a condition where a plural types of primary bicycle unit have been made available for a user to choose;
         a second display function for indicating at least a part of said electromotive power assisting information in said user terminal; and
         a designing function for creating design information such that, when any one of said plural types of primary bicycle unit is selected in said user terminal, respective components of said electromotive power assisting kit can be assembled with said selected type of said primary bicycle unit.

* * * * *